United States Patent
Takase et al.

(10) Patent No.: US 12,086,905 B2
(45) Date of Patent: Sep. 10, 2024

(54) COLOR CONVERSION INFORMATION GENERATION METHOD, COLOR CONVERSION INFORMATION GENERATION SYSTEM, AND PROGRAM THEREFOR

(71) Applicant: TOPPAN PRINTING CO., LTD., Tokyo (JP)

(72) Inventors: Koichi Takase, Taito-ku (JP); Takashi Inamura, Taito-ku (JP); Takaya Tanaka, Taito-ku (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 38 days.

(21) Appl. No.: 17/394,911

(22) Filed: Aug. 5, 2021

(65) Prior Publication Data

US 2021/0366164 A1 Nov. 25, 2021

Related U.S. Application Data

(63) Continuation of application No. PCT/JP2020/004248, filed on Feb. 5, 2020.

(30) Foreign Application Priority Data

Feb. 5, 2019 (JP) ................................ 2019-019028
Aug. 26, 2019 (JP) ................................ 2019-153871

(51) Int. Cl.
*H04N 1/60* (2006.01)
*G01J 3/50* (2006.01)
(Continued)

(52) U.S. Cl.
CPC ............. *G06T 11/001* (2013.01); *H04N 1/60* (2013.01)

(58) Field of Classification Search
CPC ...... G06T 11/001; H04N 1/60; H04N 1/6019; H04N 1/6025; H04N 1/6027;
(Continued)

(56) References Cited

U.S. PATENT DOCUMENTS 6,850,245 B1 * 2/2005 Murashita ........... G06F 3/04897
345/589
7,034,960 B2 * 4/2006 Stone ..................... G01J 3/0264
358/1.9

(Continued)

FOREIGN PATENT DOCUMENTS

AU 2002363816 A1 * 8/2002 ................ G01J 3/46
JP 2006-94137 A 4/2006
(Continued)

OTHER PUBLICATIONS

International Search Report issued Apr. 21, 2020 in PCT/JP2020/004248, filed Feb. 5, 2020, 5 pages (with English Translation).
(Continued)

*Primary Examiner* — Wesner Sajous
(74) *Attorney, Agent, or Firm* — Oblon, McClelland, Maier & Neustadt, L.L.P.

(57) ABSTRACT

A method for generating color conversion information including providing a user with color sample information for determining a color sample of which color characteristic information is known, receiving, from the user, an image including the color sample determined by the color sample information in a lighting environment, and generating color conversion information which corresponds to the lighting environment and is correlated with the user, based on the image and the color characteristic information of the color sample determined by the color sample information. The color conversion information converts between color information and color characteristic information, the color information is information which corresponds to a lighting envi-
(Continued)

ronment and indicates colors of an object in the lighting environment, and the color characteristic information indicates color characteristics of the object.

31 Claims, 31 Drawing Sheets

(51) Int. Cl.
*G06F 3/048* (2013.01)
*G06T 11/00* (2006.01)
*G09G 5/02* (2006.01)
*G09G 5/06* (2006.01)
*H04N 5/57* (2006.01)
*H04N 9/64* (2023.01)
*H04N 9/69* (2023.01)
*H04N 9/73* (2023.01)
*H04N 23/83* (2023.01)

(58) Field of Classification Search
CPC .. H04N 1/6033; H04N 1/6041; H04N 1/6077; H04N 1/6088; H04N 1/6091; H04N 5/202; H04N 5/205; H04N 5/445; H04N 5/57; H04N 5/58; H04N 9/64; H04N 9/69; H04N 9/73; H04N 9/77; H04N 23/83; H04N 23/88; H04N 23/85; H04N 23/86; H04N 23/70; H04N 23/71; H04N 23/74; H04N 9/67; H04N 23/631; G01J 3/505; G01J 3/506; G01J 3/51; G01J 3/52; G01J 3/522; G01J 3/624; G01J 3/526; G01J 3/528; G01J 3/4621; G06F 3/048; G06F 3/0484; G06F 3/04845; G06F 3/04847; G06F 3/0482; G06F 3/0415; G09G 2320/06; G09G 2320/0271; G09G 2320/04; G09G 2320/0626; G09G 2320/0666; G09G 2340/06; G09G 2320/0633; G09G 2320/066; G09G 2320/064; G09G 2320/0686; G09G 2320/0693
See application file for complete search history.

(56) References Cited

U.S. PATENT DOCUMENTS

| | | | |
|---|---|---|---|
| 7,061,505 B2* | 6/2006 | Matsuzaki | G09G 5/02 345/592 |
| 7,202,976 B2* | 4/2007 | Stone | G01J 3/462 358/1.9 |
| 8,655,068 B1* | 2/2014 | Li | H04N 1/00031 382/128 |
| 2010/0225535 A1* | 9/2010 | Li | A63B 57/00 342/357.34 |
| 2018/0075626 A1* | 3/2018 | Magielse | H05B 45/20 |
| 2020/0105221 A1* | 4/2020 | Marcu | G09G 5/02 |

FOREIGN PATENT DOCUMENTS

| | | | | |
|---|---|---|---|---|
| JP | 2009-288928 A | | 12/2009 | |
| JP | 2017-175568 A | | 9/2017 | |
| KR | 20020070646 A | * | 2/2002 | ............... H04N 1/60 |
| WO | WO-2018021048 A1 | * | 2/2018 | ........... B42D 25/328 |

OTHER PUBLICATIONS

Extended European Search Report issued Apr. 11, 2022 in European Patent Application No. 20752815.9, 12 pages.
Maya R. Gupta, et al., "Simulating the Effect of Illumination Using Color Transformations," Proceedings of SPIE, vol. 5674, XP055902094, 2005, 12 pages.
Japanese Office Action issued Feb. 27, 2024 in Japanese Patent Application No. 2020-571227 (with English Translation), 9 pages.

* cited by examiner

FIG.4

| USER IDENTIFICATION INFORMATION | USER INFORMATION | COLOR CONVERSION INFORMATION INDEX | PRODUCT EVALUATION INDEX | PRINTER CHARACTERISTICS | DISPLAY CHARACTERISTICS | CAMERA CHARACTERISTICS |
|---|---|---|---|---|---|---|
| ****** | ****** | ******* | ******* | ******* | ****** | ****** |
| ****** | ****** | ******* | ******* | ******* | ****** | ****** |
| ****** | ****** | ******* | ******* | ******* | ****** | ****** |
| --- | --- | --- | --- | --- | --- | --- |

USER DATA TABLE

FIG.5

| COLOR CONVERSION INFORMATION TABLE | | | | | |
|---|---|---|---|---|---|
| COLOR CONVERSION INFORMATION IDENTIFICATION INFORMATION | CHART IMAGE INDEX | ADDITIONAL CHART IMAGE INDEX | CHART IDENTIFICATION INFORMATION | COLOR CONVERSION INFORMATION | SPECIFICATION DATA |
| ****** | ******* | ****** | ***** | ****** | MORNING TIME PERIOD |
| ****** | ******* | ****** | ***** | ****** | DAYTIME PERIOD |
| ****** | ******* | ****** | ***** | ****** | NIGHT TIME PERIOD |
| ****** | ******* | ****** | ***** | ****** | PRESET COLOR CONVERSION INFORMATION |
| --- | --- | --- | --- | --- | --- |

FIG.22

COLOR CONVERSION INFORMATION TABLE

| COLOR CONVERSION INFORMATION IDENTIFICATION INFORMATION | CHART IMAGE INDEX | ADDITIONAL CHART IMAGE INDEX | CHART IDENTIFICATION INFORMATION | COLOR CONVERSION INFORMATION | ALGORITHM IDENTIFICATION INFORMATION | SPECIFICATION DATA |
|---|---|---|---|---|---|---|
| ******* | ******* | ******* | ******* | ******* | ******* | MORNINT TIME PERIOD |
| ******* | ******* | ******* | ******* | ******* | ******* | DAYTIME PERIOD |
| ******* | ******* | ******* | ******* | ******* | ******* | NIGHT TIME PERIOD |
| ******* | ******* | ******* | ******* | ******* | ******* | PRESET COLOR CONVERSION INFORMATION |
| ⋮ | ⋮ | ⋮ | ⋮ | ⋮ | ⋮ | ⋮ |

FIG.23

PRODUCT EVALUATION TABLE

| PRODUCT IDENTIFICATION INFORMATION | PRODUCT EVALUATION |
|---|---|
| ******* | ******* |
| ******* | ******* |
| ******* | ******* |
| ⋮ | ⋮ |

FIG.24

EC SITE TABLE

| EC SITE IDENTIFICATION INFORMATION | EC SITE ATTRIBUTE INFORMATION | SITE COLOR CONVERSION INFORMATION INDEX | COMPARISON RESULTS INDEX | PRINTER CHARACTERISTICS | DISPLAY CHARACTERISTICS | CAMERA CHARACTERISTICS |
|---|---|---|---|---|---|---|
| ******* | ******* | ******* | ******* | ******* | ******* | ******* |
| ******* | ******* | ******* | ******* | ******* | ******* | ******* |
| ******* | ******* | ******* | ******* | ******* | ******* | ******* |

FIG.25

PRODUCT COLOR DATA TABLE

| PRODUCT IDENTIFICATION INFORMATION | PRODUCT IMAGE INDEX | PRODUCT COLOR INFORMATION INDEX | PRODUCT INFORMATION INDEX |
|---|---|---|---|
| ******* | ******* | ******* | ******* |
| ******* | ******* | ******* | ******* |
| ******* | ******* | ******* | ******* |

FIG.26

SITE COLOR CONVERSION INFORMATION TABLE

| SITE COLOR CONVERSION INFORMATION IDENTIFICATION INFORMATION | CHART IMAGE INDEX | ADDITIONAL CHART IMAGE INDEX | CHART IDENTIFICATION INFORMATION | SITE COLOR CONVERSION INFORMATION | ALGORITHM IDENTIFICATION INFORMATION | SPECIFICATION DATA |
|---|---|---|---|---|---|---|
| ******* | ******* | ******* | ******* | ******* | ******* | MORNINT TIME PERIOD |
| ******* | ******* | ******* | ******* | ******* | ******* | DAYTIME PERIOD |
| ******* | ******* | ******* | ******* | ******* | ******* | NIGHT TIME PERIOD |
| ******* | ******* | ******* | ******* | ******* | ******* | PRESET COLOR CONVERSION INFORMATION |
| : | : | : | : | : | : | : |

FIG.27

CHART TABLE

| CHART IDENTIFICATION INFORMATION | CHART SEARCH INFORMATION | CHART IMAGE INDEX | CHART DESIGN INFORMATION |
|---|---|---|---|
| ******* | ******* | ******* | ******* |
| ******* | ******* | ******* | ******* |
| ******* | ******* | ******* | ******* |
| : | : | : | : |

FIG.28

| ADDITIONAL CHART DESIGN TABLE | ADDITIONAL CHART DESIGN IDENTIFICATION INFORMATION | ADDITIONAL COLOR SEARCH INFORMATION | ADDITIONAL CHART DESIGN INFORMATION |
|---|---|---|---|
| | ******* | ******* | ******* |
| | ******* | ******* | ******* |
| | ******* | ******* | ******* |

FIG.29

| ADDITIONAL CHART TABLE | ADDITIONAL CHART IDENTIFICATION INFORMATION | ADDITIONAL CHART IMAGE INDEX | ADDITIONAL CHART INFORMATION |
|---|---|---|---|
| | ******* | ******* | ******* |
| | ******* | ******* | ******* |
| | ******* | ******* | ******* |

FIG.38

| PATIENT DATA TABLE | | | | | | |
|---|---|---|---|---|---|---|
| PATIENT IDENTIFICATION INFORMATION | PATIENT ATTRIBUTE INFORMATION | COLOR CONVERSION INFORMATION INDEX | IMAGE EVALUATION INDEX | PRINTER CHARACTERISTICS | DISPLAY CHARACTERISTICS | CAMERA CHARACTERISTICS |
| ****** | ****** | ****** | ****** | ****** | ****** | ****** |
| ****** | ****** | ****** | ****** | ****** | ****** | ****** |
| ****** | ****** | ****** | ****** | ****** | ****** | ****** |

FIG.39

| IMAGE EVALUATION TABLE | |
|---|---|
| AFFECTED AREA IDENTIFICATION INFORMATION | COLOR INFORMATION EVALUATION |
| ****** | ****** |
| ****** | ****** |
| ****** | ****** |

FIG.40

HOSPITAL DATA TABLE

| HOSPITAL IDENTIFICATION INFORMATION | HOSPITAL ATTRIBUTE INFORMATION | HOSPITAL COLOR CONVERSION INFORMATION INDEX | COMPARISON RESULTS INDEX | PRINTER CHARACTERISTICS | DISPLAY CHARACTERISTICS | CAMERA CHARACTERISTICS |
|---|---|---|---|---|---|---|
| ****** | ****** | ****** | ****** | ****** | ****** | ****** |
| ****** | ****** | ****** | ****** | ****** | ****** | ****** |
| ****** | ****** | ****** | ****** | ****** | ****** | ****** |
| ⋮ | ⋮ | ⋮ | ⋮ | ⋮ | ⋮ | ⋮ |

FIG.41

AFFECTED AREA COLOR DATA TABLE

| AFFECTED AREA IDENTIFICATION INFORMATION | AFFECTED AREA IMAGE INDEX | AFFECTED AREA COLOR INFORMATION INDEX | AFFECTED AREA INFORMATION INDEX |
|---|---|---|---|
| ****** | ****** | ****** | ****** |
| ****** | ****** | ****** | ****** |
| ****** | ****** | ****** | ****** |
| ⋮ | ⋮ | ⋮ | ⋮ |

FIG.42

HOSPITAL COLOR CONVERSION INFORMATION TABLE

| HOSPITAL COLOR CONVERSION INFORMATION IDENTIFICATION INFORMATION | CHART IMAGE INDEX | ADDITIONAL CHART IMAGE INDEX | CHART IDENTIFICATION INFORMATION | HOSPITAL COLOR CONVERSION INFORMATION | ALGORITHM IDENTIFICATION INFORMATION | SPECIFICATION DATA |
|---|---|---|---|---|---|---|
| ****** | ****** | ****** | ****** | ****** | ****** | MORNINT TIME PERIOD |
| ****** | ****** | ****** | ****** | ****** | ****** | DAYTIME PERIOD |
| ****** | ****** | ****** | ****** | ****** | ****** | NIGHT TIME PERIOD |
| ****** | ****** | ****** | ****** | ****** | ****** | PRESET COLOR CONVERSION INFORMATION |
| ⋮ | ⋮ | ⋮ | ⋮ | ⋮ | ⋮ | ⋮ |

FIG.43

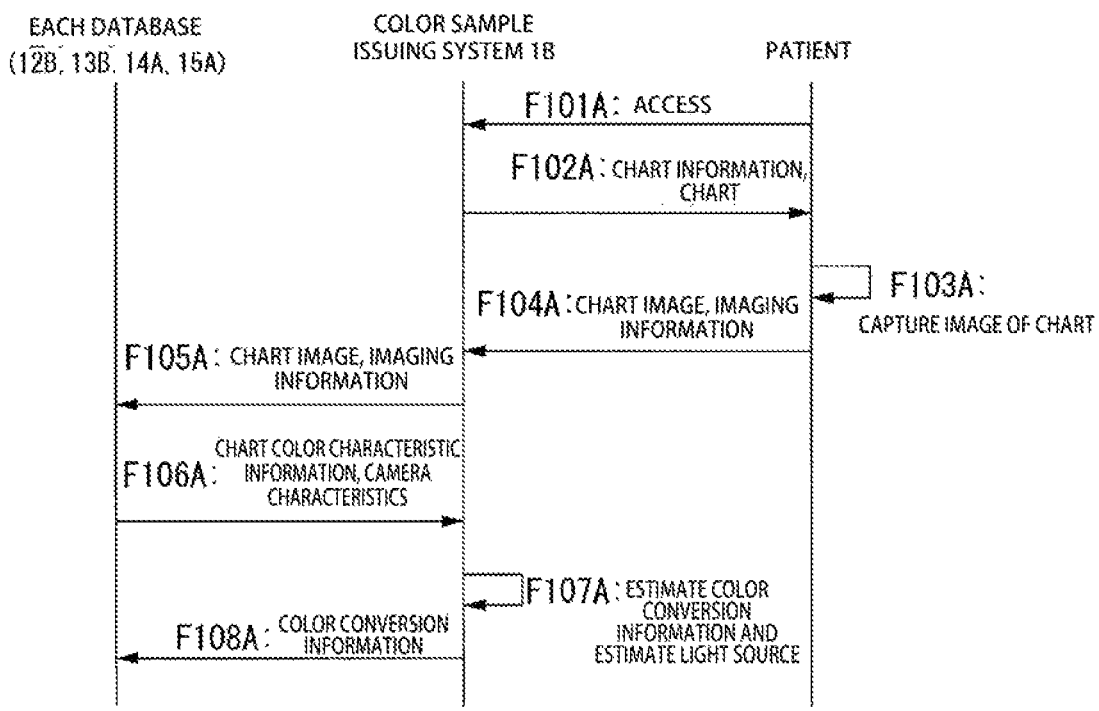

COLOR CONVERSION INFORMATION GENERATION METHOD, COLOR CONVERSION INFORMATION GENERATION SYSTEM, AND PROGRAM THEREFOR

CROSS-REFERENCE TO RELATED APPLICATIONS

The present application is a continuation of International Application No. PCT/JP2020/004248, filed Feb. 5, 2020, which is based upon and claims the benefits of priority to Japanese Application No. 2019-019028, filed Feb. 5, 2019 and Japanese Application No. 2019-153871, filed Aug. 26, 2019. The entire contents of all of the above applications are incorporated herein by reference.

BACKGROUND OF THE INVENTION

Field of the Invention

The present invention relates to color conversion information generation methods, color conversion information generation systems, and programs therefor.

Discussion of the Background

In recent years, articles (objects such as products) are purchased by users by visiting EC (electronic commerce) sites and observing products, e.g., clothing items, on the display screens of user terminals without actually observing the actual articles (e.g., see JP 2009-288928 A).

These users confirm the sizes or colors of the products on the display screens of the terminals and purchase products on the EC sites, based on the users' body sizes and desired colors.

Thus, it is common practice for users to evaluate the colors of objects without observing the actual objects.

SUMMARY OF THE INVENTION

According to an aspect of the present invention, a method for generating color conversion information includes providing a user with color sample information for determining a color sample of which color characteristic information is known, receiving, from the user, an image including the color sample determined by the color sample information in a lighting environment, and generating color conversion information which corresponds to the lighting environment and is correlated with the user, based on the image and the color characteristic information of the color sample determined by the color sample information. The color conversion information converts between color information and color characteristic information, the color information is information which corresponds to a lighting environment and indicates colors of an object in the lighting environment, and the color characteristic information indicates color characteristics of the object.

According to another aspect of the present invention, a color conversion generation system includes processing circuitry which provides, to a user, color sample information which is information about a color sample of which color characteristic information is known, acquires, from the user, an image of the color sample that is determined by the color sample information in a lighting environment of the user, and calculates color conversion information for the user according to the image and the color characteristic information. The color conversion information is used for conversion between color information of an article in the lighting environment and color characteristic information of the article.

According to a still another aspect of the present invention, a non-transitory computer-readable recording medium that stores a program which when executed by a computer causes the computer to execute a method including providing, to a user, color sample information which is information on a color sample of which color characteristic information is known, acquiring, from the user, an image of the color sample determined by the color sample information in a lighting environment of the user, and calculating color conversion information for the user according to the image and the color characteristic information. The color conversion information is used for conversion between color information of an article in the lighting environment and color characteristic information of the article.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a diagram illustrating a configuration example of a user data table of a user database 11.

FIG. 5 is a diagram illustrating a configuration example of a color conversion information table in the user database 11.

FIG. 22 is a diagram illustrating a configuration example of a color conversion information table in the customer database 12A.

FIG. 23 is a diagram illustrating a configuration example of a product evaluation table in the customer database 12A.

FIG. 24 is a diagram illustrating a configuration example of an EC site table in an EC site database 13A.

FIG. 25 is a diagram illustrating a configuration example of a product color data table in the EC site database 13A.

FIG. 26 is a diagram illustrating a configuration example of a site color conversion information table in the EC site database 13A.

FIG. 27 is a diagram illustrating a configuration example of a chart table in a chart information database 14A.

FIG. 28 is a diagram illustrating a configuration example of an additional chart design table in the chart information database 14A.

FIG. 29 is a diagram illustrating a configuration example of an additional chart table in the chart information database 14A.

FIG. 38 is a diagram illustrating a configuration example of a patient data table in a patient database 12B.

FIG. 39 is a diagram illustrating a configuration example of an image evaluation table in the patient database 12B.

FIG. 40 is a diagram illustrating a configuration example of a hospital data table in a hospital database 13B.

FIG. 41 is a diagram illustrating a configuration example of an affected area color data table in the hospital database 13B.

FIG. 42 is a diagram illustrating a configuration example of a hospital color conversion information table in the hospital database 13B.

FIG. 43 is a sequence diagram illustrating a processing flow for an example of patient color conversion information generation, using the color sample issuing system 1B.

DESCRIPTION OF THE EMBODIMENTS

Figure 1:
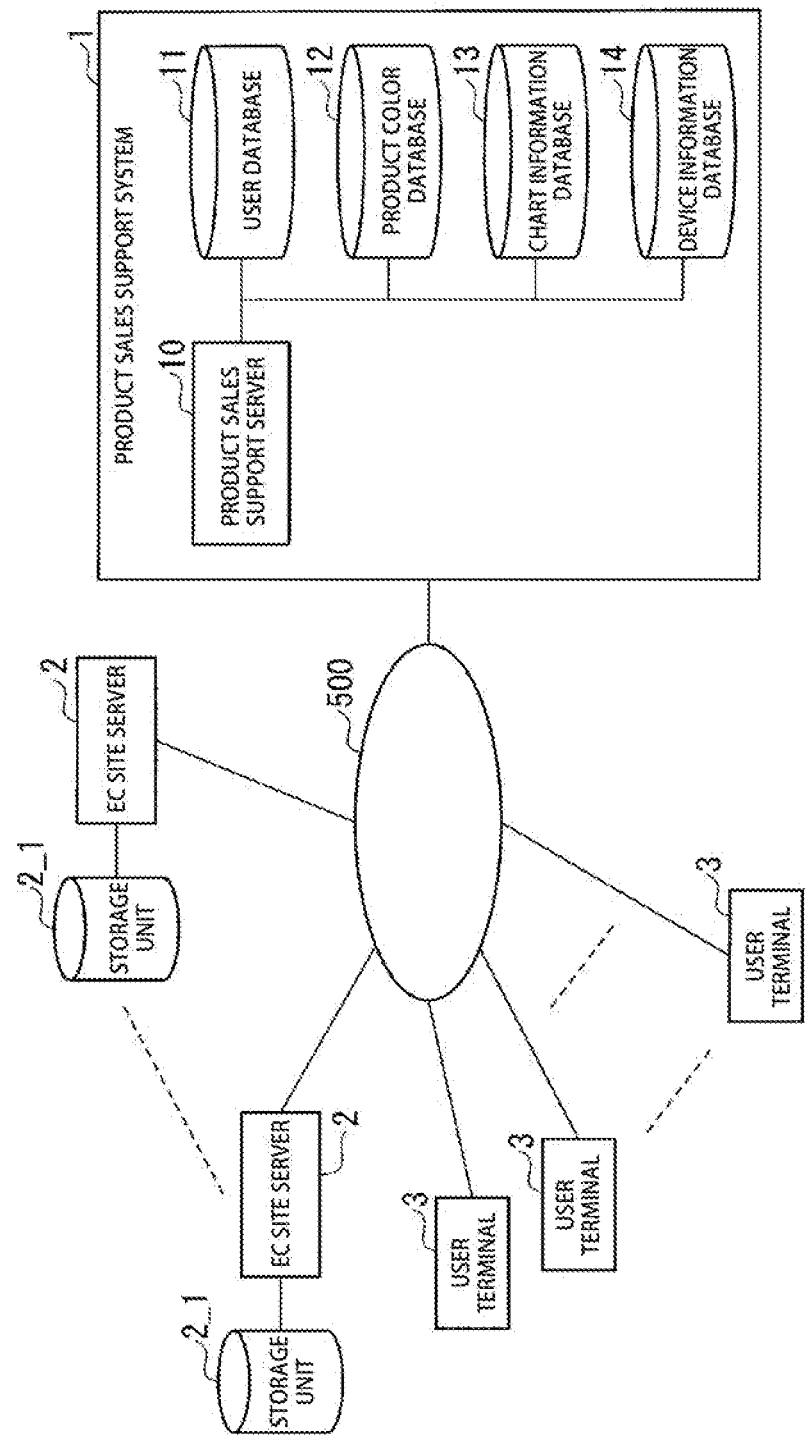
FIG. 1 is a block diagram illustrating a configuration example of an EC site sales system using a product sales support system (color conversion information generation system), according to the present embodiment.

The embodiments will now be described with reference to the accompanying drawings, wherein like reference numerals designate corresponding or identical elements throughout the various drawings.

First Embodiment

With reference to the drawings, a first embodiment of the present invention will be described.

FIG. 1 is a block diagram illustrating a configuration example of an EC site sales system using a product sales support system (color conversion information system which is simply termed product sales support system hereinafter), according to the present embodiment. In FIG. 1, the EC site sales system has a configuration in which a product sales support system 1, EC site servers 2, and user terminals 3 are connected to each other via a network 500 including the Internet. Product images (described later) of products sold by the EC site servers 2 are stored in respective storage units 2_1.

The product sales support system 1 is installed, for example, in an operating company A of a product sales support site to perform sales support for products by correctly providing forms of products. Specifically, in the sales support, when a user observes a product image of a product (e.g., a clothing item in the present embodiment) sold by an EC site in an observation environment (e.g., under the light source of the location where the user observes the product) on the display screen of the user terminal 3, the product image is displayed with colors similar to the colors of the actual product when visually observed.

Products (articles) in the present embodiment refer to articles to be sold, including clothing items, accessories, furniture, antiques, and paintings. For clothing items, in particular, users' favorite colors, combinations with other colors, and the like are important criteria of choice for the users. Therefore, if the displayed colors visually observed on the display screen of the user terminal 3 are different from the colors of the actual product visually observed in the user's observation environment (light source characteristics in particular, e.g., spectral radiance characteristics) and if the colors of the actual product are not pleasing to the user, the displayed colors may be a frequent cause of product return. Thus, it is important to adjust colors of a product image displayed (displayed product image described later) on the display screen of the user terminal 3.

Figure 2B:
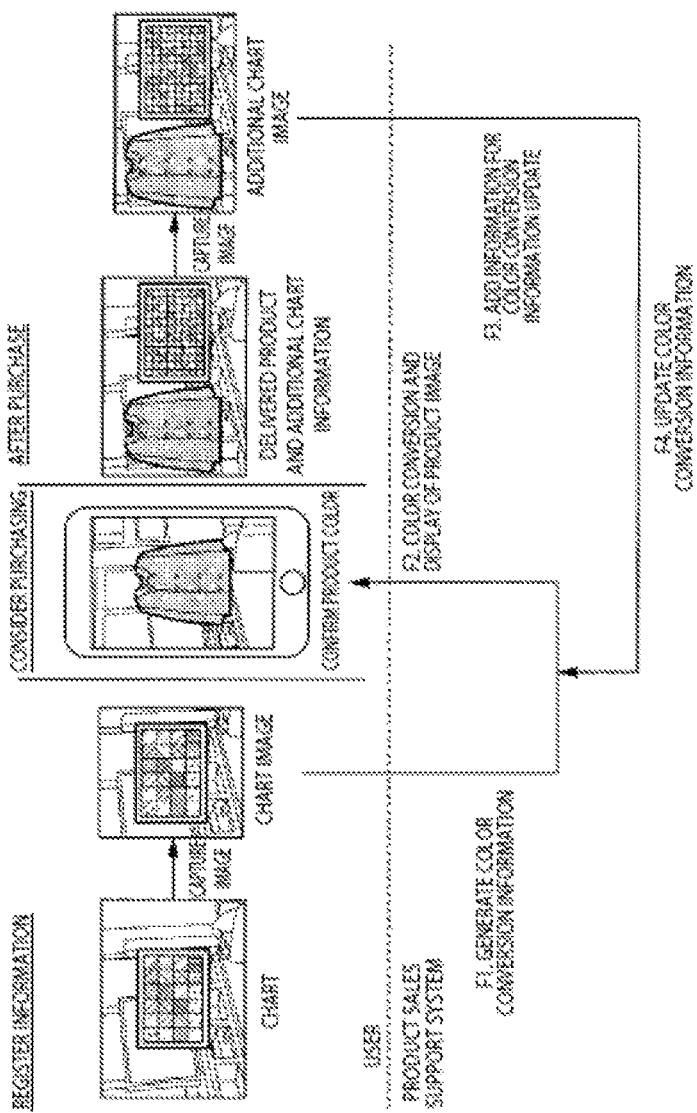
FIG. 2A and FIG. 2B are schematic diagrams illustrating processing performed by a product sales support system 1 when presenting a product image to a user, according to the present embodiment.
Figure 2A:
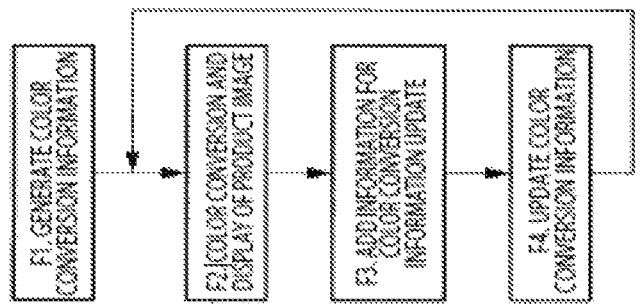

FIG. 2A and FIG. 2B are schematic diagrams illustrating processing performed by a product sales support system 1 including a color conversion information system when presenting a product image to a user, according to the present embodiment.

FIG. 2A is a flowchart illustrating a processing flow of presenting a product image to a user performed by the product sales support system 1.

FIG. 2B is a schematic diagram illustrating whether the subject performing each step of the processing shown in the flowchart of FIG. 2A is the user or the product sales support system 1.

Process F1

Process F1 is a process of generating color conversion information. In this Process F1, a process is performed of acquiring a user's environment information registered with an EC site and calculating color conversion information from the acquired environment information.

Specifically, in Process F1, the product sales support site presents a chart to the user registered with the EC site, and acquires a chart image, i.e., an image of a chart, and imaging information. This chart (first color sample) is a color sample printed on a predetermined medium, in which a plurality of color swatches of predetermined colors with different color characteristics are arrayed. The color characteristic information of these colors is known and provided to the product sales support system 1.

The term imaging information refers to information including information on the camera model (or device model) or the like for acquiring camera characteristics of the camera used for imaging, information on the camera settings during imaging, position information (GPS information acquired by the device provided to the camera, user specification (address and room name), etc.) indicating the location of imaging, and date and time information. The imaging information may be acquired in advance by the product sales support site via the EC site when the imaging information is registered with the EC site.

Then, color conversion information is generated, which is used for converting color characteristic information into color information as colorimetric values in the imaging environment in which the above chart has been imaged, based on the spectral reflectance of the chart or color characteristic information as colorimetric values defining one or more environments (light source, observation sensitivity, etc.), the chart image, and the camera characteristics.

If the user is not registered with the service that provides a displayed product image using color conversion information and if the user has already purchased articles from the EC site, a color sample used as a chart may be any of, a combination of, or all of the articles purchased by this user, or an image of the articles may be transmitted as a chart image to the product sales support system 1 together with imaging information.

Process F2

Based on the color conversion information, the product sales support system 1 generates product image data by converting the colors of the image of the product sold by the EC site into colors corresponding to the light source in the environment where the user observes the product, i.e., colors visually observed by the user when the user observes the product in the user's environment.

Then, the product sales support system 1 supplies the displayed product image to the user terminal 3.

The user observes the displayed product image on the display screen of the user terminal 3 and performs purchase processing if the product meets the user's taste.

Process F3

In parallel with the user's purchase processing, the product sales support system 1 informs the EC site about the user information and sales information of the product purchased by the user.

Thus, an operating company B of the EC site ships the product purchased by the user and delivers it to the user.

When the product has been shipped from the operating company B, the operating company A of the product sales support site provides information about an additional chart (additional chart information) to the user who has purchased the product.

Then, after receiving the product and the additional chart information, the user captures an image of the additional chart (captures an image in an environment similar to the environment where an image of the chart was captured) according to the additional chart information to transmit an additional chart image and imaging information to the product sales support system 1 from the user terminal 3.

The product sales support system 1 acquires an image of the new additional chart and the imaging information for updating the already acquired color conversion information.

Process F4

The product sales support system 1 changes the already acquired user's color conversion information, based on the additional chart image and the imaging information supplied from the user.

After that, each time Processes F2 to F4 are iterated, the user's color conversion information is changed to thereby generate a displayed product image in which colors closer to the colors of the actual product can be visually observed.

In the update, the color conversion information may be updated and changed by adding all the additional chart image and the imaging information, or by adding a part of or a combination of the chart (first color sample) information and the additional chart (second color sample) information according to predetermined criteria.

Alternatively, color conversion information may be generated using a part of the chart image and the imaging information when capturing the chart image, in addition to the additional chart image and the imaging information when capturing the additional chart image.

Alternatively, in the update of the color conversion information, the user may explicitly indicate as to whether the environment for capturing the image (lighting environment where the user captures an image) is different from the previous environment, or if the environment is detected to be different as a result of detecting the environment change using a predetermined threshold in the update processing, color conversion information may be newly acquired (changed) using only the additional chart image and the imaging information.

The product sales support system 1 may receive, for example, a product image that is an image of the product transmitted from the user terminal after delivery of the product to the user, or an additional chart image of an additional chart (second color sample) supplied to the user. Then, the product sales support system 1 converts the color information of the received product image or additional chart image into color information in a standard lighting environment, based on the color conversion information generated from the chart (first color sample). Then, the product sales support system 1 detects that the user's imaging environment has changed if the color characteristic information resulting from the conversion based on the above color conversion information is different from the known color characteristic information of the delivered article or the provided additional chart. The threshold mentioned above is a numerical value to be compared with a difference between the color characteristic information resulting from the conversion based on the color conversion information and the known color characteristic information of the delivered article or the provided additional chart, and is obtained by calculating differences in different lighting environments by experiments or the like.

Returning to FIG. 1, the product sales support system 1 includes a product sales support server 10, a user database 11, a product color database 12, a chart information database 13, and a device information database 14.

Based on the color conversion information described above, the product sales support system 1 converts a product image provided by an EC site into a displayed product image from which the user can visually observe the product as a product having the actual colors in the user's observation environment, and provides the converted image to the user terminal 3.

Figure 3:
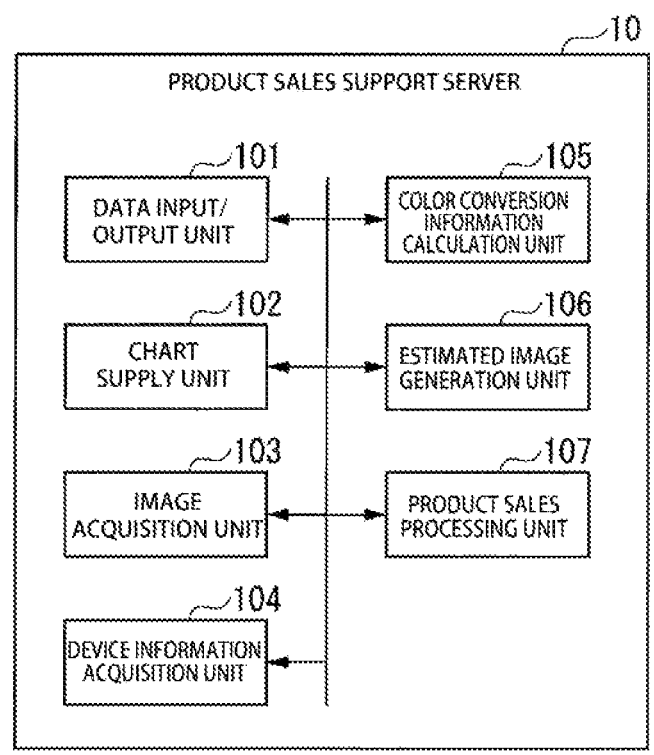
FIG. 3 is a diagram illustrating a configuration example of a product sales support server 10, according to the present embodiment.

FIG. 3 is a diagram illustrating a configuration example of the product sales support server 10 according to the present embodiment. As shown in FIG. 3, the product sales support server 10 includes a data input/output unit 101, a chart supply unit 102, an image acquisition unit 103, a device information acquisition unit 104, a color conversion information calculation unit 105, an estimated image generating unit 106, and a product sales processing unit 107.

The data input/output unit 101 transmits and receives data to/from an external device or an external system via the network 500.

The chart supply unit 102 determines a chart (and additional chart information) to be provided to a user and outputs this chart or chart information including manufacturing information (e.g., printing information).

The image acquisition unit 103 determines whether the images acquired by the data input/output unit 101 are a chart image and an additional chart image, and outputs the chart image to the color conversion information calculation unit 105 together with the determination results.

The device information acquisition unit 104 extracts camera characteristic acquisition information, such as a camera model or a device model, from the imaging information acquired by the data input/output unit 101. Then, the device information acquisition unit 104 conducts a search using the extracted camera characteristic acquisition information to acquire camera characteristics corresponding to the camera characteristic acquisition information from the device information database 14 (described later) and outputs the acquired camera characteristics to the color conversion information calculation unit 105.

The color conversion information calculation unit 105 generates color conversion information (e.g., a spectral radiance of a light source, a spectral sensitivity of an observer, a colorimetric transformation matrix between different environments, a processing procedure, or a function) used for converting color characteristic information of an article into colorimetric values that would be acquired in a user's environment, based on a spectral reflectance of a chart or color characteristic information as colorimetric values defining one or more environments (light source, observation sensitivity, etc.), a chart image, and camera characteristics, and writes and stores the generated color conversion information in the user database 11 (described later). The color conversion information calculation unit 105 also recalculates and updates the color conversion information that has been already generated, based on an additional chart image supplied at a predetermined timing.

The estimated image generating unit 106 converts color characteristic information into color information for each pixel based on the color conversion information to generate a displayed product image (convert a product image into a displayed product image) for a user's observation environment.

if a notification of the user's product purchase is supplied from a user terminal 3, the product sales processing unit 107 notifies the EC site about the user information and the purchased product information.

Returning to FIG. 1, each EC site server 2 includes a storage unit 2_1. The storage unit 2_1 stores product images contained in a product color data table in the product color database 12, which will be described later, and chart images used for generating site color conversion information, being correlated with pieces of the product identification information.

The color conversion information calculation unit 105 generates site color conversion information similarly to color conversion information for each user, and as a result of this, acquires product color information and product information.

FIG. 4 is a diagram illustrating a configuration example of a user data table in the user database 11. The user data table is provided for each EC site. For example, for each record, the user data table is provided with columns of user information, color conversion information index, product evaluation index, printer characteristics, display characteristics, and camera characteristics, being correlated with the user identification information. The user identification information is information for identifying each user. The user information is information on a user indicated by the user identification information and includes name, gender, age, address, phone number, email address, hobbies, and favorite colors. The color conversion information index is an index such as an address of the area storing a color conversion information table, that is, a list of color conversion information usable by the user, including a plurality of different pieces of color conversion information and preset color conversion information in the user's observation environment indicated by the user identification information.

The product evaluation index is an index such as an address of the area storing a product evaluation table containing the user's evaluation for products purchased by the user indicated by the user identification information. The printer characteristics are information including printer output color information, such as an ICC (international color consortium) profile and spectroscopic information of inks (ink information) of the printer which is used by the user to print a product image, and medium information of paper used for printing the product image. The display characteristics correspond to luminescence information including an ICC profile, spectral radiance, and tristimulus values. The camera characteristics may include, for example, spectral sensitivity information of a camera (imaging device). These printer characteristics, display characteristics, and camera characteristics are written into corresponding columns of the user data table (described later) by the device information acquisition unit mentioned above.

FIG. 5 is a diagram illustrating a configuration example of the color conversion information table in the user database 11. The color conversion information table is written to and stored in the user database 11. The color conversion information table is provided for each user. For each record, the color conversion information table is provided with columns of chart image index, additional chart image index, chart identification information, color conversion information, and specification data, being correlated with the color conversion information identification information.

The color conversion information identification information is information for identifying each piece of color conversion information. The chart image index is an index such as an address of the area where image data for the chart determined by the chart information (first color sample information) is written to and stored in the database. The data for the chart image may be provided as the form of a data table containing pixel positions of pixels extracted from the chart image and pixel values of the pixels indicated by the pixel positions.

The additional chart image index is an index such as an address of the area where image data for the additional chart determined by the additional chart information (second color sample information) is written to and stored in the database. The data for the additional chart image may be provided as the form of a data table containing pixel positions of pixels extracted from the additional chart image and pixel values of the pixels indicated by the pixel positions.

In the present embodiment, the first color sample information and the second color sample information are only examples of color sample information. The color sample information is information for determining a color sample and may be either of color sample specification information and color sample realization information.

The color sample specification information is information specifying a color sample (first or second color sample) to be used, and thus may specify, for example, any of or a combination of a chart, an additional chart, and a sample article such as an article to be delivered, as a color sample. The user captures an image of the sample article specified by the color sample specification information and transmits the image to a color conversion information generation system.

The color sample realization information is information for realizing the color sample on the user side (e.g., information such as a chart image for the user to print a chart using a printing means of the user).

The color conversion information corresponds to spectral radiance of the light source or a tristimulus transformation matrix in an environment where the user has captured an image of the chart or the additional chart. The tristimulus transformation matrix is a matrix with which colorimetric values of a defined observation environment (e.g., a combination of CIE (international commission on illumination)_D50 and a 2-degree field standard observer, or a combination of CIE_D65 and a 10-degree field standard observer) are converted (color-converted) into device values in terms of the spectral radiance of the light source in an environment where the user has captured an image, and the camera characteristics of the camera used for imaging. This color conversion may be conducted in reverse. That is, device values in terms of the spectral radiance of the light source in the environment where the user has captured an image, and the camera characteristics of the camera used for imaging, may be converted into a spectral reflectance of an article or colorimetric values defining the environment. Specifically, the color conversion information is conversion information between a spectral reflectance of an article or color characteristic information as colorimetric values defining the observation, and colorimetric values visually observed in the user's environment.

The chart identification information is identification information for the chart and the additional chart provided to the user.

The specification data is information indicating specification of color conversion information. The specification data indicates an applied time period of the corresponding color conversion information, including a morning time period, a daytime period, and a night time period. The morning time period may, for example, be a time period from sunrise to 12:00 noon. The daytime period may, for example, be a time period from 12:00 noon to sunset. The night time period is a time period from sunset to sunrise. The specification data may include location information, so that color conversion information can be specified in an office, restaurant, theater, or at home, or the like. The preset color conversion information is color conversion information common to individual users, i.e., a transformation matrix used for converting a spectral radiance of sunlight or of a light source in an ordinary office, or color characteristic information defining an environment, into colorimetric values visually observed in sunny conditions outdoors or an office.

For additional charts, processing as in the processing related to color conversion information acquisition performed for the second additional chart (second color sample) is performed for a third additional chart (third color sample) to an nth additional chart (nth color sample) that follow the second additional chart.

Figure 6:
FIG. 6 is a diagram illustrating a configuration example of a product evaluation table in the user database 11.

FIG. 6 is a diagram illustrating a configuration example of the product evaluation table in the user database 11.

The product evaluation table is written to and stored in the user database 11. The product evaluation table is provided for each user. For each record, the product evaluation table is provided with a column of evaluation for a product corresponding to the product identification information (product evaluation), being correlated with the product identification information. The product identification information is information for identifying each product. In the product evaluation, evaluation for the purchased product (product indicated by the product identification information) (e.g., evaluation by questionnaire) is written. For example, the product evaluation may include the user's reactions to the delivered product, including, for example, "Satisfied", "Normal", "Redness is insufficient", "Returned due to color difference" as a result of the user's color adjustment described later, and the like.

Figure 7:
FIG. 7 is a diagram illustrating a configuration example of a product color table in a product color database 12.

FIG. 7 is a diagram illustrating a configuration example of a product color table in the product color database 12. The product color table is written to and stored in the product color database 12. The product color table is provided for each EC site. For each record, the product color table is provided with columns of a product image index, site color conversion information, product color information index, and product information index, being correlated with the product identification information. The product identification information is information for identifying each product. The product image index is an index such as an address of the area in the product color database that stores data of images captured in an environment of the light source of each EC site.

The site color conversion information is a tristimulus transformation matrix used for converting a spectral radiance of the light source in an environment where a product of the EC site has been imaged, or colorimetric values of the light source in an environment where the image has been captured, into colorimetric values defining an environment. The product color information index is an index such as an address of the area in the product color database that stores data of spectroscopic images of products, product reflectance images indicating spectral reflectances of pixels, or product images in a defined observation environment. The product information index is an index such as an address of the area in the product color database that stores information indicating spectral reflectances of products and types of materials. The materials may, for example, be types of fabric materials in the case of clothing, and may include rayon, nylon, polyester, acrylic, polyurethane, linen, cotton, wool, and denim. Thus, material or color characteristic information of a chart may be designed depending on the type of the material, or color conversion may be performed using color conversion information different for each material.

Figure 8:
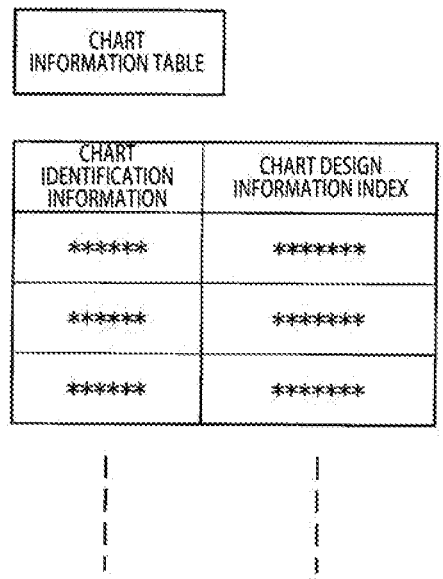
FIG. 8 is a diagram illustrating a configuration example of a chart information table in a chart information database 13.

FIG. 8 is a diagram illustrating a configuration example of a chart information table in the chart information database 13. The chart information table is written to and stored in the chart information database 13. For each record, the chart information table is provided with a column of a chart design information index, being correlated with the chart identification information. The chart identification information is information for identifying each chart as a colored or non-colored object. The chart design information index is color characteristic information of a pattern element of a chart (e.g., array pattern element of color swatches) and each motif (color swatch) in the pattern element.

Figure 9:
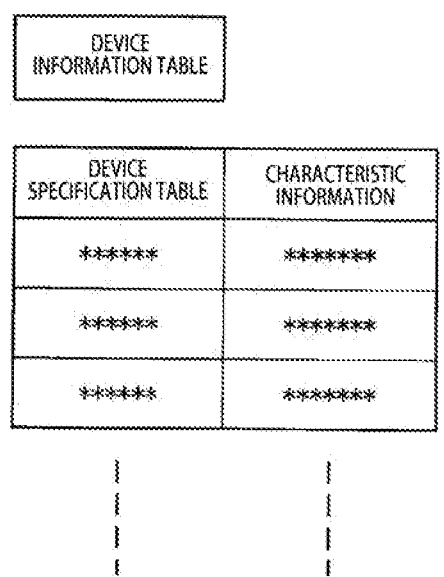
FIG. 9 is a diagram illustrating a configuration example of a device information table in a device information database 14.

FIG. 9 is a diagram illustrating a configuration example of a device information table in the device information database 14. The device information table is written to and stored in the device information database 14.

For each record, the device information table is provided with columns of device specification information and characteristic information of the device indicated by the device specification information.

The device specification information is model information of a camera, printer and a display device, or device information, or the like. The device information may include, for example, a model number of the camera, if it is a digital camera, or a model number of the CCD (charged coupled device) used for the digital camera, a model number of the printer, if it is an inkjet printer, or a model number of the inkjet head used for the inkjet printer, and a model number of the display device, if it is a liquid crystal display, or a model number of the liquid crystal panel used for the liquid crystal display.

If the device is a camera, the characteristic information may include, for example, spectral sensitivity information in imaging, as camera characteristics. If the device is a printer, the characteristic information may include, for example, information about the printed colors outputted from the printer, such as an ICC profile and spectral information of the inks, and medium information of the paper used for printing a product sales image, as printer characteristics. If the device is a display device, the characteristic information may include, for example, luminescence information, such as an ICC profile, spectral radiance, and tristimulus values, as display characteristics.

With reference to the drawings, a product sales support method according to the present embodiment will be sequentially described, including the operation of the product sales support system 1 in the flows of Processes F1, F2, F3 and F4

<First Example of Color Conversion Information Generation of Process F1>

Figure 10:
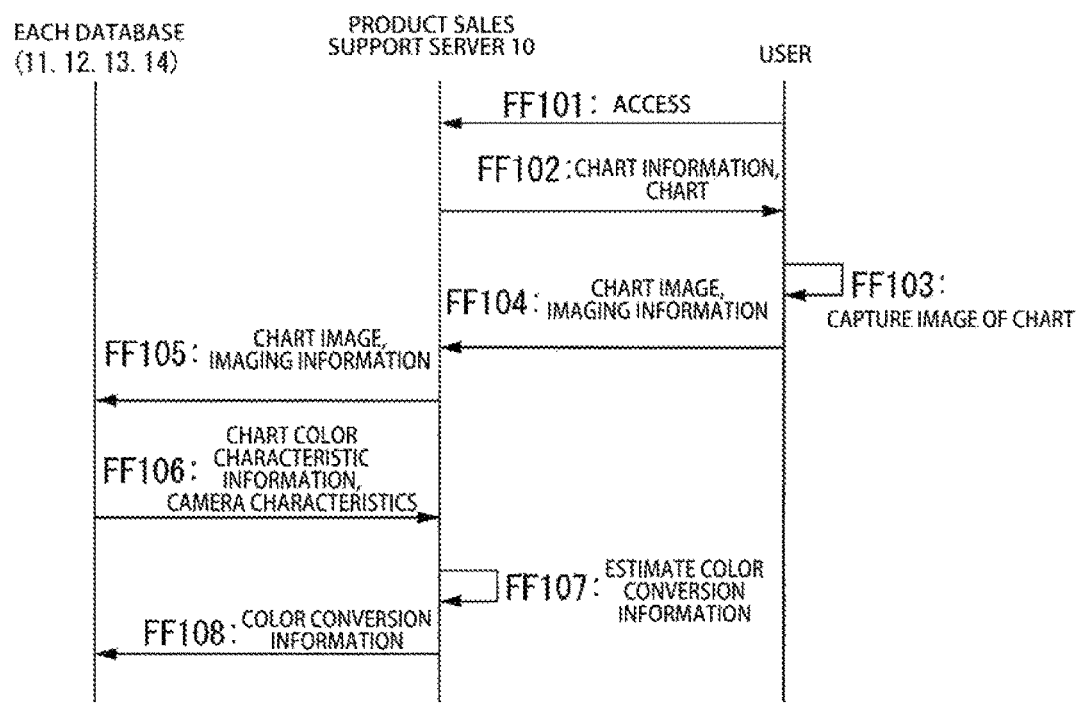
FIG. 10 is a sequence diagram illustrating a processing flow of color conversion information generation for product sales support, using the product sales support system 1.

FIG. 10 is a sequence diagram illustrating a processing flow of color conversion information generation for product sales support, using the product sales support system 1. In FIG. 10, the user database 11, the product color database 12, the chart information database 13, and the device information database 14 are described as databases (11, 12, 13 and 14).

Step FF101:

The user accesses a product sales support site (i.e., the product sales support server 10) via the user terminal 3. For example, the user may log in with user identification information and request registration of user environment information and user attribute information, i.e., attribute information of the user. The user attribute information includes the date and time of registration in addition to the user's gender, address, phone number, birthday, wedding anniversary, school graduation date, qualification acquisition date, occupation, favorite colors, favorite articles, favorite food, and hobbies.

Thus, the data input/output unit 101 searches through the user data table of the user database 11 with the user identification information used when accessing the site, to thereby confirm which EC sites the user is registered with.

Step FF102:

Then, the chart supply unit 102 extracts, for example, a chart preset in the EC site from the chart information table of the chart information database 13, as a chart corresponding to product images of a product group sold by the EC site.

The operating company A delivers (or mails) the chart (or chart information) of the chart identification information extracted from the chart information table to the user's address.

Step FF103:

The user captures an image of the chart supplied from the operating company in the observation environment where the user would observe the products, e.g., at a predetermined position of a room or the like where the user terminal 3 is installed.

Step FF104:

Then, the user transmits the chart image, imaging information in imaging, and user identification information of the user to the product sales support site via the user terminal 3.

Step FF105:

The data input/output unit 101 outputs the chart image supplied from the user terminal 3 to the image acquisition unit 103.

Also, the data input/output unit 101 outputs the imaging information supplied from the user terminal 3 to the device information acquisition unit 104 and the color conversion information calculation unit 105.

Then, the image acquisition unit 103 writes and stores the data of the chart image in the color conversion information table of the user database 11, being correlated with the user identification information.

The device information acquisition unit 104 searches through the device information table of the device information database 14 and reads camera characteristics corresponding to the device specification information contained in the imaging information.

Then, the device information acquisition unit 104 writes and stores the read camera characteristics in the column of camera characteristics in the color conversion information table.

Step FF106:

The color conversion information calculation unit 105 reads the chart image and the chart identification information from the color conversion information table, being correlated with the user identification information.

Then, the color conversion information calculation unit 105 reads the chart design information index sent to the user, from the chart information table of the chart information database 13, based on the read chart identification information. The color conversion information calculation unit 105 reads color characteristic information of the chart from the storage area indicated by the chart design information index.

The color conversion information calculation unit 105 reads the camera characteristics from the color conversion information table, being correlated with the user identification information.

Step FF107:

The color conversion information calculation unit 105 calculates color conversion information from the chart image, the camera characteristics, and the color characteristic information of the chart.

The color conversion information is information used for converting the color characteristic information into colorimetric values that would be acquired in the observation environment of the registered user.

Step FF108:

The color conversion information calculation unit 105 writes and stores the calculated color conversion information in the color conversion information table, being correlated with the user identification information.

When writing the color conversion information in the color conversion table, the color conversion information calculation unit 105 extracts the time of capturing the chart image from the date and time information contained in the imaging information, and writes and stores the time period (morning time period, daytime period, or night time period) corresponding to the calculated color conversion information in the column of specification data. Furthermore, the information contained in the imaging information, such as position information based on GPS information, user specification information, or the like, may be recorded.

The above description is for the case in which a chart is delivered and supplied to a user. In this case, a chart for which color conversion information is calculated may be printed in advance together with the chart identification information and the user identification information so as to be adjacent to them, on the front or back of the registration card of the EC site, and an image of the chart identification information and the user identification information may be captured by the user together with the chart. The chart identification information may be a barcode, a 2D barcode (graphic information), or the like. Thus, the chart may be easily correlated with the user. Furthermore, the chart identification information may be colored, so that an image thereof can be used not only for correlating with the user using the user identification information, but also for simultaneously acquiring color conversion information.

Alternatively, at the time of registration (at the time of user registration) with the EC site, the operating company A running the product sales support system 1 may enclose the chart when delivering a description for product purchases on the EC site, or the chart identification information and the user identification information (character information or graphic information) may be directly printed on the envelope for delivering the description or on the delivery note, or with the address, or on the packaging material. Furthermore, the chart identification information and the user identification information (character information or graphic information) may be colored, so that an image thereof can be used for acquiring color conversion information.

In the present embodiment, a chart designed in advance based on chart design information is used for estimating color conversion information for the user's observation environment. However, an instruction for capturing an image of the package of a generally distributed product, other than this chart, may be provided as chart information. Capturing an image of the package, the user can transmit the image to the product sales support site via the user terminal 3, as in the processing of Step FF104 described above. If the package is a generally used package, color characteristic information of a predetermined printed region can be easily obtained and thus color conversion information can be calculated.

In the present embodiment, a chart to be sent to the user may be prepared based on the user's observation environment (information about time period of observing an article, location of observation, etc.), using color conversion information of another user with a similar observation environment who is different from the user who performs registration and to whom the chart is sent.

In the first example, the chart information (first color sample information) is a chart (a combination of color swatches), i.e., color sample specification information specifying use of a chart provided as a color sample.

The chart information does not have to be a chart, but may be information with which a chart can be specified by the user. For example, the chart information may be the manufacturer name, product name, or product number of the chart, or may be an image of the chart, or the like.

In the first example, using a chart, many included color characteristics (colors of the color swatches) can be provided, and there may be a large number of included colors. Thus, a chart can be adapted for generating color conversion information at the time of registration, or for any phase such as of updating the color conversion information.

Furthermore, preparing a chart suitable for each user, the accuracy of estimating each user's lighting environment can be improved.

The chart information (first color sample information) does not have to be a chart (a combination of color swatches), but may be color sample specification information specifying a usage card for services, which is acquired through registration, as a color sample.

In this case, the usage card used as a chart may be a membership card, medical examination ticket, or the like.

In this case, the chart information is color sample specification information with which a usage card used as a sample can be specified. For example, the chart information may be the service name corresponding to the usage card, the name of the entity providing the services, the name of the usage card (XX card or YY service card), or image data of the usage card.

An advantageous effect of using the usage card as a color sample may be that the user can save time for newly acquiring a color sample because the usage card can be acquired at the start of using the services.

Another advantageous effect of using the usage card as a color sample may be that the user is less likely to lose the usage card because it is an item required for receiving the predetermined services.

The chart information (first color sample information) does not have to be a chart (a combination of color swatches), but may be color sample specification information specifying a structure as a chart that is a color sample.

In this case, the structure used as a chart may be a building or construction (the entirety or a specified part thereof) established in a place where ordinary people can enter, or a postbox or a traffic sign, or an exterior, signboard or interior of a chain store, or the like.

In this case, the chart information is color sample specification information with which a structure used as a sample can be specified. For example, the chart information may be the name of the structure, the address or location of the structure, the information indicating a part of the structure in the case where a specific part of the structure is designated, or image data of the structure.

An advantageous effect of using a structure as a color sample may be that, in the case of a signboard, exterior, interior or the like of a store, for example, the user may be triggered to visit the store and this will be an advantage for the store.

For example, a product directly observed by the user in a clothing store can be compared with a product image on the display screen provided by the EC site, or product combinations can be coordinated.

Furthermore, the colors of clothing which the user is going to wear in a restaurant or cafe can be confirmed there by visually observing the product image on the display screen provided by the EC site.

Furthermore, using a signboard, exterior, interior or the like of a predetermined store as a chart, a product image can be visually observed and confirmed at a travel destination on a display screen provided by the EC site.

<Second Example of Color Conversion Information Generation of Process F1>

Figure 11:
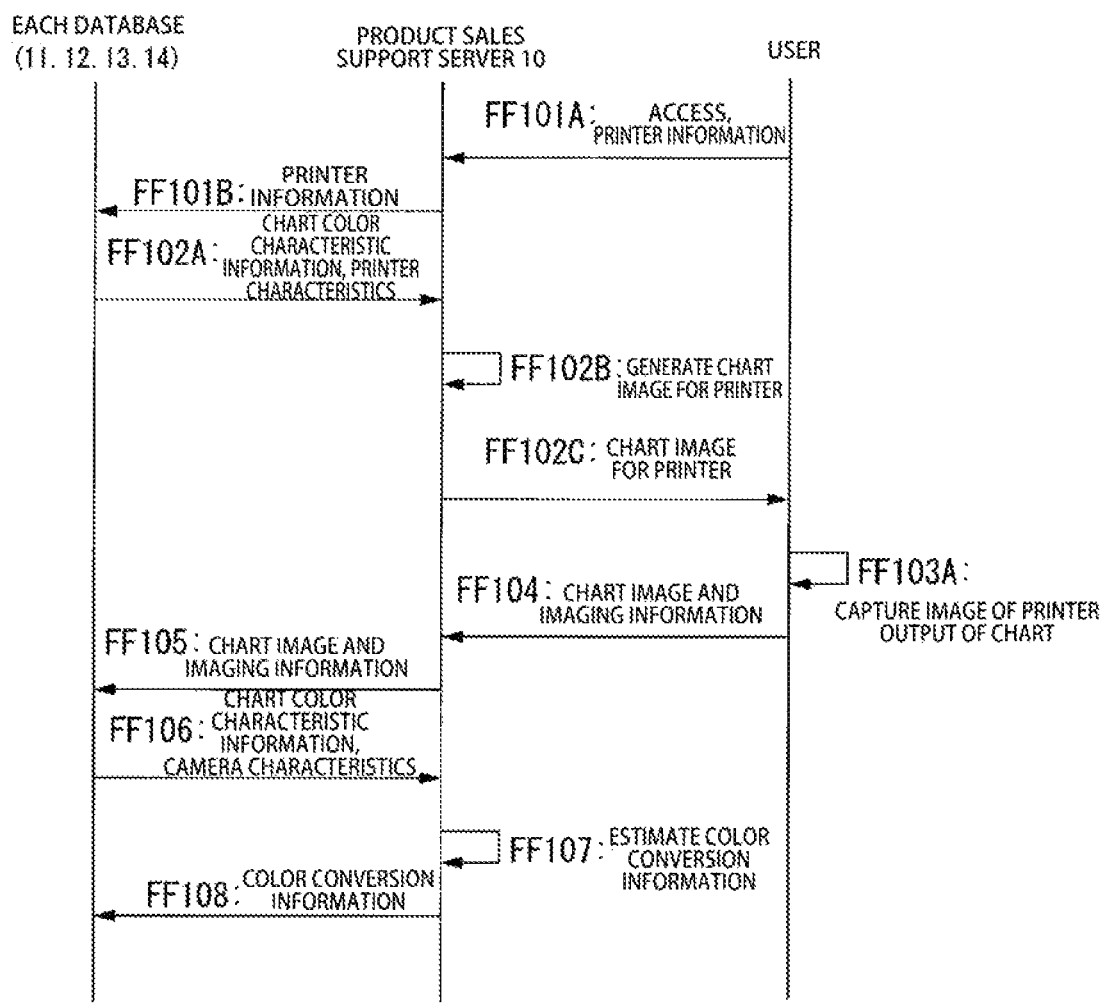
FIG. 11 is a sequence diagram illustrating a processing flow of user environment information registration for product sales support, using the product sales support system 1.

FIG. 11 is a sequence diagram illustrating a processing flow of user environment information registration for product sales support, using the product sales support system 1. In FIG. 11, the user database 11, the product color database 12, the chart information database 13, and the device information database 14 are described as databases (11, 12, 13 and 14).

Step FF101A:

The user accesses a product sales support site via the user terminal 3. For example, the user may log in with user identification information and request registration of user environment information. When requesting this, the user specifies an available printer, such as the user's printer or a printer set up in a store, so that the user specification and the device specification information (printer information) obtained from the information on a printer information recording device (not shown) are registered at the same time.

Thus, the data input/output unit 101 searches through the user data table of the user database 11 with the user identification information used when accessing the site, to thereby confirm which EC sites the user is registered with.

Step FF101B:

The data input/output unit 101 outputs the user identification information and the printer information inputted from the user to the device information acquisition unit 104.

Then, the device information acquisition unit 104 reads characteristic information (printer characteristics) from the device information table of the device information database 14, based on the printer information.

The device information acquisition unit 104 writes and stores the read printer characteristics in the column of printer characteristics in the user data table, being correlated with the user identification information.

Step FF102A:

The chart supply unit 102 may extract, for example, a chart preset in the EC site from the chart information table of the chart information database 13, as a chart corresponding to product images of a product group sold by the EC site.

The chart supply unit 102 reads color characteristic information of the chart from the area indicated by the chart design information index of the extracted chart.

Also, the chart supply unit 102 reads printer characteristics of the printer used by the user from the user data table, being correlated with the user identification information.

Step FF102B:

The chart supply unit 102 generates a chart image for printer that is to be supplied to the user as a chart, using the color characteristic information of the chart and the printer characteristics, and also using the spectral radiance of the light source (e.g., CIE_D50 or CIE_D65) in a defined observation environment.

Step FF102C:

The chart supply unit 102 transmits the generated data of the chart image for the printer to the user terminal 3 of the user accessing for registration.

Step FF103A:

The user prints the chart image for the printer, supplied to the user terminal 3 from the product sales support system 1, as a chart, using the printer whose printer information has been registered.

The user captures an image of the chart printed using the printer in the observation environment where the user would observe the product, e.g., at a predetermined position of a room or the like where the user terminal 3 is installed.

Description of Steps FF104 to FF108 is omitted because they are similar to the steps described in the first example of the user environment information registration.

In the second example, the chart information (first color sample information) is color sample realization information required for printing (realizing) the chart (a combination of color swatches) using the user's printer or printing device. The printer used for printing may be any of a 2D (dimension) printer, 2.5D printer, 3D printer, and the like.

The chart information may include, for example, image data of the chart, parameters used for printing the chart (if the model of the user's printer is specified), the printer model (if the model of the user's printer is not known), and the like.

In the second example, the following advantageous effects can be achieved.

Specifically, in the second example, the chart is not required to be directly delivered and accordingly the cost of delivering the chart can be reduced.

In the second example, the chart can be acquired at the time of registration, so that a color sample is available, saving the time that would be required for the delivered chart to arrive.

In the second example, the chart can be easily re-acquired using the color sample information as color sample realization information if the chart is lost, or the chart is damaged or becomes dirty.

In the second example, there are many variations in color characteristics of the color swatches configuring the chart, and thus a large amount of information about the user's lighting environment (characteristics of the light source, etc.) can be expected to be acquired (e.g., the wavelength resolution for acquiring the spectral radiant intensity can be improved).

In the second example, for example, a color sample having color characteristic information can be easily prepared for improving the accuracy of estimating the information about the lighting environment corresponding to the user's lighting environment where the user captures an image or make an observation, by inputting information about the lighting environment (information indicating the type of the light source as being a fluorescent light, incandescent light bulb, or the like).

The above configuration has been provided assuming a printer or a printing device of the user. However, the configuration may assume use of a printer or a printing device installed in a specific facility (e.g., a place, such as a convenience store, included in color sample realization information).

In this configuration, the color sample realization information may be specification information that is information specifying a specific facility where the printer or the printing device for printing the chart is installed (e.g., the address of the facility, the name of the facility, the floor number in the building of the facility, a name specifying the room, etc.), or a print number for a convenience store printer, and the like.

In the case of the configuration in which a printer or a printing device of a specific facility is used for printing a chart, the following advantageous effects can be obtained in addition to advantageous effects similar to those of the case of using a printer or a printing device of the user.

If a printer of a specific facility is used, printer models are not so diversified as in the case of the printers or printing devices of users, i.e., models are limited. Therefore, time that would be required for preparing color sample realization information can be saved.

If a printer of a specific facility is used, printer maintenance is frequent and therefore the accuracy of color characteristics of the chart to be printed can be improved.

If a printer of a specific facility is used, the printer or the printing device may exhibit high performance depending on the model and therefore the accuracy of color characteristics of the chart to be printed can be improved.

The above configuration has been provided assuming a printer or a printing device of the user. However, the configuration may assume that a color sample is displayed by a display device.

For example, an image of a predetermined chart (first color sample) or an additional chart (second color sample) used for updating color conversion information described later may be displayed on a display device, e.g., a display screen of electronic paper, a reflective liquid crystal display, or the like, having a configuration in which the color characteristics of the image displayed on the display screen are affected by the lighting environment.

In this configuration, the color sample realization information as color sample information may be information prompting display of a color sample on the display screen of the display device provided to the user, and information on an image of the color sample to be displayed on the display screen of the display device.

If a color sample is displayed on the display screen of electronic paper or a reflective liquid crystal display, there may be many variations in color characteristics of the color swatches configuring a chart or additional chart, and thus a large amount of information about the user's lighting environment (characteristics of the light source, etc.) can be expected to be acquired (e.g., the wavelength resolution for obtaining the spectral radiant intensity can be improved).

If a color sample is displayed on the display screen of electronic paper or a reflective liquid crystal display, a plurality of color samples different from each other can be used as color samples, such as a chart as a first color sample and an additional chart as a second color sample, to be displayed on the display screen of the display device, while being arbitrarily changed. Thus, the cost of providing color samples can be reduced compared to the case where the first and second color samples are generated and provided to the user each time the color conversion information is generated and updated.

<Example of Color Conversion and Display of Product Image of Process F2>

Figure 12:
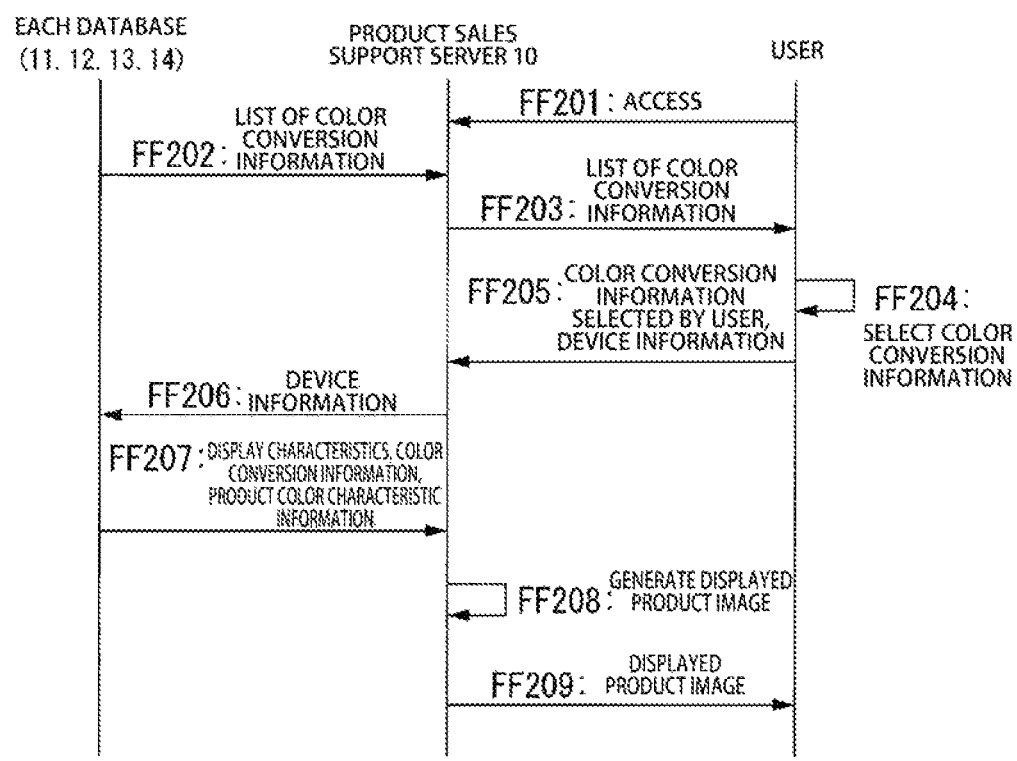
FIG. 12 is a sequence diagram illustrating a processing flow of color conversion and display of a product image for product sales support, using the product sales support system 1.

FIG. 12 is a sequence diagram illustrating a processing flow of color conversion and display of a product image for product sales support, using the product sales support system 1. In FIG. 12, the user database 11, the product color database 12, the chart information database 13, and the device information database 14 are described as databases (11, 12, 13 and 14).

Step FF201:

The user accesses a product sales support site via the user terminal 3. For example, the user may log in with user identification information and request to view product images of the EC site which the user registers with.

Thus, the data input/output unit 101 searches through the user data table of the user database 11 with the user identification information used when accessing the site, to thereby confirm which EC sites the user is registered with.

Step FF202:

The estimated image generating unit 106 searches through the user data table of the user database 11 with the user identification information to obtain color conversion information used when generating a displayed product image, and extracts the color conversion information table of the accessing user.

Step FF203:

Then, the estimated image generating unit 106 displays a list of specification data of the color conversion information table on the display screen of the user terminal 3, as a display for the user to select color conversion information.

For the display, character strings are used, such as "morning time period", "daytime period", "night time period", and "preset color conversion information (ordinary office, sunny conditions outdoors, etc.)", which indicate observation conditions in an observation environment.

Step FF204:

The user selects a condition corresponding to the environment where the user observes the actual product, from the list of specification data on the display screen of the user terminal 3.

In this case, for example, if the specified time for the product is 10 am, the time of observation in the observation environment is within the morning time period. Accordingly, the user may select the morning time period from the list of specification data on the display screen of the user terminal 3. If the user always returns home around 8 pm, the time of observation in the observation environment is within the night time period. Accordingly, the user may select the night time period from the list of specification data on the display screen of the user terminal 3. If the delivery address is not the observation environment but a company office, the user may select the preset color conversion information from the list of specification data on the display screen of the user terminal 3.

Step FF205:

The user terminal 3 transmits the observation condition selected by the user, e.g., a character string selected from among "morning time period", "daytime period", "night time period", "office", "restaurant", and "preset color conversion information", as information, to the product sales support system 1.

In this case, the user terminal 3 transmits device specification information (device information) that specifies the display, which will be used as a display screen, to the product sales support system 1 together with the character string information.

Step FF206:

The data input/output unit 101 outputs the device specification information supplied from the user terminal 3 to the device information acquisition unit 104.

The device information acquisition unit 104 searches through the device information table of the device information database 14 and reads display characteristics corresponding to the device information, i.e., the device specification information.

The device information acquisition unit 104 writes and stores the read display characteristics in the column of display characteristics in the color conversion information table.

Step FF207:

Then, the estimated image generating unit 106 reads the color conversion information and the display characteristics from the color conversion information table. The estimated image generating unit 106 reads product color characteristic information for each product observed by the user from the product color data table of the product color database 12.

Step FF208:

Then, the estimated image generating unit 106 converts the colorimetric values of product color information in a defined observation environment into colorimetric values in the observation environment of the user, based on the color conversion information, and generates data for the displayed product image, being correlated with the display characteristics.

Step FF209:

The estimated image generating unit 106 transmits the generated data for the displayed product image to the user terminal 3 via the data input/output unit 101.

Thus, the user can visually observe a product image on the display screen of the user terminal 3 in color as in the case of observing the actual product in the observation environment of the user.

<First Example of Information Addition for Color Conversion Information Update of Process F3>

Figure 13:
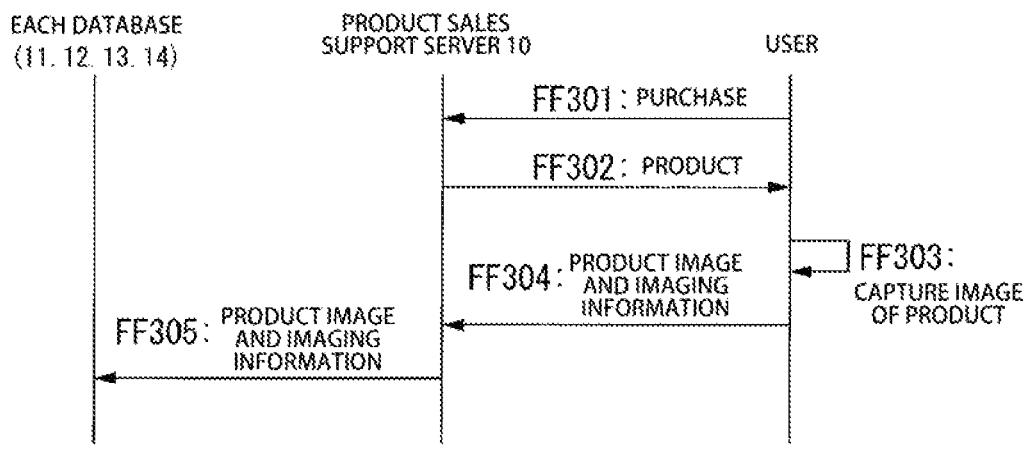
FIG. 13 is a sequence diagram illustrating a processing flow of information addition for color conversion information update, using the product sales support system 1.

FIG. 13 is a sequence diagram illustrating a processing flow of information addition for color conversion information update, using the product sales support system 1. In FIG. 13, the user database 11, the product color database 12, the chart information database 13, and the device information database 14 are described as databases (11, 12, 13 and 14).

Step FF301:

The user performs a purchase process with respect to the product sales support system 1 for the product corresponding to the product image, based on the displayed product image displayed on the display screen of the user terminal 3 of the user in Process F2.

Thus, in the product sales support system 1, the product sales processing unit 107 transmits the product specification information (product identification information, etc.) supplied from the user terminal 3 to the EC site handling the product, as product purchase information, together with the user identification information.

Step FF302:

In this case, with the shipment of the product from the EC site, the color conversion information calculation unit 105 of the product sales support system 1 transmits information to the EC site via the data input/output unit 101, so that the EC site is instructed to deliver an additional chart (second color sample) or additional chart information (second color sample information), or both, to the user together with the product.

Then, according to the product purchase information supplied from the product sales support system 1, the EC site delivers the product specified by the user to the address registered by the user, attaching the additional chart or the additional chart information, or both, to the product.

Step FF303:

When the product is delivered, the user refers to the additional chart information and captures an image of the product using an imaging device in the observation environment according to the instruction of the additional chart information to acquire a product image.

Step FF304:

Then, the user accesses the product sales support site (product sales support system 1) and transmits the product image data, i.e., an image of the delivered product, to the product sales support site together with imaging information when imaging the product.

Step FF305:

When the product image data and the imaging information are supplied from the user terminal 3, the data input/output unit 101 outputs the product image (an example of an additional chart image) to the image acquisition unit 103.

Also, the data input/output unit 101 outputs the imaging information supplied from the user terminal 3 to the device information acquisition unit 104 and the color conversion information calculation unit 105.

Then, the image acquisition unit 103 writes and stores the product image data (an example of an additional chart image) in the color conversion information table of the user database 11, being correlated with the user identification information.

The device information acquisition unit 104 searches through the device information table of the device information database 14 and reads camera characteristics corresponding to the device specification information contained in the imaging information.

Then, the device information acquisition unit 104 writes and stores the read camera characteristics in the column of camera characteristics in the color conversion information table.

In the case of the present first example, in Process F4, the color conversion information calculation unit 105 re-calculates color conversion information using the product image (an example of a chart image), the color characteristic information of the product, and the imaging information, and updates the existing color conversion information to the newly calculated color conversion information. This calculation is performed as in generating color conversion information in Process F1 described above.

In this case, the color conversion information may be updated through update processing based on numerical calculation with a polynomial or algorithm adjustment such as coefficient adjustment of a model function using a multidimensional function, or through update processing of a model using AI (e.g., machine learning).

Then, the color conversion information calculation unit 105 overwrites the existing color conversion information in the color conversion information table in the user database 11 with the new color conversion information calculated using the above calculation method, for storage and update.

The present first example provides a configuration in which a product purchased from an EC site is used as an additional chart (second color sample).

In the present first example, the additional chart as a second color sample is, for example, a bag, shoes, hat, clothing item, cosmetic product, and the like.

The additional chart information (second color sample information) is color sample specification information with which a product purchased by the user can be specified, and may include, for example, the product manufacturer name, product name, product number (or serial number), image data of the product, date and time of purchase by the user, and symbols or code indicating the URL for viewing the product (e.g., 2D barcode).

An advantageous effect of using a purchased product as a color sample may be that use of the product delivered to the user as an additional chart (second color sample) can save time for the user to obtain a color sample for use as an additional chart.

An advantageous effect of using a purchased product as a color sample may be that the color conversion information can be updated so as to be optimized into the user's desired colors (colors of the purchased product), thereby improving estimation accuracy of color characteristics even more for the user's lighting environment, based on color conversion information.

An advantageous effect of using a purchased product as a color sample may be that materials, such as a textile product or leather product, other than printed matter can be used as a second color sample, and thus color conversion information can be changed so as to improve color reproduction accuracy of the articles.

The additional chart (second color sample) is provided additionally to the product purchased on the EC site. For example, the wrapping paper of the product, the box enclosing the product, the delivery note, the envelope enclosing the delivery note, or the like may be used as an additional chart.

In this case, the additional chart information is color sample specification information with which the user can specify the above additional item for use as a sample. For example, the additional chart information may include the name of the additional item or indicate a predetermined part of the additional item for use as a color sample, in addition to the product data, such as the product name of the article, the product number, and image data including an image of the article.

An advantageous effect of using the additional item of a product as a color sample may be that the user can save time for newly obtaining an additional chart as a second color sample because the additional item is an article delivered to the user together with the product.

As the additional chart information, multiple types of articles, e.g., the delivered product and the additional item of the product, may be specified for use as a second color sample, instead of color sample specification information specifying one article.

Alternatively, the additional chart information (second color sample information as color sample specification information) may indicate use of a generally used product (article as a consumer product widely distributed in general for home use) as an additional chart (color sample, i.e., second color sample).

The additional chart (second color sample) is an industrial product that is a generally distributed article as a consumer product. For example, a plastic toy, tableware, etc. may be used as an additional chart.

In this case, the additional chart information is color sample specification information with which the above industrial product can be specified for use as a sample, and may include, for example, the product name, the product number, and image data including an image of the industrial product.

An advantageous effect of using an industrial product as a color sample may be that there is little deviation in color characteristics between articles manufactured as having the same colors because the color characteristics of the articles are managed with high accuracy in manufacturing processes. Thus, an industrial product can be used as a color sample having high accuracy.

An advantageous effect of using an industrial product as a color sample may be that, as the product is more generally used, there is higher probability for the user to have this product, and the user can save time for obtaining a color sample.

The additional chart (second color sample) may be a package in which a generally distributed product as a consumer article is sealed or enclosed. For example, a package for a detergent, cosmetic product, pharmaceutical product, etc. may be used as an additional chart.

In this case, the additional chart information is color sample specification information with which a product using the above package can be specified for use as a sample, and may include, for example, the product name or the product number of the article, and image data including an image of the article.

An advantageous effect of using a package as a color sample may be that there is little deviation in color characteristics between packages because the color characteristics in the color combination of the packages are managed with high accuracy in manufacturing processes. Thus, a package can be used as a color sample having high accuracy.

An advantageous effect of using a package as a color sample may be that relatively many types of color characteristics are used for color combination. Thus a package can be used as a color sample with which color conversion information can be generated with high accuracy.

An advantageous effect of using a package as a color sample may be that, as the package is more generally used, there is higher probability for the user to have this package, or otherwise, the package is easily available.

The color sample specification information does not necessarily have to be a specific article (including product), industrial product, or package mentioned above, but may be information corresponding to the category of an article, industrial product, or package. For example, categories that can be specified may be cake boxes, plastic bottles, products purchased in specific EC sites, and the like.

Preferred examples of categories other than the above may be categories corresponding to articles with color combinations including red, articles with color combinations including blue, and articles with color combinations including green.

In the configuration of specifying a category mentioned above, the color conversion information generation system of the present embodiment can provide a category of a corresponding article as color sample specification information for specifying a color sample to compensate for missing colors in the colors of the article shown with a specific category, if these colors are estimated to be missing based on the RGB values in the chart mage of the color sample (first color sample or second color sample) captured by the user.

In the configuration described above, the color sample used for imaging is not specified, but color characteristic information corresponding to the imaged color information can be acquired by recognizing the color sample using the chart information database 13.

<Second Example of Information Addition for Color Conversion Information Update of Process F3>

Figure 14:
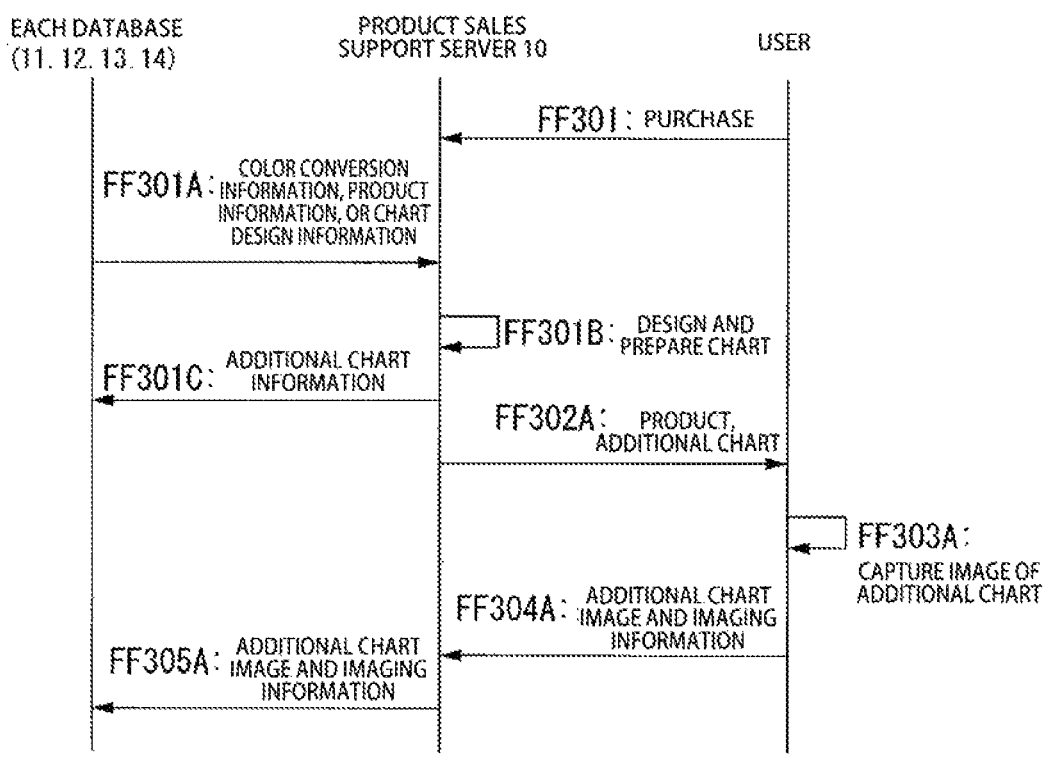
FIG. 14 is a sequence diagram illustrating a processing flow of information addition for color conversion information update, using the product sales support system 1.

FIG. 14 is a sequence diagram illustrating a processing flow of information addition for color conversion information update, using the product sales support system 1. In FIG. 14, the user database 11, the product color database 12, the chart information database 13, and the device information database 14 are described as databases (11, 12, 13 and 14). Step FF301 is similar to one in the first example.

Step FF301A:

With shipment of the product from the EC site, the color conversion information calculation unit 105 of the product sails support system 1 transmits information to the EC site via the data input/output unit 101 to instruct delivery of additional chart information to the user together with the product. In the case of the present second example, the additional chart information indicates transmission of an image of a new additional chart together with imaging information.

The chart supply unit 102 reads color conversion information of the user who has purchased the product from the color conversion information table of the user database 11.

Also, the chart supply unit 102 reads product information of the product purchased by the user from the product color data table of the product color database 12.

The chart supply unit 102 reads chart design information of the chart sent to the user, from the chart information database 13.

Step FF301B:

Then, the chart supply unit 102 extracts colors using a predetermined algorithm and generates chart design information of an additional chart composed of color swatches of the extracted colors. The colors in this case correspond to a combination of light source metamerism or observer metamerism in the user's imaging environment in the color conversion information, product information of the product purchased by the user, the chart design information of the chart already transmitted, and the like. The additional chart may be prepared incorporating the type of the light source (white light source, fluorescent light, LED (light emitting diode), etc.) and the like in the observation environment estimated from the existing color conversion information.

As an example, with the above algorithm, a chart image may be received and acquired from the user terminal to extract colors from the color distribution of the chart image, which are required for improving the accuracy of color conversion information generated from the chart image. Then, colors to be added to an additional chart may be calculated based on the color characteristic information of the extracted colors to thereby design the additional chart.

The additional chart information delivered with a product may be shown by the information transmitted by the user to the product sales support system 1, with the inclusion of a product image of the product purchased by the user together with the provided additional chart.

The product sales support system 1 extracts colors (as information missing for generating color conversion information) required for improving the accuracy of color conversion information generated from the chart image, from the color distribution of the product image and additional chart image received and acquired from the user terminal. Then, colors to be added to an additional chart may be calculated based on the color characteristic information of the extracted colors to thereby design the additional chart.

Then, the operating company A prepares an additional chart (e.g., prints it on a paper medium or the like) according to the chart design information of the additional chart.

Step FF301C:

Then, the chart supply unit 102 writes and stores the chart design information of the generated additional chart in the chart information table of the chart information database 13, with the chart identification information imparted.

Step FF302A:

Then, the operating company A encloses the prepared additional chart with the product sent from the EC site, or directly delivers it to the user.

According to the product purchase information supplied from the product sales support system 1, the EC site delivers the product specified by the user to the address registered by the user, with the additional chart information attached to the product.

Step FF303A:

When the additional chart is delivered together with the product, the user refers to the additional chart information attached to the product and captures an image of the additional chart using an imaging device in the observation environment according to the instruction of the additional chart information to acquire an additional chart image.

Step FF304A:

Then, the user accesses the product sales site (product sales support system 1) and transmits the data of the additional chart image, i.e., an image of the delivered additional chart, to the product sales site together with imaging information when imaging the additional chart.

Step FF305A:

When the data of the additional chart image and the imaging information are supplied from the user terminal 3, the data input/output unit 101 outputs the data of the additional chart image to the image acquisition unit 103.

Also, the data input/output unit 101 outputs the imaging information supplied from the user terminal 3 to the device information acquisition unit 104 and the color conversion information calculation unit 105.

Then, the image acquisition unit 103 writes and stores the data of the additional chart image in the color conversion information table of the user database 11, being correlated with the user identification information.

The device information acquisition unit 104 searches through the device information table of the device information database 14 and reads camera characteristics corresponding to the device specification information contained in the imaging information.

Then, the device information acquisition unit 104 writes and stores the read camera characteristics in the column of camera characteristics in the color conversion information table.

In the case of the present second example, in Process F4, the color conversion information calculation unit 105 re-calculates color conversion information using the chart image, the additional chart image, the color characteristic information of the chart, the color characteristic information of the additional chart, and the imaging information, and updates the existing color conversion information to the newly calculated color conversion information. This calculation is performed as in generating color conversion information in Process F1 described above. The method of updating color conversion information is similar to the method described in the first example of the present process F3.

The present second example has described a configuration in which an additional chart is prepared by the operating company A and the completed additional chart is delivered to the user. However, as in Steps FF102B and FF102C of FIG. 11 in the second example of user environment information registration of Process F1, an image of an additional chart for printer use may be generated and transmitted to the user terminal 3. In this case, the additional chart may be outputted from a printer available for the user, and an additional chart image including an image of the outputted additional chart and the imaging information may be transmitted to the product sales support system 1.

By combining the present first and second examples, the product and the additional chart may be imaged together, and the image of the product and the additional chart captured together may be transmitted to the product sales support system 1.

<Third Example of Information Addition for Color Conversion Information Update of Process F3>

Figure 15:
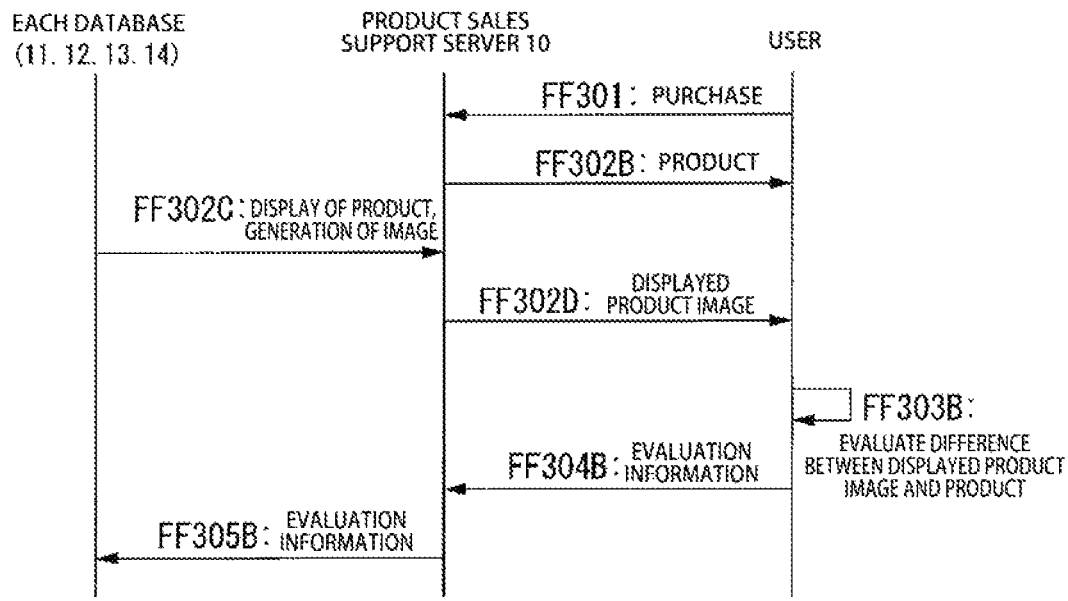
FIG. 15 is a sequence diagram illustrating a processing flow of information addition for color conversion information update, using the product sales support system 1.

FIG. 15 is a sequence diagram illustrating a processing flow of information addition for color conversion information update, using the product sales support system 1. In FIG. 15, the user database 11, the product color database 12, the chart information database 13, and the device information database 14 are described as databases (11, 12, 13 and 14). Step FF301 is similar to one in the first example.

Step FF302B:

According to the product purchase information supplied from the product sales support system 1, the EC site delivers the product specified by the user to the address registered by the user, attaching the additional chart information informed by the operating company A to the product. In the present third example, the additional chart information indicates to compare the colors of the product image (product image of the product purchased by the user) transmitted to the user terminal 3, with the colors of the actual product observed in the observation environment, and to transmit evaluations of the product image, such as adjustment data and comments.

Step FF302C:

As in Steps FF205, FF206, FF207 and FF208 of Process F2 already described, the estimated image generating unit 106 generates a displayed product image to be displayed on the display screen of the user terminal 3.

Step FF302D:

The estimated image generating unit 106 transmits the generated data for the displayed product image to the user terminal 3 via the data input/output unit 101.

Thus, the user can visually observe a product image observed when purchasing the product, i.e., the product image having estimated colors as they would appear when observing the actual product in the observation environment of the user, on the display screen of the user terminal 3.

Step FF303B:

The user observes the delivered product and the product image displayed on the display screen of the user terminal 3 to compare the visually observed colors with each other.

Then, the user evaluates color difference by sequentially adjusting the adjustment bars of the RGB color components (red, green and blue) displayed on the display screen of the user terminal 3 to adjust colors of the product image on the display screen to colors of the product actually observed.

Step FF304B:

When the user can recognize that the colors of the product image on the display screen have become similar to the colors of the actually observed product, the user may terminate color adjustment of the displayed image on the display, which involved inputting the amount of adjustment via the RGB color-component adjustment bars or the like.

Thus, the user terminal 3 transmits the product image data whose colors have been adjusted by the user to the product sales support system 1 as evaluation information.

Alternatively, information, such as "Redness is insufficient", may be transmitted to the product sales support system 1 as evaluation information.

Step FF305B:

When the evaluation information resulting from comparison between the displayed product image and the actual product is supplied from the user terminal 3, the data input/output unit 101 outputs the displayed product image of the evaluation information to the image acquisition unit 103.

Then, the image acquisition unit 103 writes and stores the data of the displayed product image, as additional chart information, in the color conversion information table of the user database 11, being correlated with the user identification information.

In the present third example, in Process F4, the color conversion information calculation unit 105 re-calculates color conversion information, based on the already acquired chart image, the imaging information when imaging the chart, the displayed product image as evaluation information or evaluations in the form of comments or the like, the product information of the product in the displayed product image, and the display characteristics of the user terminal 3, to update the existing color conversion information to the newly calculated color conversion information. This calculation is performed as in generating color conversion information in Process F1 described above. The method of updating color conversion information is similar to the method described in the first example of the present process F3.

The present third example has been described using a displayed product image as evaluation information. However, a displayed image of a chart (color sample) may be generated and supplied to the user, and the user may compare the displayed image of the chart with the actual chart to transmit a displayed image of the chart, with the colors thereof being adjusted, to the product sales support system 1 as evaluation information.

The first to third examples have described the timing of transmitting an additional chart as being when the user has purchased a product.

However, additional chart information may be supplied to the user when the user returns the product, and an additional chart image (including the product image and evaluation information) may be acquired to thereby update the color conversion information.

<Fourth example of information addition for color conversion information update of Process F3>

Figure 16:
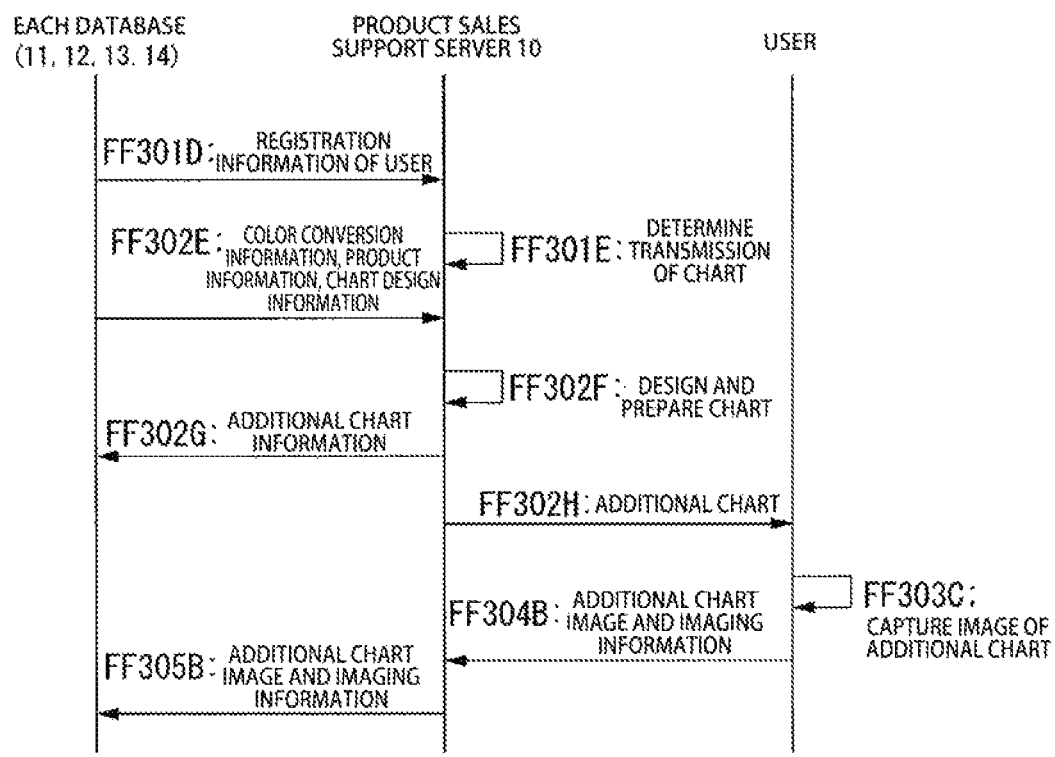
FIG. 16 is a sequence diagram illustrating a processing flow of information addition for color conversion information update, using the product sales support system 1.

FIG. 16 is a sequence diagram illustrating a processing flow of information addition for color conversion information update, using the product sales support system 1. In FIG. 16, the user database 11, the product color database 12, the chart information database 13, and the device information database 14 are described as databases (11, 12, 13 and 14). The present fourth example has a configuration in which an additional chart is supplied to the user at a predetermined point, unlike in the first to third examples in which additional chart information is supplied to the user at product purchase.

Step FF301D:

The chart supply unit 102 refers to the user data table of the user database 11 in a predetermined cycle (e.g., every day) based on the date of the day.

Step FF301E:

The chart supply unit 102 detects whether the date corresponds to any of various time points, such as an anniversary of the user (e.g., birthday, wedding anniversary, school entrance, graduation, or employment in the user attribute information), a predetermined regular update (e.g., every 3 months), and an upgrade due to continuous use (e.g., time point when services received by the user are upgraded depending on the years passed since the start of registration). It should be noted that time points, such as any of, a combination of, or all of an anniversary, regular update, rank up, and years passed, are arbitrarily set for each user.

If the date is detected to correspond to the above time point, the chart supply unit 102 executes the subsequent steps. If the date is detected not to correspond to the above time point, the chart supply unit 102 terminates the flow of FIG. 16 to execute processing again from Step FF301D in the subsequent cycle.

Step FF302E:

The chart supply unit 102 reads color conversion information of the user who has purchased the product from the color conversion information table of the user database 11.

Also, the chart supply unit 102 reads pieces of product information of the products (or one piece of product information if only one product has been purchased) purchased by the user by that time point, from the product color data table of the product color database 12.

The chart supply unit 102 reads chart design information of the chart sent to the user at the time of registration, from the chart information database 13.

Step FF302F:

The chart supply unit 102 extracts colors using a predetermined algorithm and generates (designs) a design chart composed of color swatches of the extracted colors. The colors in this case correspond to any one of or a combination of light source metamerism or observer metamerism in the user's environment of the color conversion information, color characteristic information of the products, i.e., objects to be imaged, viewed by the user in the product sales support site by that time point, color characteristic information of the products purchased via images, the chart design information of the chart already sent, and the like.

Then, the operating company A prepares an additional chart (e.g., prints it on a paper medium or the like) according to the chart design information of the additional chart.

The operating company A is not limited to provide the chart in the form of printed matter, but may use any medium as long as the color characteristic information can be obtained.

Step FF302G:

Then, the chart supply unit 102 writes and stores the chart design information of the generated additional chart in the chart information table of the chart information database 13, with the chart identification information imparted.

Step FF302H:

The operating company A prepares an additional chart (e.g., prints it on a paper medium or the like) according to the chart design information of the additional chart, and transmits the prepared additional chart to the user.

At the above time point, the chart supply unit 102 encloses additional chart information corresponding to the above additional chart with an email transmitted to the user terminal 3 of the user. If the timing corresponds to an anniversary, for example, the additional chart information may be added to the congratulatory message of an email.

Step FF303C:

When the additional chart is delivered together with the additional chart information, the user refers to the additional chart information and captures an image of the additional chart using an imaging device in the observation environment according to the instruction of the additional chart information to acquire an additional chart image.

Step FF304B.

Then, the user accesses the product sales support site (product sales support system 1) and transmits the data of the additional chart image, i.e., an image of the delivered additional chart, to the product sales support site together with imaging information when imaging the additional chart.

Step FF305B:

When the data of the additional chart image and the imaging information are supplied from the user terminal 3, the data input/output unit 101 outputs the data of the additional chart image to the image acquisition unit 103.

Also, the data input/output unit 101 outputs the imaging information supplied from the user terminal 3 to the device information acquisition unit 104 and the color conversion information calculation unit 105.

Then, the image acquisition unit 103 writes and stores the data of the additional chart image in the color conversion information table of the user database 11, being correlated with the user identification information.

The device information acquisition unit 104 searches through the device information table of the device information database 14 and reads camera characteristics corresponding to the device specification information contained in the imaging information.

Then, the device information acquisition unit 104 writes and stores the read camera characteristics in the column of camera characteristics in the color conversion information table.

In the case of the present fourth example, in Process F4, the color conversion information calculation unit 105 re-calculates color conversion information using the chart image, the additional chart image, the color characteristic information of the chart, the color characteristic information of the additional chart, and the imaging information, and updates the existing color conversion information to the newly calculated color conversion information. This calculation is performed as in generating color conversion information in Process F1 described above. The method of updating color conversion information is similar to the method described in the first example of the present Process F3.

The present fourth example has described a configuration in which an additional chart is prepared by the operating company A and the completed additional chart is delivered to the user. However, as in Steps FF102B and FF102C of FIG. 11 in the second example of user environment information registration of Process F1, an image of an additional chart for printer use may be generated and transmitted to the user terminal 3. In this case, the additional chart may be outputted from the printer available for the user, and an additional chart image including an image of the outputted additional chart and the imaging information may be transmitted to the product sales support system 1.

The present fourth example describes a configuration in which color conversion information is updated by matching the additional chart to the observation environment of the user or the purchased product.

However, an additional chart prepared for general purposes in advance may be transmitted. For example, a predetermined general-purpose additional chart may be prepared for the type of the light source (white light source, fluorescent light, LED (light emitting diode) light source, etc.) in each user's observation environment estimated from color conversion information, and supplied according to the type of the light source estimated from the user's color conversion information.

Furthermore, an email has been exemplified as a transmission method for the additional chart information. However, based on the information transmission to an application in the user terminal 3, the information on the additional chart received by the application may be presented to the user.

The method of issuing a chart does not have to be an email described above. For example, a barcode (ordinary barcode or 2D barcode) may be attached to a direct mail delivered to the user on an anniversary or the like, and delivery of an additional chart may be requested by the user's choice.

The method of issuing a chart may be a method in which a URL (uniform resource locator) for requesting transmission of an additional chart is added to an email so that the user can request transmission of the additional chart by the user's choice.

Furthermore, a barcode including information on the URL for requesting an additional chart may be printed on a membership card or delivery note. In addition, a membership card, delivery note, or the like may be colored, so that an image thereof and the color characteristic information can be used for updating the color conversion information.

According to the present embodiment, each time color conversion information is updated based on an additional chart (additional chart different for each supply), the color conversion information gradually comes to match the user's observation environment and user's desired colors, and the colors of a product image observed by the user through the user terminal 3 and the colors of the actual product observed by the user in the user's observation environment come to be visually observed as colors close to each other. This may reduce product returns due to the difference in color of the product from the colors observed in the display screen, thereby reducing processing load of the user and the EC site related to product returns.

Specifically, according to the present embodiment, the user may only have to capture an image of an additional chart and transmit the data of the additional chart image to the product sales support system 1 from the user terminal 3, so that the colors of the actual product can be reproduced as a displayed product image. Accordingly, the user can easily choose and purchase a product with desired colors without observing the actual product.

According to the present embodiment, each time the user updates color conversion information based on an additional chart, the color conversion information gradually comes to match the user's observation environment and user's desired colors, and the colors of a product image observed by the user through the user terminal 3 and the colors of the actual product observed by the user in the user's observation environment come to be visually observed as colors closer to each other. This may become an incentive for the user to eliminate color difference, and accordingly the user may be encouraged to perform imaging processing or the like for an additional chart.

According to the present embodiment, each time the color conversion information is updated based on an additional chart, points corresponding to the number of updates may be imparted to the user, or the user may be financially rewarded such as by increasing discount rate of product prices. This may become an incentive for the user to purchase products at lower cost from an EC site, and accordingly the user may be encouraged to perform imaging processing or the like for an additional chart.

According to the present embodiment, an EC site may be provided with the product sales support system 1. In this case, the EC site may be improved in color reproducibility of the colors of a displayed product image each time the color conversion information is updated by each user during continuous use, and the occasions for the EC site and the user to contact each other are increased through transmission of an additional chart, users' transmission of an additional chart image, and the like. Accordingly, usage rate of the EC site increases, and probability for the user to purchase products increases.

The present embodiment has been described that the user database 11, the product color database 12, the chart information database 13, and the device information database 14 are provided in the product sales support system 1. However, these databases may be connected to respective sites other than the product sales support system 1 in the network 500.

Without being limited to the product sales of the present embodiment, the user may be a medical doctor or a patient, the EC site server (the server provided to an article viewing site) may be a medical institution such as a hospital, and the product sales support server may be a viewing server such as for medical images. Also, objects are not limited to commercial products, but articles including natural and man-made objects may be viewed.

Second Embodiment

With reference to the drawings, a second embodiment of the present invention will be described. In the present embodiment, definitions similar to those of the first embodiment are applied to color samples (a chart as a first color sample and a chart as a second color sample) and color sample information (chart information as first color sample information and chart information as second color sample information).

Figure 17:
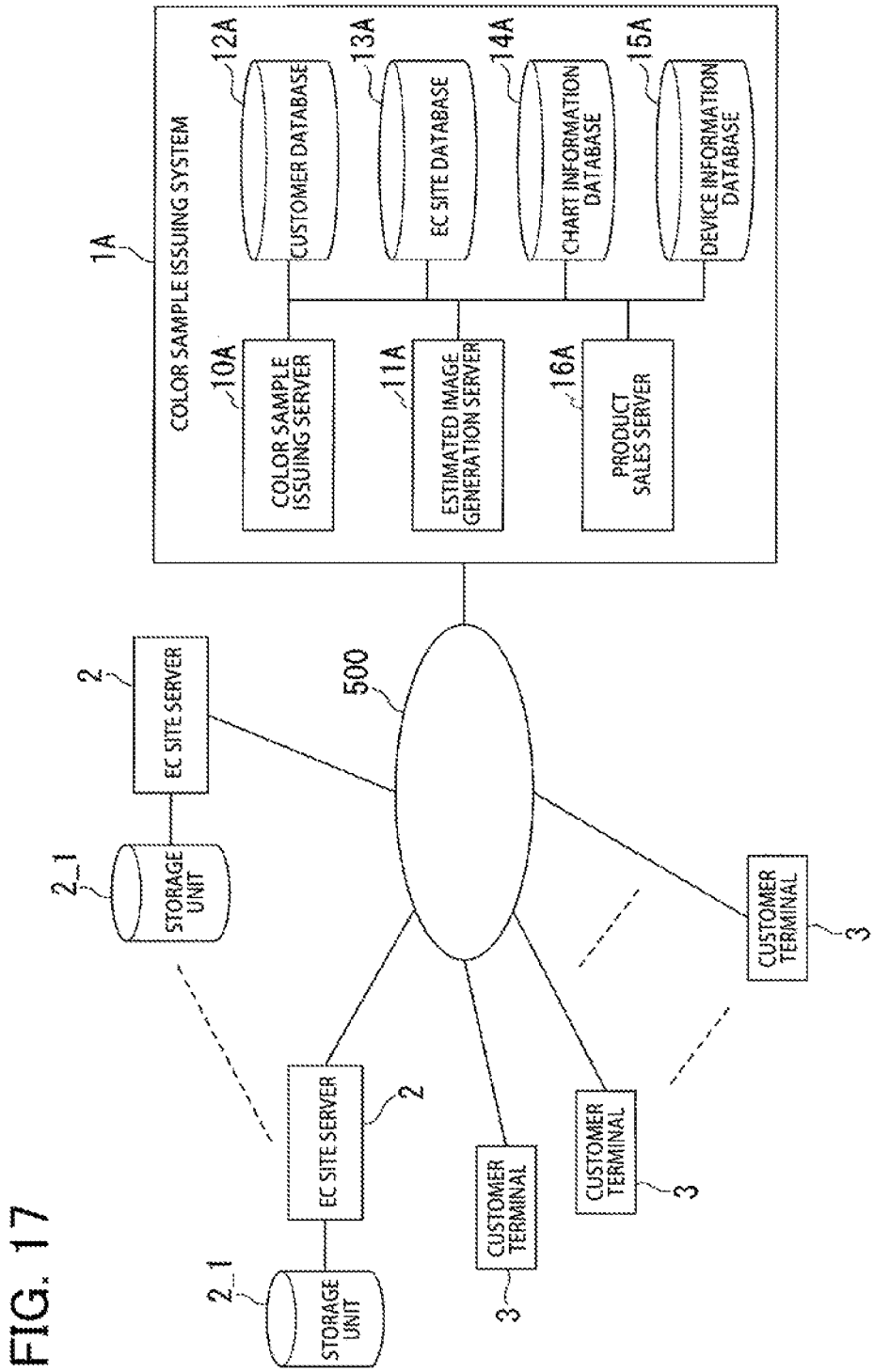
FIG. 17 is a block diagram illustrating a configuration example of a color management system using a color sample issuing system (color conversion information generation system), according to a second embodiment of the present invention.

FIG. 17 is a block diagram illustrating a configuration example of a color management system using a color sample issuing system (color conversion information generation system which may be simply indicated as a color sample issuing system hereinafter), according to a second embodiment of the present invention. In FIG. 17, the color management system has a configuration in which a color sample issuing system (color conversion information generation system) 1A, EC site servers 2, and customer terminals (user terminals) 3 are connected to each other via a network 500 including the Internet. Product images (described later) of products sold by an EC site provided to each EC site server 2 are stored in a storage unit 2_1.

The color sample issuing system 1A is installed, for example, in a color management center. The color management center manages color characteristic information of products acquired from color information of products visually observed in a user's lighting environment, and color conversion information used for converting color information of products in the lighting environment into color characteristic information, or vice versa. The color characteristic information refers to, for example, a spectral reflectance of an article, or colorimetric values defining one or more environments (light source, observation sensitivity, etc.). The color conversion information refers to, for example, a spectral radiance of lighting as a light source, a spectral sensitivity of an observer, a colorimetric transformation matrix between different environments, a processing procedure, or a function.

In the present embodiment, the user refers to, for example, an EC site or each customer of the EC site.

Therefore, the color management center is installed, for example, in an operating company A of a product sales support site to perform sales support for products by correctly providing forms of products. Specifically, in the sales support, when a customer observes a product image of a product (an example of an article, e.g., a clothing item in the present embodiment) sold by an EC site in an observation environment (i.e., in a lighting environment, e.g., under the light source of the location where the user observes the product) on the display screen of each customer terminal 3, the product image is displayed and visually observed with colors similar to the colors of the actual product.

Products (articles) in the present embodiment refer to articles to be sold, including clothing items, accessories, furniture, antiques, and paintings. For clothing items, in particular, users' favorite colors, combinations with other colors, and the like are important criteria of choice for the users. Therefore, if the displayed colors visually observed on the display screen of a customer terminal 3 are different from the colors of the actual product visually observed in the observation environment characteristics of the user (characteristics of the light source as illumination in the lighting environment, e.g., spectral radiance characteristics), the customer's color taste may not be satisfied, which may be a frequent cause of product return. Thus, it is important to adjust the displayed colors of a product image (displayed product image described later) displayed on the display screen of the customer terminal 3.

Figure 18B:
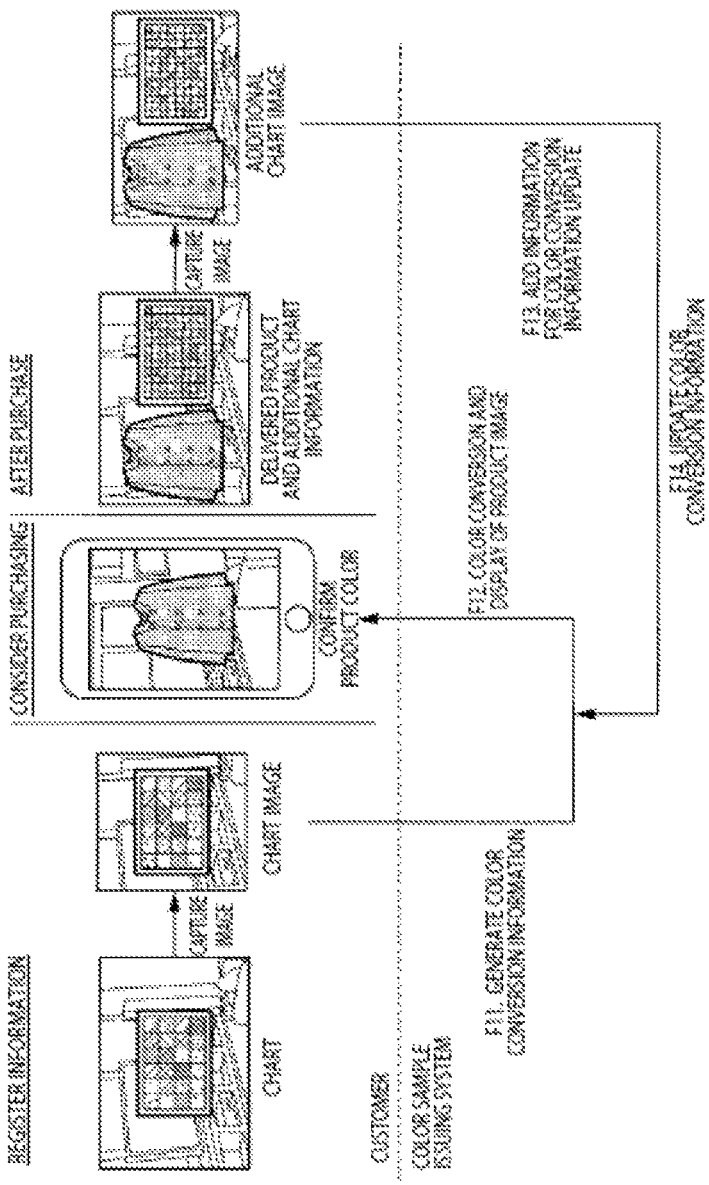
FIG. 18A and FIG. 18B are schematic diagrams illustrating processing when issuing a color sample to a customer performed by a color sample issuing system 1A, according to a first embodiment.
Figure 18A:
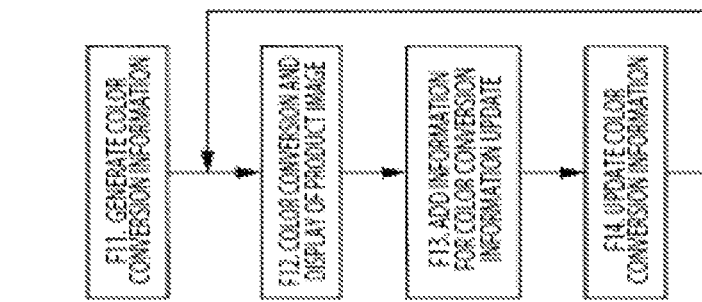

FIG. 18A and FIG. 18B are schematic diagrams illustrating processing when issuing a color sample to a customer performed by a color sample issuing system 1A according to the present embodiment.

FIG. 18A is a flowchart illustrating a processing flow of issuing a color sample to a customer performed by the color sample issuing system 1A.

FIG. 18B is a schematic diagram illustrating whether the subject performing each step of the processing shown in the flowchart of FIG. 18A is the customer or the color sample issuing system 1A. Since the customer visually observes a product purchased from an EC site in the customer's lighting environment, the lighting environment corresponds to an observation environment of the actual product.

Process F11

Process F11 is a process of generating color conversion information for the observation environment of a customer. Process F11 is a process of acquiring lighting environment information of the observation environment of the customer registered with an EC site and calculating color conversion information from the acquired lighting environment information.

Specifically, in Process F11, the color management center presents a chart (first color sample) as a color sample to the customer registered with the EC site, and acquires a chart image, i.e., an image of the chart, and imaging information. The chart is a color sample printed on a predetermined medium, in which a plurality of color swatches (color patches) of predetermined different colors are arrayed. The color characteristic information of these colors is known and provided to the color sample issuing system 1A.

The chart is a combination of color swatches generally used with any light source usable by the customer as a user. The chart may include a combination of color swatches that can acquire spectral radiance characteristics with which the type of the light source (e.g., fluorescent light, incandescent light, LED (light emitting diode) light, natural light emitted by the sun, etc.) usable by the customer can be classified. Furthermore, for example, the chart may be generated and set in advance according to user characteristics which are estimated for each of a plurality of groups classified in advance according to attribute information of the user (user attribute information).

The user attribute information in the present embodiment refers to customer attribute information and EC site attribute information.

The customer attribute information corresponds to the attribute information of a user performing registration in the first embodiment and may include at least any of, a combination of, or all of attributes indicating the type of place of the observation environment (size of the space, presence or absence of windows, and colors of the walls, ceiling and floor of the room) and attributes of the user, such as gender, age, address, occupation, time of day at home, birthday, wedding anniversary, and date and time of registration. The EC site attribute information may include at least any of, a combination of, or all of the EC site name, the type of place of the imaging environment (size of the space, presence or absence of windows, and colors of the walls, ceiling and floor of the room), types of products to be sold, main colors of the products to be sold, main materials of the products to be sold, target ages of the products to be sold, telephone number, email address, and imaging time period in the lighting environment.

The type of place of the observation environment or imaging environment, and the time of day at home and the imaging time period correspond to information (environment attributes) indicating characteristics of lighting in the lighting environment (characteristics indicating conditions of the light source).

The imaging information refers to information including information on the camera model (or the device model) or the like for acquiring camera characteristics used for imaging, information on the camera settings when imaging, position information (GPS (global positioning system) information acquired by the device provided to the camera, customer specification (address and room number), etc.) indicating the location of imaging, and date and time information. The imaging information may be acquired in advance by the color management center via the EC site at the time of registration with the EC site.

Then, color conversion information is generated, which is used for converting color characteristic information into color information as colorimetric values in the imaging environment in which the above chart has been imaged, based on the spectral reflectance of the chart or color characteristic information as colorimetric values defining one or more environments (light source, observation sensitivity, etc.), the chart image, and the camera characteristics.

If the customer is not registered with the service that provides a displayed product image using color conversion information and if the customer has already purchased the article from the EC site, a color sample used as a chart may be provided using any of, or a combination of, or all of the articles purchased by this customer, and an image of the articles may be transmitted as a chart image to the color sample issuing system 1A together with imaging information.

Process F12

Based on the color conversion information, the color sample issuing system 1A generates product image data in which the colors of the image of the product sold by the EC site have been converted into colors corresponding to the light source in the environment where the customer observes the product, i.e., colors visually observed by the customer when the customer observes the product in the customer's observation environment.

Then, the color sample issuing system 1A supplies the displayed product image to the customer terminal 3.

The customer observes the displayed product image on the display screen of the customer terminal 3 and performs purchase processing if the product meets the customer's taste.

Process F13

In parallel with the customer's purchase processing, the color sample issuing system 1A informs the EC site about the customer information and sales information of the product purchased by the customer.

Thus, an operating company B of the EC site ships the product purchased by the customer for delivery to the customer.

When the product has been shipped from the operating company B, the color management center provides information about an additional chart (second color sample) (additional chart information) to the customer who has purchased the product.

Even when the customer does not purchase the product, the additional chart information may be provided from the operating company B at a predetermined time point to the customer who has viewed the product, based on the fact of the customer viewing the product in the EC site operated by the operating company B.

Then, after receiving the product and the additional chart information, the customer captures an image of the additional chart (captures an image in an environment similar to the environment where the chart has been imaged) according to the additional chart information to transmit an additional chart image and imaging information to the color sample issuing system 1A from the user terminal 3.

The color sample issuing system 1A acquires the new image of the additional chart and the imaging information for updating the already acquired color conversion information.

The additional chart is generated, for example, as a combination of color swatches corresponding to at least any of, a combination of, or all of color conversion information obtained from the chart, color characteristic information of the product purchased or viewed by the customer, color conversion information in a lighting environment similar to a lighting environment corresponding to information on the lighting environment, and pointed-out information (comparison results) with which the customer indicates color differences (generation of the color swatches will be described later).

Process F14

The color sample issuing system 1A changes the already acquired user's color conversion information, based on the additional chart image and the imaging information supplied from the customer (processing for complementing missing information).

After that, each time Processes F12 to F14 are iterated, the customer's color conversion information is changed to thereby generate a displayed product image in which colors closer to the colors of the actual product can be visually observed.

In the update, all the additional chart image and the imaging information may be added, or the color conversion information may be changed according to a part of or a combination of chart information and additional chart information, based on predetermined criteria.

Alternatively, color conversion information may be generated using a part of the chart image and the imaging information when capturing the chart image, in addition to the additional chart image and the imaging information when capturing the additional chart image.

Alternatively, in the update of the color conversion information, the user may explicitly indicate as to whether the environment for capturing the image is different from the previous environment, or if the environment is estimated to be different as a result of detection using a predetermined threshold in the update processing, color conversion information may be newly acquired (changed) using only the additional chart image and the imaging information.

Figure 19B:
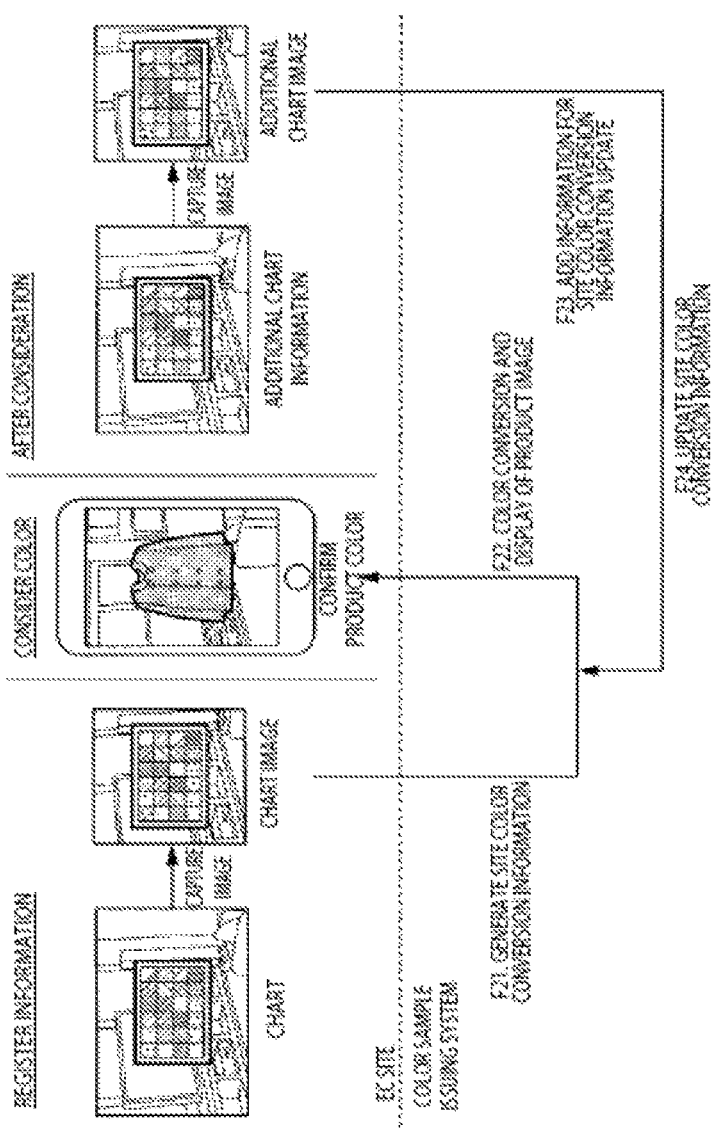
FIG. 19A and FIG. 19B are schematic diagrams illustrating processing when issuing a color sample to an EC site performed by the color sample issuing system 1A, according to the present embodiment.
Figure 19A:
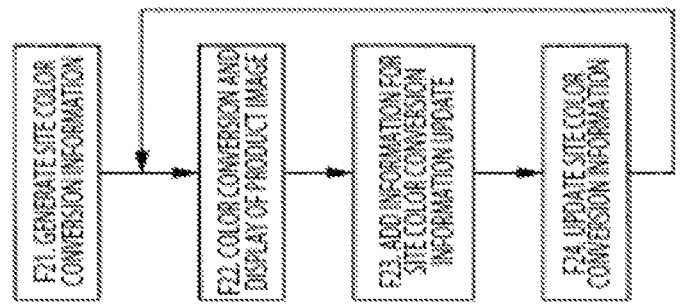

FIG. 19A and FIG. 19B are schematic diagrams illustrating processing when issuing a color sample to an EC site performed by the color sample issuing system 1A according to the present embodiment.

FIG. 19A is a flowchart illustrating a processing flow of issuing a color sample to an EC site performed by the color sample issuing system 1A.

FIG. 19B is a schematic diagram illustrating whether the subject performing each step of the processing shown in the flowchart of FIG. 19A is the EC site or the color sample issuing system 1A. Since the EC site captures an image of a product to be sold in the EC site in the lighting environment thereof, the lighting environment corresponds to an imaging environment of the actual product.

Process F21

Process F21 is a process of generating site color conversion information in the imaging environment of the EC site (color conversion information in the lighting environment of the EC site). Process F21 is a process of acquiring environment information of the EC site registered with the operating company A and calculating site color conversion information from the acquired environment information.

Specifically, in Process F21, the color management center presents a chart (first color sample) to the registered EC site, and acquires a chart image, i.e., an image of this chart, and imaging information. The chart is a color sample printed on a predetermined medium, in which a plurality of color swatches of predetermined different colors are arrayed. The color characteristic information of these colors is known as already described, and provided to the color sample issuing system 1A. The chart issued to the EC site may be similar to the chart issued to the customer, or may be selected for each of groups classified according to the types, materials, and the like of the products to be sold in the EC site, from charts provided according to the classified characteristics.

The imaging information refers to information which includes information on the camera model (or the device model) or the like for acquiring camera characteristics used for imaging, information on the camera settings when imaging, position information (GPS information acquired by the device provided to the camera, EC site settings (address and room number), etc.) indicating the location of imaging, and date and time information. The imaging information may be acquired in advance by the color management center when the EC site has been registered with the operating company A.

Then, as in Process F11, site color conversion information is generated, which is used for converting color characteristic information into color information, that is, colorimetric values in the imaging environment in which the above chart has been imaged, based on the spectral reflectance of the chart or color characteristic information, that is, colorimetric values defining one or more environments (light source, observation sensitivity, etc.), the chart image, and the camera characteristics.

Process F22

Based on the color conversion information, the color sample issuing system 1A generates product image data in which the colors of the image of the product sold by the EC site have been converted into colors corresponding to the light source when observing the product in the imaging environment of the EC site, i.e., colors of the product visually observed by the EC site in the environment thereof.

Then, the color sample issuing system 1A supplies a displayed product image to the EC site server 2.

A person in charge of the EC site observes the displayed product image on the display screen of the EC site server 2 and compares the colors of the product with the colors of the actual product in the imaging environment to inform the results of comparison to the color sample issuing system 1A. This processing is one of the processes aimed at improving conversion accuracy for site color conversion information so that the displayed product image viewed by the customer in the customer terminal 3 can be visually observed as colors similar to the colors of the actual product observed in the observation environment.

Process F23

When processing the results of comparison between the displayed product image and the actual product as provided (supplied) from the EC site, the color sample issuing system 1A performs processing for issuing an additional chart (second color sample) to the EC site.

Specifically, when the results of comparison are provided from the EC site, the color management center provides information about an additional chart (additional chart information) to the EC site that has provided the results of comparison.

Then, after receiving the product and the additional chart information, the person in charge of the EC site captures an image of the additional chart (captures an image in an environment similar to the environment where the chart has been imaged) according to the additional chart information to transmit an additional chart image and imaging information to the color sample issuing system 1A from the EC site server 2.

The color sample issuing system 1A acquires the new image of the additional chart and the imaging information for updating the already acquired site color conversion information.

The additional chart is generated, for example, as a combination of color swatches corresponding to at least any of, a combination of, or all of site color conversion information obtained from the chart, color characteristic information of the product sold by the EC site obtained from the site color conversion information, product information of the product material and the like (attribute information of the product as an object), site color conversion information in a lighting environment similar to a lighting environment corresponding to information on the lighting environment, and pointed-out information (comparison results) with which the EC site indicates color differences (generation of the color swatches will be described later).

Process F24

The color sample issuing system 1A changes the already acquired site color conversion information of this EC site with information including attributes of the product, based the additional chart image and imaging information supplied from the EC site.

After that, each time Processes F22 to F24 are iterated, the site color conversion information of the EC site is changed to thereby generate a displayed product image in which colors closer to the colors of the actual product can be visually observed.

In the update, all the additional chart image and the imaging information may be added, or the site color conversion information may be changed according to the chart or a part of the additional chart information, or a combination thereof, based on predetermined criteria.

Alternatively, the site color conversion information may be generated using the chart image and a part of the imaging information when imaging the chart, in addition to the additional chart image and the imaging information when imaging the additional chart.

Alternatively, when updating the site color conversion information, the user may explicitly indicate as to whether the environment for capturing the image is different from the previous environment, or if the environment is estimated to be different as a result of detection using a predetermined threshold in the update processing, site color conversion information may be newly acquired (changed) using only the additional chart image and the imaging information.

Returning to FIG. 17, EC site servers 2 are provided to perform EC site product management or sales management, and each of them includes a storage unit 2_1. The storage unit 2_1 stores product images contained in a product color data table of an EC site database 13A, which will be described later, and chart images used for generating site color conversion information, being correlated with pieces of product identification information.

The color sample issuing system 1A includes a color sample issuing server 10A, an estimated image generation server 11A, a customer database 12A, an EC site database 13A, a chart information database 14A, a device information database 15A, and product sales server 16A.

As described above, the color sample issuing system 1A generates site color conversion information used for converting an image of a product to be imaged in the imaging environment of each EC site for supply, into a displayed product image that can be visually observed as colors of the actual product in the observation environment of each customer, or generates a chart and an additional chart for obtaining color characteristic information for correctly propagating the product colors, and issues the generated data to the EC site or the user.

Figures 20, 21:
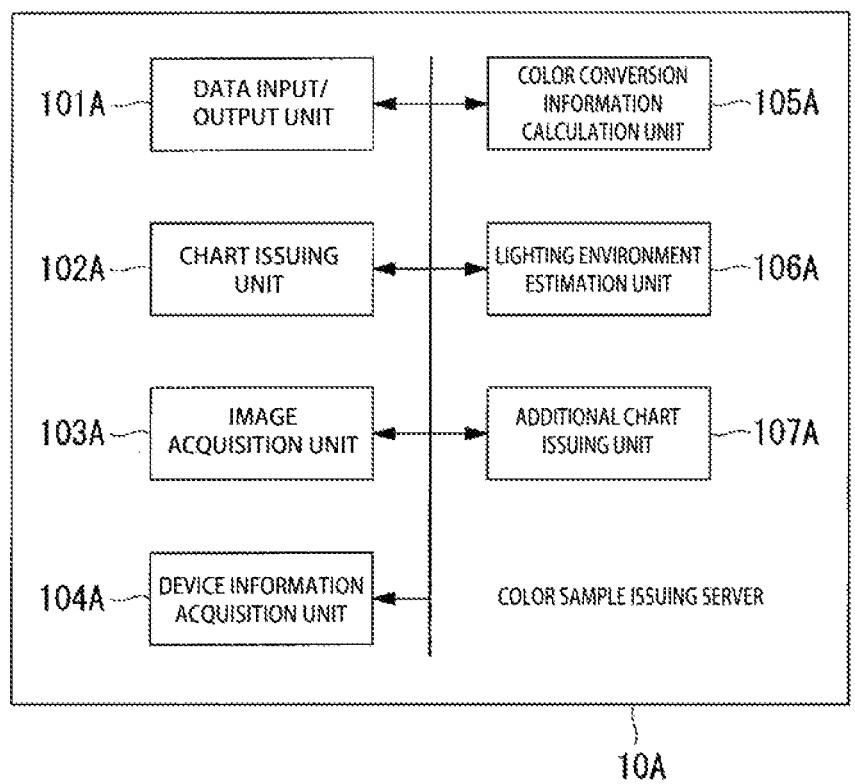
FIG. 20 is a diagram illustrating a configuration example of a color sample issuing server 10A, according to the present embodiment.
FIG. 21 is a diagram illustrating a configuration example of a customer data table in a customer database 12A.

FIG. 20 is a diagram illustrating a configuration example of the color sample issuing server 10A according to the present embodiment. In FIG. 20, the color sample issuing server 10A includes a data input/output unit 101A, a chart issuing unit 102A, an image acquisition unit 103A, a device information acquisition unit 104A, a color conversion information calculation unit 105A, a lighting environment estimation unit 106A, and an additional chart issuing unit 107A.

The data input/output unit 101A transmits and receives data to/from an external device or an external system via the network 500.

The chart issuing unit 102A generates or determines a chart to be provided to the user (each EC site or customer) and prints the chart on a printing medium, for issuance to the user as a color sample (first color sample).

The printing medium may be a membership card (including registration card), membership documents supplied from the color management center at the time of the user's registration with the operating company A, or an envelope, packaging material, or cushioning material enclosing the membership card or the documents. Specifically, the color sample is provided to the user at the time of registration as a chart printed on a membership cart, documents, envelope, packaging material, or cushioning material provided to the user from the color management center with the registration.

The chart is printed on the printing medium as symbols or figures (barcode, 2D code, etc.). The 2D code may have a configuration in which a plurality of barcodes are arranged in parallel, or a configuration in which quadrangular dots are arranged in a grid pattern as in a QR code (trademark).

Specifically, a plurality of symbols with different colors may be arrayed and printed to use the symbols as color swatches, or one character may be divided into a plurality of regions and printed in different colors as color swatches, so that a character string (or a character) is configured as a chart. In the case of a barcode, bars indicating codes may be printed in different colors, or bars may be divided into a plurality of regions and printed in different colors as color swatches, so that a figure of a barcode is configured as a chart.

In the case of a 2D code, dots or bars indicating codes may be printed in different colors, or dots or bars may be divided into a plurality of regions and printed in different colors as color swatches, so that a figure of a 2D code is configured as a chart.

Alternatively, the chart may be symbols or a figure (barcode, 2D code, etc.) indicating a URL (uniform resource locator) for accessing the site of the operating company A or the EC site, printed on a magazine advertisement, poster, leaflet, or the like.

Furthermore, an image of symbols or figure of the URL may be captured and the image may be sent as an attachment to apply, for example, for some gift, obtaining a discount on registration fees, product prices, or services, or obtaining points that can be cashed or exchanged with some product.

In this case, the color management center can obtain information about the lighting environments, such as the observation environment and the imaging environment, at the time of the user's accessing to the site to apply for a prize.

The image acquisition unit 103A determines whether the images acquired by the data input/output unit 101A are a chart image and an additional chart image.

Then, the image acquisition unit 103A outputs the chart image to the color conversion information calculation unit 105A together with the result of the determination.

The device information acquisition unit 104A extracts camera characteristic acquisition information such as of a camera model and a device model from the imaging information acquired by the data input/output unit 101A. Then, the device information acquisition unit 104A conducts a search using the extracted camera characteristic acquisition information to acquire camera characteristics corresponding to the camera characteristic acquisition information from the device information database 15A (described later) and outputs the acquired camera characteristics to the color conversion information calculation unit 105A.

The color conversion information calculation unit 105A generates color conversion information (similar to the site color conversion information that is color conversion information of the EC site, including, for example, a spectral radiance of a light source, a spectral sensitivity of an observer, a colorimetric transformation matrix between different environments, a processing procedure, or a function), based on a spectral reflectance of each color swatch of a known chart or color characteristic information, that is, colorimetric values defining one or more environments (light source, observation sensitivity, etc.), a chart image, and camera characteristics, and writes and stores the generated information in the customer database 12A (described later) or the EC site database 13A (described later). The color conversion information calculation unit 105A may prepare color conversion information for each product according to the material or the colors stored as the product information. Thus, in the color conversion processing, product information to be reproduced can be acquired from the product identification information, and optimum color conversion information can be used for the product indicated by the product information. The color conversion information calculation unit 105A also recalculates and updates the color conversion information or the site color conversion information that has been already generated, based on an additional chart image supplied at a predetermined timing.

The lighting environment estimation unit 106A reads the type of lighting similar to the color conversion information calculated from the chart, from the device information database 15A. The lighting environment estimation unit 106A may compare, for example, the intensity pattern for each wavelength of spectral radiance of the light source with the intensity pattern for each wavelength of spectral radiance of each type of lighting stored in the device information database 15A, and may select a type of lighting having an intensity pattern with a highest similarity, as a type of the light source in the user's lighting environment.

The additional chart issuing unit 107A issues an additional chart having a combination of color swatches including color conversion information more suitable for the user's lighting information, based on the color conversion information obtained from the chart already described, the additional chart issued immediately before, or information about color evaluation (color evaluation information), and the type of lighting. The color conversion information obtained from the chart includes the color conversion information of the lighting environment calculated and obtained from the chart, and the color conversion information in a lighting environment similar to the intensity pattern for each wavelength of spectral radiance obtained from the chart.

The color evaluation information may refer, for example, to the color characteristic information of the product purchased by the customer, the image of the product purchased by the customer, evaluation information indicating difference in color between the product in the observation environment and the displayed product image (product evaluation described later), the color characteristic information of the product viewed by the customer in the customer terminal 3, and the like.

Furthermore, the color evaluation information may refer, for example, to the color characteristic information of the product obtained from the product image captured by the person in charge of the EC site, comparison results resulting from observing the displayed product image on the display screen of the EC site server 2 and comparing the colors of the product with the colors of the actual product in the imaging environment, and the like.

Then, the additional chart issuing unit 107A generates an additional chart using a combination of colors to be added (added color combination) corresponding to at least any of, a combination (information combination) of, or all of the color conversion information obtained from the chart (color conversion information of the user's lighting environment or color conversion information of a similar lighting environment), the information about additional charts issued so far, the color evaluation information, and the information about the type of lighting.

In this case, for example, an additional color extraction table may be written to and stored in advance in the chart information database 14A, including additional color combinations each being correlated with any of the combinations of information described above.

Then, the additional chart issuing unit 107A searches through the additional color extraction table for an information combination similar to the information combination obtained for each user (EC site or customer), and reads an additional color combination corresponding to the searched information combination.

The additional chart issuing unit 107A may use the colors shown in the read additional color combination as color swatches, for replacement with the color swatches in the chart or the additional chart issued immediately before to generate a new additional chart.

The additional chart issuing unit 107A determines whether colorimetric values in the color characteristic information of the product to be viewed by the customer or colorimetric values in the color characteristic information of the product to be sold by the EC site are included in a color region in which the color conversion information generated from the chart can be converted.

In this case, the additional chart issuing unit 107A may read an additional color combination to be added to the chart from the additional color extraction table in which the color characteristic information of the product not included in the color region and the color characteristic information of the chart are correlated to the additional color combination of colors to be added, and may generate a new additional chart.

FIG. 21 is a diagram illustrating a configuration example of a customer data table in the customer database 12A. The customer data table is provided for each EC site. For example, for each record, the customer data table is provided with columns of customer attribute information, color conversion information index, product evaluation index, printer characteristics, display characteristics, and camera characteristics, being correlated with the customer identification information.

The customer identification information is information for identifying each customer. The customer attribute information is attribute information of the customer indicated by the customer identification information, and may include name, type of the place of lighting environment, gender, age, address, phone number, email address, hobbies, occupation, favorite colors, time period of stay in the environment, and the like. The type of place of lighting environment refers to the size of the space, the presence or absence of windows, the colors of the walls, ceiling and floor of the room. The conversion information index is an index such as an address of the area storing a color conversion information table, that is, a list of color conversion information usable by the customer, including a plurality of different pieces of color conversion information and preset color conversion information in the customer's observation environment indicated by the customer identification information.

The product evaluation index is an index such as an address of the area storing a product evaluation table containing user's evaluation for products purchased by the customer indicated by the customer identification information. The printer characteristics is information including printer output color information, such as an ICC (international color consortium) profile and spectroscopic information of inks (ink information) of the printer which is used by the customer to print a product image, and medium information of paper used for printing the product image or a color sample. The display characteristics correspond to luminescence information including an ICC profile, spectral radiance, and tristimulus values. The camera characteristics may include, for example, spectral sensitivity information of a camera (imaging device). These printer characteristics, display characteristics, and camera characteristics are written into corresponding columns of the customer data table (described later) by the device information acquisition unit 104A mentioned above.

FIG. 22 is a diagram illustrating a configuration example of a color conversion information table in the customer database 12A. The color conversion information table is written to and stored in the customer database 12A. The color conversion information table is provided for each customer. For each record, the color conversion information table is provided with columns of chart image index, additional chart image index, chart identification information, algorithm identification information, color conversion information, and specification data, being correlated with the color conversion information identification information.

The color conversion information identification information is information for identifying each piece of color conversion information. The chart image index is an index such as an address of the area where image data of the chart (first color sample) is written to and stored in the database. The data for the chart image may be provided as the form of a data table containing pixel positions of pixels extracted from the chart image and pixel values of the pixels indicated by the pixel positions.

The additional chart image index is an index such as an address of the area where image data of the additional chart (second color sample) is written to and stored in the database. The data for the additional chart image may be provided as the form of a data table containing pixel positions of pixels extracted from the additional chart image and pixel values of the pixels indicated by the pixel positions.

The chart identification information is identification information of the chart and the additional chart provided to the customer.

The color conversion information corresponds to spectral radiance of the light source or a tristimulus transformation matrix in an environment where the customer has captured an image of the chart or the additional chart. The tristimulus transformation matrix is a matrix with which colorimetric values of a defined observation environment (e.g., a combination of CIE (international commission on illumination) _D50 and a 2-degree field standard observer, or a combination of CIE_D65 and a 10-degree field standard observer) are converted (color-converted) into device values in terms of the spectral radiance of the light source in an environment where the customer has captured an image, and the camera characteristics of the camera used for imaging. This color conversion may be conducted in reverse. That is, device values in terms of the spectral radiance of the light source in the environment where the customer has captured an image, and the camera characteristics of the camera used for imaging, may be converted into a spectral reflectance of an article or colorimetric values defining the environment. Specifically, the color conversion information is conversion information between a spectral reflectance of an article or color characteristic information as colorimetric values defining the observation, and colorimetric values of the observation in the customer's environment.

The specification data is information indicating specification of color conversion information. The specification data indicates an applied time period of the corresponding color conversion information, including a morning time period, a daytime period, and a night time period. The morning time period may, for example, be a time period from sunrise to 12:00 noon. The daytime period may, for example, be a time period from 12:00 noon to sunset. The specification data may include location information on where the customer observes a product, or other location information, so that color conversion information can be specified in an office, restaurant, or theater, or at home, or the like. The night time period is, for example, from sunset to sunrise. The preset color conversion information is color conversion information common to individual customers, i.e., a transformation matrix used for converting a spectral radiance of sunlight or a light source in an ordinary office, or color characteristic information defining an environment, into colorimetric values visually observed in sunny conditions outdoors or in an office.

For additional charts, processing as in the processing related to color conversion information acquisition performed for the second additional chart (second color sample) is performed for a third additional chart (third color sample) to an nth additional chart (nth color sample) that follow the second additional chart.

FIG. 23 is a diagram illustrating a configuration example of a product evaluation table in the customer database 12A. The product evaluation table is written to and stored in the customer database 12A. The product evaluation table is provided for each customer. For each record, the product evaluation table is provided with a column of evaluation of the product corresponding to the product identification information (product evaluation), being correlated with the product identification information. The product identification information is information for identifying each product. In the product evaluation, an evaluation of the purchased product (product indicated by the product identification information) (e.g., evaluation by questionnaire) is provided. For example, the product evaluation may include the customer's reactions to the delivered product, including, for example, "Satisfied", "Normal", "Redness is insufficient", "Returned due to color difference" as a result of the customer's color adjustment described later, and the like.

FIG. 24 is a diagram illustrating a configuration example of an EC site table in the EC site database 13A. For each record, the EC site data table is provided, for example, with columns of EC site attribute information, site color conversion information index, comparison results index, printer characteristics, display characteristics, and camera characteristics, being correlated with the EC site identification information. The EC site identification information is information for identifying each EC site. The EC site attribute information is attribute information of the EC site indicated by the EC site identification information, and may include the EC site name, type of place of lighting environment, type of product, main color, main material, product target age, phone number, email address, and imaging time period in the lighting environment. The type of place of lighting environment refers to the size of the space, the presence or absence of windows, the colors of the walls, ceiling and floor of the room. The color conversion information index is an index such as an address of the area storing a site color conversion information table, that is, a list of color conversion information usable by the EC site, including a plurality of different pieces of site color conversion information and preset site color conversion information in the imaging environment of the EC site indicated by the EC site identification information.

The comparison results index is an index such as an address of the area in the EC site database 13A storing a file that shows information (color evaluation information) resulting from comparison between the visually observed colors of the actual product that has been imaged in the imaging environment by the person in charge of the EC site indicated by the EC site identification information and the colors of the displayed product image visually observed on the display screen of the EC site server 2. The comparison results may be provided in any way as long as there is shown information indicating difference in visually observed color between the actual product and the displayed color image, such as blue being too weak or red being too strong, or shown information indicating a color difference, such as a color adjustment amount (adjustment amount of the RGB color components) achieving similar visual observation as a result of color adjustment of the displayed product image using an application of the EC site server 2. The printer characteristics correspond to information including printer output color information, such as an ICC profile and spectroscopic information of inks of the printer which is used by the EC site to print a product image or a color sample, and medium information of paper used for printing the product image. The display characteristics correspond to luminescence information including an ICC profile, spectral radiance, and tristimulus values. The camera characteristics may correspond, for example, to spectral sensitivity information of a camera. These printer characteristics, display characteristics, and camera characteristics are written into corresponding columns of the EC site data table (described later) by the device information acquisition unit 104A mentioned above.

FIG. 25 is a diagram illustrating a configuration example of a product color data table in the EC site database 13A. The product color data table is written to and stored in the EC site database 13A. The product color data table is provided for each EC site. For each record, the product color data table is provided with columns of a product image index, product color information index, and product information index, being correlated with the product identification information. The product identification information is information for identifying each product. The product image index is an index such as an address of the area in the EC site database 13A that stores data of images captured in an environment of the light source of each EC site.

The product color characteristic information index is an index such as an address of the area in the EC site database 13A that stores color characteristic information data of spectroscopic images of products, product reflectance images indicating spectral reflectance of each pixel, product images in a defined observation environment, and the like.

The product information index is an index such as an address of the area in the EC site database 13A that stores information indicating spectral reflectances and types of materials of products. The materials may, for example, be types of fabric materials in the case of clothing, and may include rayon, nylon, polyester, acrylic, polyurethane, linen, cotton, wool, and denim. Thus, as described above, material or color characteristic information of the printing medium of a chart or an additional chart may be designed depending on the type of the product material, or color conversion may be performed using color conversion information different for each material.

FIG. 26 is a diagram illustrating a configuration example of a site color conversion information table in the EC site database 13A. The site color conversion information table is written to and stored in the EC site database 13A. The site color conversion information table is provided for each EC site. For each record, the site color conversion information table is provided with columns of chart image index, additional chart image index, chart identification information, site color conversion information, algorithm identification information, and specification data, being correlated with the site color conversion information identification information.

The site color conversion information identification information is information for identifying each piece of site color conversion information.

The chart image index is an index such as an address of the area where image data of the chart (first color sample) is written to and stored in the database. The data for the chart image may be provided as the form of a data table containing pixel positions of pixels extracted from the chart image and pixel values of the pixels indicated by the pixel positions.

The additional chart image index is an index such as an address of the area where image data of the additional chart (second color sample) is written to and stored in the EC site database 13A. The data for the additional chart image may be provided as the form of a data table containing pixel positions of pixels extracted from the additional chart image and pixel values of the pixels indicated by the pixel positions.

The chart identification information is identification information of a chart, and the additional chart identification information is identification information of an additional chart.

The algorithm identification information is information used for identifying the algorithm used when color conversion information is calculated by the color conversion information calculation unit 105A, and thus identifies an algorithm of color conversion information calculation selected according to the material or color characteristic information of a product, color information such as colored/non-colored, indoor/outdoor lighting information, and the like.

The site color conversion information corresponds to spectral radiance of the light source or a tristimulus transformation matrix in an environment where the EC site has captured an image of the chart or the additional chart. The tristimulus transformation matrix is a matrix with which colorimetric values of a defined observation environment (e.g., a combination of CIE (international commission on illumination) D50 and a 2-degree field standard observer, or a combination of CIE_D65 and a 10-degree field standard observer) are converted (color-converted) into device values in terms of the spectral radiance of the light source in an environment where the EC site has captured an image, and the camera characteristics of the camera used imaging. This color conversion may be performed in reverse. That is, device values in terms of the spectral radiance of the light source in the environment where the EC site has captured an image, and the camera characteristics of the camera used for imaging, may be converted into a spectral reflectance of an article or colorimetric values defining the environment. Specifically, the site color conversion information corresponds to conversion information between a spectral reflectance of an article or color characteristic information as colorimetric values defining the observation, and colorimetric values observed in the environment of the EC site.

The specification data is information indicating specification of site color conversion information. The specification data indicates an applied time period of the corresponding site color conversion information, including a morning time period, a daytime period, and a night time period. The morning time period may, for example, be a time period from sunrise to 12:00 noon. The daytime period may, for example, be a time period from 12:00 noon to sunset. The specification data may include location information on where the person in charge of the EC site captures an image of a product, or other location information, and thus can specify site color conversion information in an office, studio, or the like where the person in charge of the EC site captures an image of a product. The night time period is, for example, from sunset to sunrise. The preset site color conversion information is color conversion information common to individual EC sites, i.e., a transformation matrix used for converting a spectral radiance of sunlight or a light source in an ordinary office, or color characteristic information defining an environment, into colorimetric values visually observed in sunny conditions outdoors or in an office.

For additional charts, processing as in the processing related to site color conversion information acquisition performed for the second additional chart (second color sample) is performed for a third additional chart (third color sample) to an nth additional chart (nth color sample) that follow the second additional chart.

FIG. 27 is a diagram illustrating a configuration example of a chart table in the chart information database 14A. The chart table is written to and stored in the chart information database 14A. For each record, the chart table is provided with columns of chart search information, a chart image index, and chart design information, being correlated with the chart identification information. In the present embodiment, the chart table is commonly provided to the EC sites and the customers; however, may be provided separately for the EC sites and the customers.

The chart identification information is information for identifying each chart as a colored or non-colored object. The chart search information is key information for searching a chart issued to the user (EC site or customer). The chart search information includes at least attribute information of the user (customer attribute information or EC site attribute information). The chart image index is an index such as an address of the area where a chart image that is an image of a chart is written to and stored. The chart design information is color characteristic information of a pattern element (e.g., array pattern element of color swatches) of a chart in the chart image and motifs (color swatches) in the pattern element. The chart design information includes information indicating the coordinate of each color swatch in the pattern element of the chart image (including the shape of a character image), and correlation information between the region indicated by the coordinate and the color characteristic information of the color of the color swatch.

FIG. 28 is a diagram illustrating a configuration example of an additional chart design table in the chart information database 14A. The additional chart design table is written to and stored in the chart information database 14A. For each record, the additional chart design table is provided with columns of additional color search information and additional chart design information, being correlated with the additional chart identification information. In the present embodiment, the additional chart design table is commonly provided to the EC sites and the customers; however, may be provided separately for the EC sites and the customers.

The additional chart design identification information is information for identifying each piece of information about colors added to the chart (a single color or a combination of a plurality of colors). The additional color search information at least includes any of, a combination of, or all of color conversion information (and site color conversion information) obtained from the chart, color characteristic information of the colors already used as color swatches, color evaluation information, and information about the type of the light source of the lighting estimated from the chart. The additional chart design information indicates information (color characteristic information) about the additional colors corresponding to the additional color search information.

FIG. 29 is a diagram illustrating a configuration example of an additional chart table in the chart information database 14A. The additional chart table is written to and stored in the chart information database 14A. For each record, the additional chart table is provided with columns of additional chart image index and additional chart information, being correlated with the additional chart identification information. In the present embodiment, the additional chart table is commonly provided to the EC sites and the customers; however, may be provided separately for the EC sites and the customers.

The additional chart identification information is information for identifying each additional chart. The additional chart image index is an index such as an address of the area where an additional chart image that is an image of an additional chart is written to and stored. The additional chart information includes information indicating the coordinate of each color swatch in the pattern element of an additional chart image (including the shape of a character image), and correlation information between the region indicated by the coordinate and the color characteristic information of the color of the color swatch.

Figure 30:
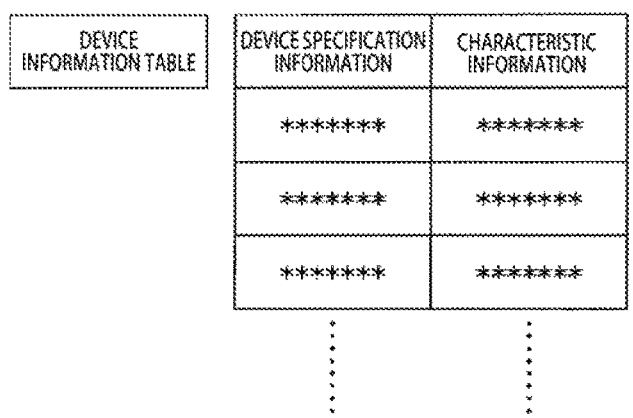
FIG. 30 is a diagram illustrating a configuration example of a device information table in a device information database 15A.

FIG. 30 is a diagram illustrating a configuration example of a device information table in the device information database 15A. The device information table is written to and stored in the device information database 15A.

For each record, the device information table is provided with columns of device specification information and characteristic information of the device indicated by the device specification information.

The device specification information is model information of a camera, printer and a display device, or device information, or the like. The device information may include, for example, a model number of the camera, if it is a digital camera, or a model number of the CCD (charged coupled device) used for the digital camera, a model number of the printer, if it is an inkjet printer, or a model number of the inkjet head used for the inkjet printer, and a model number of the display device, if it is a liquid crystal display, or a model number of the liquid crystal panel used for the liquid crystal display.

If the device is a camera, the characteristic information may include, for example, spectral sensitivity information in imaging, as camera characteristics. If the device is a printer, the characteristic information may include, for example, information about the printed colors outputted from the printer, such as an ICC profile or spectral information of the inks, medium information of the paper used for printing a product sales image or color sample, as printer characteristics. If the device is a display device, the characteristic information may include, for example, luminescence information, such as an ICC profile, spectral radiance, and tristimulus values, as display characteristics.

With reference to the drawings, color management according to the present embodiment will be sequentially described, including the operation of the color sample issuing system 1A in the processing flows of Processes F11, F12, F13 and F14.

<Example of Color Conversion Information Generation of Process F11>

Figure 31:
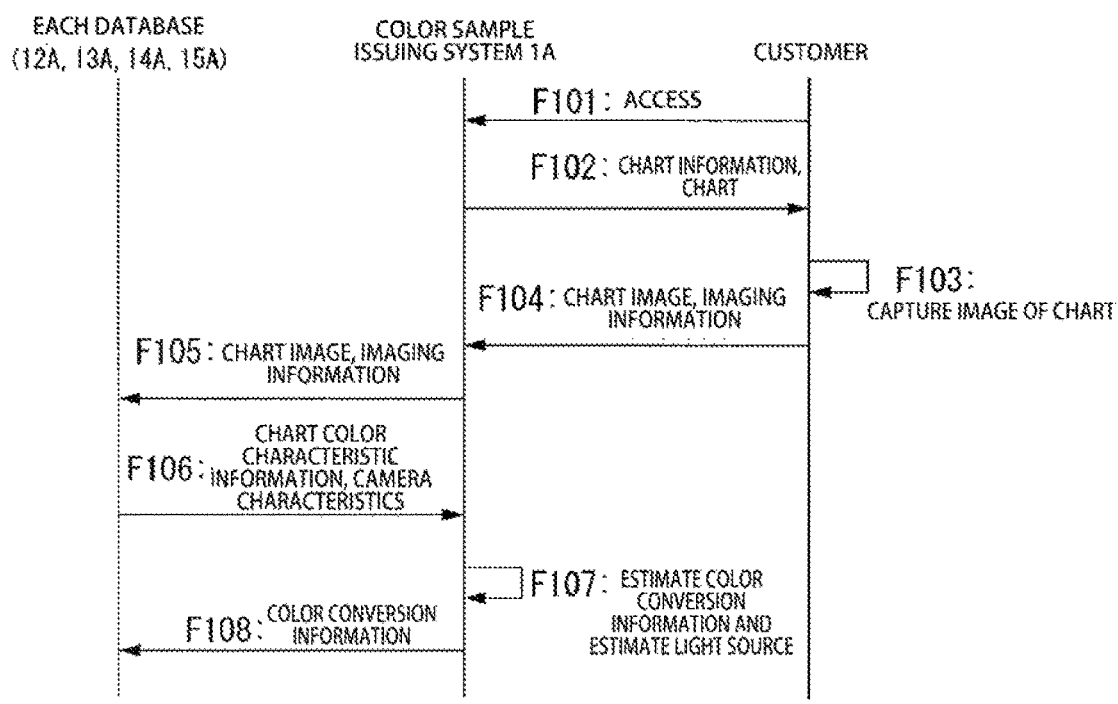
FIG. 31 is a sequence diagram illustrating a processing flow of customer environment information registration, using the color sample issuing system 1A.

FIG. 31 is a sequence diagram illustrating a processing flow of customer environment information registration using the color sample issuing system 1A. In FIG. 31, the customer database 12A, the EC site database 13A, the chart information database 14A, and the device information database 15A are described as databases (12A, 13A, 14A and 15A).

Step F101:

The customer accesses the color sample issuing site (i.e., the color sample issuing server 10A) via the customer terminal 3. For example, the customer may log in with customer identification information and request registration of the environment information of the customer's observation environment.

Thus, the data input/output unit 101A searches through the customer table of the customer database 12A with the customer identification information used when accessing the site, to thereby confirm which EC sites the customer is registered with.

Step F102:

The chart issuing unit 102A reads customer attribute information of the customer and searches through the chart table of the chart information database 14A with the read customer attribute information.

Then, the chart issuing unit 102A extracts chart search information having a highest similarity to the customer attribute information and reads a chart image index corresponding to the extracted chart search information.

The chart issuing unit 102A reads a chart image from the chart information database 14A with the chart image index and issues the read chart image as a chart.

Alternatively, the chart issuing unit 102A may extract, for example, a chart preset in the EC site from the chart information table of the chart information database 14A, as a chart corresponding to product images of a product group sold by the EC site and issue the extracted chart.

The operating company A delivers (or mails) the chart issued from the chart table by the chart issuing unit 102A to the address of the customer.

Step F103:

The customer captures an image of the chart supplied from the operating company A in the observation environment where the customer would observe the product, e.g., at a predetermined position of a room where the customer terminal 3 is installed.

Step F104:

Then, the customer transmits a chart image that is an image of the chart, imaging information when capturing the image, and the customer identification information of the customer to the color management center (color sample issuing system 1A) from the customer terminal 3.

Step F105:

The data input/output unit 101A outputs the chart image supplied from the customer terminal 3 to the image acquisition unit 103A.

Also, the data input/output unit 101A outputs the imaging information supplied from the customer terminal 3 to the device information acquisition unit 104A and the color conversion information calculation unit 105A.

Then, the image acquisition unit 103A writes data of the chart image in the customer database 12A.

Also, the image acquisition unit 103A writes and stores the address of the write area into the chart image index of the color conversion information table which is indicated by the color conversion information index corresponding to the customer identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the color conversion information table.

Step F106:

The color conversion information calculation unit 105A reads the chart image and the chart identification information from the color conversion information table, being correlated with the customer identification information.

Then, the color conversion information calculation unit 105A reads the chart design information index sent to the customer, from the chart table of the chart information database 14A, using the read chart identification information. The color conversion information calculation unit 105A reads color characteristic information of the chart from the storage area indicated by the chart design information index.

Also, the color conversion information calculation unit 105A reads the camera characteristics from the customer data table, being correlated with the customer identification information.

Step F107:

The color conversion information calculation unit 105A calculates color conversion information from the chart image, the camera characteristics, and the color characteristic information of the chart.

The color conversion information is information used for converting the color characteristic information into colorimetric values that would be acquired in the observation environment of the registered customer.

The lighting environment estimation unit 106A estimates the type of the light source in the observation environment from the color conversion information calculated from the chart.

Step F108:

The color conversion information calculation unit 105A writes and stores the calculated color conversion information in the color conversion information table, being correlated with the customer identification information.

When writing the color conversion information in the color conversion information table, the color conversion information calculation unit 105A extracts the time of capturing the chart image from the date and time information contained in the imaging information, and writes and stores the time period (morning time period, daytime period, or night time period) corresponding to the calculated color conversion information in the column of specification data. Furthermore, the information contained in the imaging information, such as position information based on GPS information, customer specification information, or the like, may be recorded.

The above description is for the case in which a chart is delivered and supplied to a customer. In this case, a chart for which color conversion information is calculated may be printed in advance together with the chart identification information and the customer identification information so as to be adjacent to them, on the front or back of the registration card of the EC site, and an image of the chart identification information and the customer identification information may be captured by the customer together with the chart. The chart identification information may be a barcode, 2D barcode (graphic information), or the like. Thus, the chart may be easily correlated with the customer. Furthermore, the chart identification information may be colored, so that an image thereof can be used not only for correlating with the customer based on the customer identification information, but also for simultaneously acquiring color conversion information.

Alternatively, at the time of registration (at the time of customer registration) with the EC site, the operating company A running the color management center may enclose the chart when delivering a description for product purchases on the EC site, or the chart identification information and the customer identification information (character information or graphic information) may be directly printed on the envelope for delivering the description or on the delivery note, or with the address, or on the packaging material. Furthermore, the chart identification information and the customer identification information (character information or graphic information) may be colored, so that an image thereof can be used for acquiring color conversion information.

In the present embodiment, a chart designed in advance based on chart design information is used for estimating color conversion information for the customer's observation environment. However, an instruction for capturing an image of the package of a generally distributed product, other than this chart, may be provided as chart information. As in the processing of Step F104 described above, the customer may capture an image of such a package and transmit the image to the color management center (color sample issuing system 1A) from the customer terminal 3. If the package is a generally used package, color characteristic information of a predetermined printed region can be easily obtained and thus color conversion information can be calculated.

In the present embodiment, a chart to be sent to the customer may be prepared based on the customer's observation environment (information on time period of observing an article, location of observation, etc.), using color conversion information of another customer with a similar observation environment who is different from the customer to whom the chart is sent.

In the present embodiment, color conversion information may be prepared for any of, a combination of, or all of the attributes, such as materials and colors, stored as product information. In this case, in the color conversion, product information to be reproduced may be acquired from the product identification information, so that optimum color conversion information can be used for the material or the color of the product.

<Example of Color Conversion and Display of Product Image of Process F12>

Figure 32:
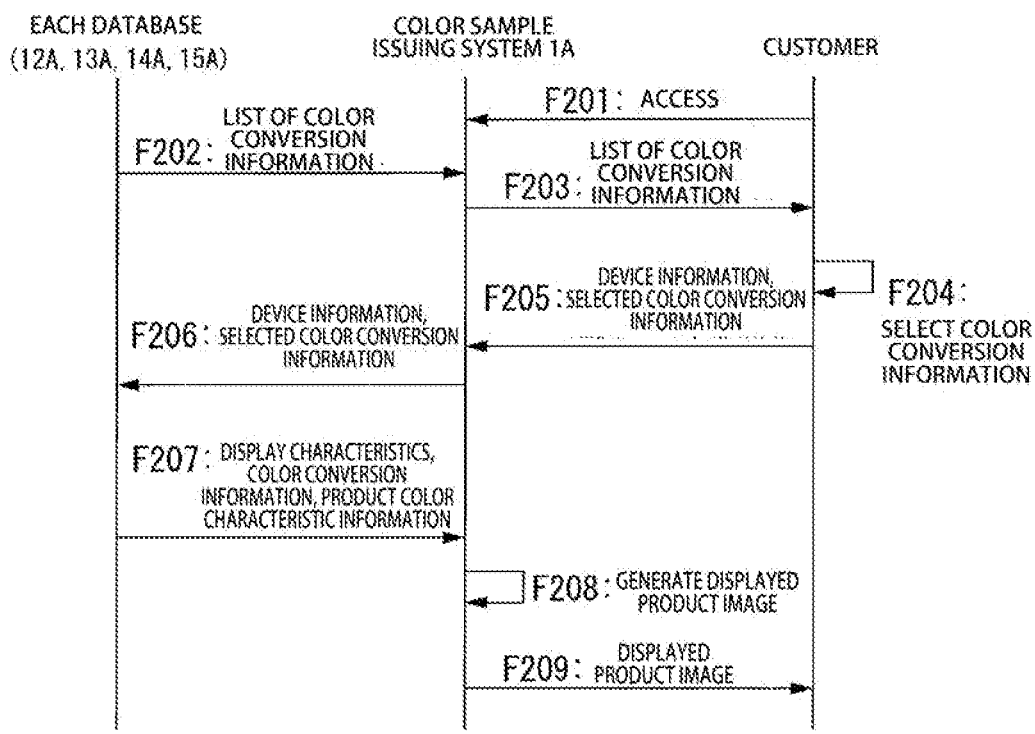
FIG. 32 is a sequence diagram illustrating a processing flow of color conversion and display of a product image, using the color sample issuing system 1A.

FIG. 32 is a sequence diagram illustrating a processing flow of color conversion and display of a product image, using the color sample issuing system 1A. In FIG. 32, the customer database 12A, the EC site database 13A, the chart information database 14A, and the device information database 15A are described as databases (12A, 13A, 14A and 15A).

Step F201:

The user accesses the color management center (color sample issuing system 1A) via the customer terminal 3. For example, the user may log in with customer identification information and request to view product images of the EC site which the user registers with.

Thus, the data input/output unit 101A searches through the customer table of the customer database 12A with the customer identification information used when accessing the site, to thereby confirm which EC sites the customer is registered with.

Step F202:

The estimated image generation server 11A searches through the customer table of the customer database 12A with the customer identification information to obtain color conversion information used when generating a displayed product image, and extracts the color conversion information table of the accessing customer.

Step F203:

Then, the estimated image generation server 11A displays a list of specification data of the color conversion information table on the display screen of the customer terminal 3, as a display for the user to select color conversion information.

For the display, character strings are used, such as "morning time period, "daytime period", "night time period", and "preset color conversion information (ordinary office, sunny conditions outdoors, etc.)", which indicate observation conditions in an observation environment.

Step F204:

The customer selects a condition corresponding to the environment where the customer observes the actual product, from the list of specification data on the display screen of the customer terminal 3.

In this case, for example, if the time specified for the product is 10 am, the time of observation in the observation environment is within the morning time period. Accordingly, the customer may select the morning time period from the list of specification data on the display screen of the customer terminal 3. If the customer always returns home around 8 pm, the time of observation in the observation environment is within the night time period. Accordingly, the customer may select the night time period from the list of specification data on the display screen of the customer terminal 3. If the delivery address is not the observation environment but a company office, the customer may select the preset color conversion information from the list of specification data on the display screen of the customer terminal 3.

Step F205:

The customer terminal 3 transmits the observation condition selected by the customer, e.g., a character string selected from among "morning time period", "daytime period", "night time period", "office", "restaurant", and "preset color conversion information", as information to the color sample issuing system 1A.

In this case, the customer terminal 3 transmits device specification information (device information) that specifies the display, which will be used as a display screen, to the color sample issuing system 1A together with the character string information.

Step F206:

The data input/output unit 101A outputs the device specification information supplied from the customer terminal 3 to the device information acquisition unit 104A.

The device information acquisition unit 104A searches through the device information table of the device information database 15A and reads display characteristics corresponding to the device information, i.e., the device specification information.

The device information acquisition unit 104A writes and stores the read display characteristics in the column of display characteristics in the color conversion information table.

Step F207:

Then, the estimated image generation server 11A reads the display characteristics from the color conversion information table, being correlated with the customer identification information.

Also, the estimated image generation server 11A reads the color conversion information (observation condition for the product, or color conversion information corresponding to the material or the like of the product) selected by the customer, from the color conversion information table.

The estimated image generation server 11A reads product color information for each product observed by the customer from the product color data table of the EC site database 13A.

Step F208:

Then, the estimated image generation server 11A converts the colorimetric values of product color information in a defined observation environment into colorimetric values in the observation environment of the customer, based on the color conversion information, and generates data for the displayed product image, being correlated with the display characteristics.

Step F209:

The estimated image generation server 11A transmits the generated data for the displayed product image to the customer terminal 3 via the data input/output unit 101A.

Thus, the customer can visually observe a product image on the display screen of the customer terminal 3 in color as in the case of observing the actual product in the observation environment of the customer.

In this case, the customer may observe the delivered product and the product image displayed on the display screen of the customer terminal 3 for comparison of the visually observed colors, and transmit the comparison results to the color management center.

Specifically, the customer may evaluate color difference by sequentially adjusting the adjustment bars of the RGB color components (red, green and blue) displayed on the display screen of the customer terminal 3 to adjust colors of the product image on the display screen to colors of the product actually observed.

When the customer can recognize that the colors of the product image on the display screen have become similar to the colors of the actually observed product, the customer may terminate color adjustment of the displayed image, which involved inputting the amount of adjustment via the RGB color-component adjustment bars or the like on the display.

Thus, the customer terminal 3 transmits the product image data whose colors have been adjusted by the customer to the color sample issuing system 1A as evaluation information (comparison results).

Alternatively, information, such as "Redness is insufficient", may be transmitted to the color sample issuing system 1A as evaluation information.

Then, the color sample issuing system 1A adds the evaluation information to the additional color search information in the additional chart design table.

<Examples of Additional Chart Issuance and Color Conversion Information Update of Processes F13 and F14>

Figure 33:
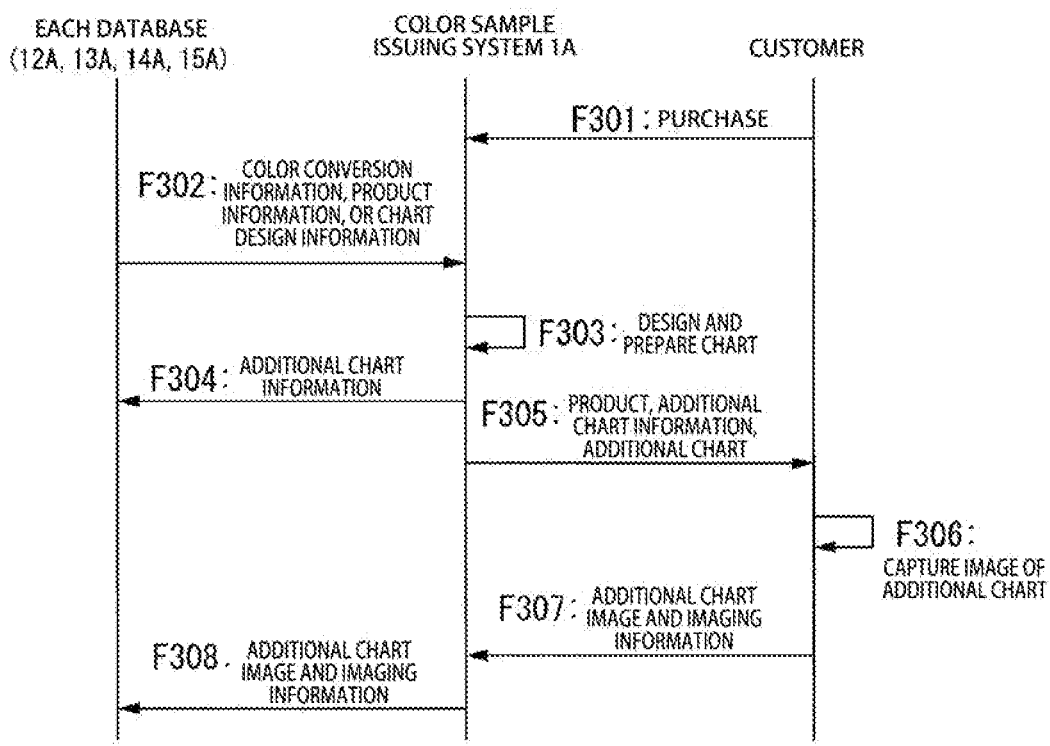
FIG. 33 is a sequence diagram illustrating a processing flow of additional chart for color conversion information update, using the color sample issuing system 1A.

FIG. 33 is a sequence diagram illustrating a processing flow of additional chart issuance for color conversion information update, using the color sample issuing system 1A. In FIG. 33, the customer database 12A, the EC site database 13A, the chart information database 14A, and the device information database 15A are described as databases (12A, 13A, 14A and 15A).

Step F301:

The user performs purchase processing in Process F12 with respect to the EC site of the operating company B for the product of a product image, based on the displayed product image displayed on the display screen of the customer terminal 3 of the user.

Thus, in the color sample issuing system 1A, the product sales server 16A transmits the product specification information (product identification information, etc.) supplied from the customer terminal 3 to the EC site handling the product as product purchase information, together with the customer identification information.

Step F302:

With shipment of the product from the EC site, the color conversion information calculation unit 105A of the color sample issuing system 1A transmits information to the EC site via the data input/output unit 101A to instruct delivery of additional chart information to the customer together with the product. In the case of the present example, the additional chart information indicates transmission of an image of a new additional chart together with imaging information.

The additional chart issuing unit 107A reads color conversion information of the customer who has purchased the product from the color conversion information table of the customer database 12A.

Also, the additional chart issuing unit 107A reads product information of the product (color characteristic information of the product) purchased by the customer from the product color data table of the EC site database 13A.

The additional chart issuing unit 107A reads chart design information of the chart sent to the customer, from the chart information database 14A.

Step F303:

Then, when preparing an additional chart, the additional chart issuing unit 107A extracts colors to be added to the chart from the additional chart design table of the chart information database 14A.

Specifically, the additional chart issuing unit 107A searches through the additional chart design table for additional color search information having a highest similarity to the search conditions, such as color conversion information, color characteristic information used as color swatches in the chart, type of the light source in the lighting environment, and attribute information of the product including the color characteristic information of the product.

Then, the additional chart issuing unit 107A reads additional chart design information corresponding to the searched additional color search information.

Thus, the additional chart issuing unit 107A replaces the color swatches in the chart to design a combination of color swatches in the additional chart, according to the read additional chart design information.

In this case, the design of the additional chart may incorporate comparison results from the customer, light source metamerism in the customer's imaging environment, or observer metamerism of the customer or the camera (imaging device).

Alternatively, for example, the design may incorporate different filter transmittance or camera sensitivity in a part of the color swatches of the chart to obtain an effect as obtained by arranging a filter (filter that changes transmission wavelength) in front of a lens in a camera, or as obtained in multiband imaging in which an image is captured using cameras with different observation sensitivities.

Then, the operating company A prepares an additional chart (e.g., prints it on a paper medium or the like) according to the design information on the combination of the color swatches in the issued additional chart, and issues the prepared additional chart.

Step F304:

Then, the additional chart issuing unit 107A writes and stores the generated additional chart information in the additional chart table of the chart information database 14A, with the chart identification information imparted.

Step F305:

Next, the operating company A delivers the prepared additional chart to the customer by printing it on documents related to product sales and packaging the documents with the product sent from the EC site, or printing it on the packaging material as a printing medium, or directly delivers it to the customer.

According to the product purchase information supplied from the color sample issuing system 1A, the EC site delivers the product specified by the customer to the address registered by the customer, enclosing the additional chart information.

Step F306:

When the additional chart is delivered with the product, the customer refers to the additional chart information enclosed with the product.

Then, the customer captures an image of the additional chart in the observation environment where the product is observed using an imaging device according to the instruction of the additional chart information to acquire an additional chart image.

Step F307:

Then, the customer accesses the color management center (color sample issuing system 1A) and transmits the data of the additional chart image, i.e., an image of the delivered additional chart, to the color management center together with imaging information when imaging the additional chart.

Step F308:

When the data of the additional chart image and the imaging information are supplied from the customer terminal 3, the data input/output unit 101A outputs the data of the additional chart image to the image acquisition unit 103A.

Also, the data input/output unit 101A outputs the imaging information supplied from the customer terminal 3 to the device information acquisition unit 104A and the color conversion information calculation unit 105A.

Then, the image acquisition unit 103A writes the data of the additional chart image in the customer database 12A, and writes and stores the address of the written area in the color conversion information table of the customer database 12A, being correlated with the user identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the color conversion information table.

Then, the color conversion information calculation unit 105A re-calculates color conversion information using the chart image, the additional chart image, the color characteristic information of the chart, the color characteristic information of the additional chart, and the imaging information, and updates the existing color conversion information to the newly calculated color conversion information.

In this case, the color conversion information may be updated through update processing based on numerical calculation with a polynomial or algorithm adjustment such as coefficient adjustment of a model function using a multidimensional function, or through update processing of a model using AI (e.g., machine learning).

Then, the color conversion information calculation unit 105A overwrites the existing color conversion information in the color conversion information table of the customer database 12A with the new color conversion information calculated using the above calculation method, for storage and update.

Furthermore, the color conversion information calculation unit 105A writes and stores information about the calculation method, coefficients, and the like in the site color conversion information table together with the algorithm identification information correlated to this information.

The product purchased by the customer and the additional chart may be imaged together, and the image of the product and the additional chart captured together may be transmitted to the color sample issuing system 1A.

In this case, the color conversion information calculation unit 105A may re-calculate color conversion information by adding the product image (one example of a chart image), the color characteristic information of the product, and the imaging information to the information obtained from the above additional chart.

The product sales server 16A may be provided to the EC site server 2. The product sales server 16A transmits the product specification information (product identification information, etc.) supplied from the customer terminal 3 to the color sample issuing system 1A as product viewing information or product purchase information, together with the customer identification information.

With reference to the drawings, color management according to the present embodiment will be sequentially described, including the operation of the color sample issuing system 1A in the processing flows of Processes F21, F22, F23 and F24.

<Example of Site Color Conversion Information Generation of Process F21>

Figure 34:
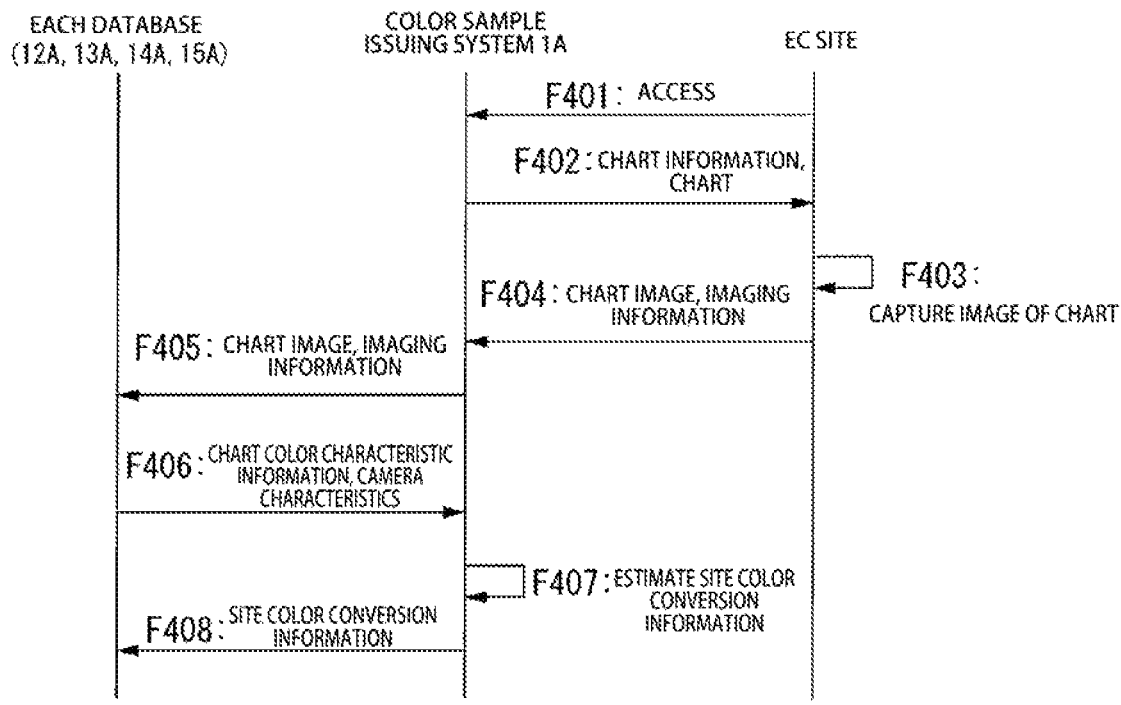
FIG. 34 is a sequence diagram illustrating a processing flow of site color conversion information generation, using the color sample issuing system 1A.

FIG. 34 is a sequence diagram illustrating a processing flow of site color conversion information generation using the color sample issuing system 1A. In FIG. 34, the customer database 12A, the EC site database 13A, the chart information database 14A, and the device information database 15A are described as databases (12A, 13A, 14A and 15A).

Step F401:

The person in charge of an EC site accesses the color sample issuing site (i the color sample issuing server 10A) via the EC site server 2. For example, the person in charge of the EC site may log in with EC site identification information and request registration of the environment information of the observation environment of the EC site.

Thus, the data input/output unit 101A searches through the EC site table of the EC site database 13A with the EC site identification information used when accessing the site to thereby confirm which registered EC site it is.

Step F402:

The chart issuing unit 102A reads EC site attribute information of this EC site and searches through the chart table of the chart information database 14A with the read EC site attribute information.

Then, the chart issuing unit 102A extracts chart search information having a highest similarity to the EC site attribute information and reads a chart image index corresponding to the extracted chart search information.

The chart issuing unit 102A reads a chart image from the chart information database 14A with the chart image index and issues the read chart image as a chart.

Alternatively, the chart issuing unit 102A may extract, for example, a chart preset in the EC site from the chart information table of the chart information database 14A, as a chart corresponding to product images of a product group sold by the EC site and issue the extracted chart.

The operating company A delivers (or mails) the chart issued from the chart table by the chart issuing unit 102A to the address of the operating company B of the EC site.

Step F403:

The person in charge of the EC site captures an image of the chart supplied from the operating company A in an imaging environment where the product would be imaged, e.g., a predetermined position in a studio or the like of the operating company B, to prepare a displayed product image to be viewed by the customer in the EC site.

Step F404:

Then, the person in charge of the EC site transmits a chart image that is an image of the chart, imaging information when capturing the image, and the EC site identification information of the EC site to the color management center (color sample issuing system 1A) from the EC site server 2.

Step F405:

The data input/output unit 101A outputs the chart image supplied from the EC site server 2 to the image acquisition unit 103A.

Also, the data input/output unit 101A outputs the imaging information supplied from the EC site server 2 to the device information acquisition unit 104A and the color conversion information calculation unit 105A.

Then, the image acquisition unit 103A writes data of the chart image in the EC site database 13A.

Also, the image acquisition unit 103A writes and stores the address of the write area into the chart image index of the site color conversion information table which is indicated by the site color conversion information index corresponding to the site identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the site color conversion information table.

Step F406:

The color conversion information calculation unit 105A reads the chart image and the chart identification information from the site color conversion information table, being correlated with the EC site identification information.

Then, the color conversion information calculation unit 105A reads the chart design information index sent to the EC site, from the chart table of the chart information database 14A with the read chart identification information. The color conversion information calculation unit 105A reads color characteristic information of the chart from the storage area indicated by the chart design information index.

The color conversion information calculation unit 105A reads the camera characteristics from the site color conversion information table, being correlated with the EC site identification information.

Step F407:

The color conversion information calculation unit 105A calculates site color conversion information from the chart image, the camera characteristics, and the color characteristic information of the chart.

The site color conversion information is information used for converting the color characteristic information into colorimetric values that would be acquired in the imaging environment of the registered EC site.

The lighting environment estimation unit 106A estimates the type of the light source in the imaging environment from the site color conversion information calculated from the chart.

Step F408:

The color conversion information calculation unit 105A writes and stores the calculated site color conversion information in the site color conversion information table, being correlated with the EC site identification information.

When writing the site color conversion information in the site color conversion information table, the color conversion information calculation unit 105A extracts the time of capturing the chart image from the date and time information contained in the imaging information, and writes and stores the time period (morning time period, daytime period, or night time period) corresponding to the calculated color conversion information in the column of specification data. Furthermore, the information contained in the imaging information, such as position information based on GPS information, EC site setting information, or the like, may be recorded.

The above description is for the case in which a chart is delivered and supplied to an EC site. In this case, a chart for which color conversion information is calculated may be printed in advance together with the chart identification information and the EC site identification information so as to be adjacent to them, on the front or back of the registration card of the color management center, and an image of the chart identification information and the EC site identification information may be captured by the EC site together with the chart.

Alternatively, at the time of registration (at the time of EC site registration) with the color management center, the operating company A running the color management center may enclose the chart when delivering a description for color management method, or the chart identification information and the EC site identification information (character information or graphic information) may be directly printed on the envelope for delivering the description or on the delivery note, or with the address, or on the packaging material. Furthermore, the chart identification information and the EC site identification information (character information or graphic information) may be colored, so that an image thereof can be used for acquiring color conversion information.

In the present embodiment, a chart to be sent to the EC site may be prepared based on the imaging environment for the product in the EC site (information on time period of imaging an article, location of imaging, etc.), using site color conversion information of another EC site with a similar imaging environment that is different from the EC site to which the chart is sent.

<Example of Color Conversion and Display of Product Image of Process F22>

Figure 35:
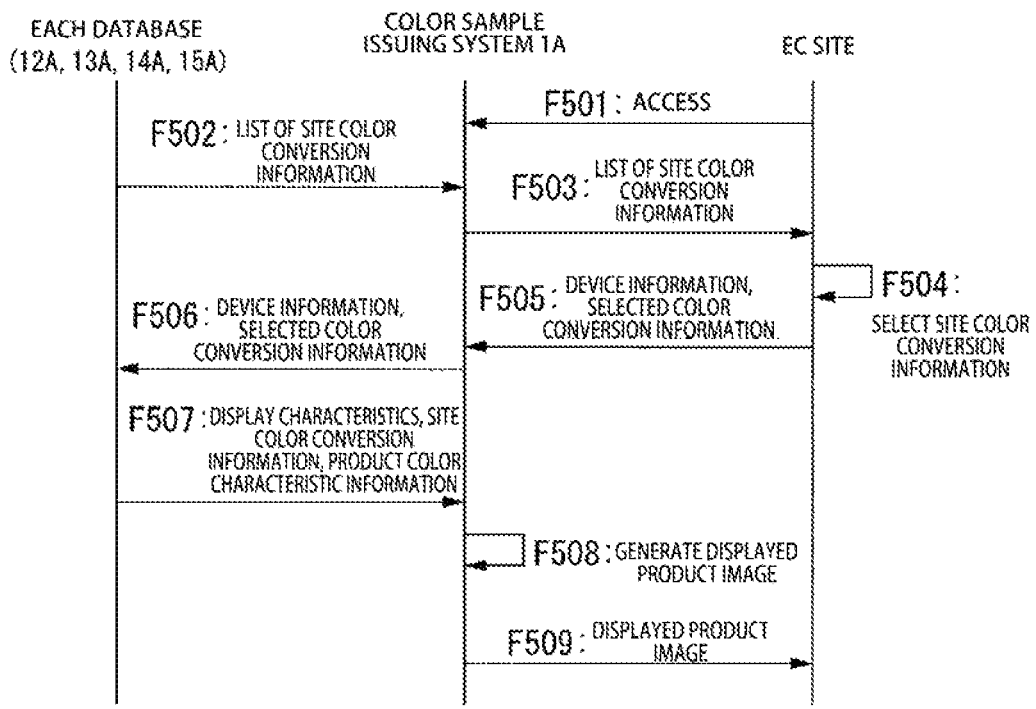
FIG. 35 is a sequence diagram illustrating a processing flow of color conversion and display of a product image, using the color sample issuing system 1A.

FIG. 35 is a sequence diagram illustrating a processing flow of color conversion and display of a product image, using the color sample issuing system 1A. In FIG. 35, the customer database 12A, the EC site database 13A, the chart information database 14A, and the device information database 15A are described as databases (12A, 13A, 14A and 15A).

Step F501:

The person in charge of an EC site accesses the color management center via the EC site server 2. For example, the person in charge of the EC site may log in with EC site identification information and request to view product images of the products registered by the person in charge of the EC site.

Thus, the data input/output unit 101A searches through the EC site table of the EC site database 13A with the EC site identification information used when accessing the site to thereby confirm the EC site which is logged in.

Step F502:

The estimated image generation server 11A searches through the EC site table of the EC site database 13A with the EC site identification information to obtain site color conversion information used when generating a displayed product image, and extracts the site color conversion information table of the EC site accessed.

Step F503:

Then, the estimated image generation server 11A displays a list of specification data of the site color conversion information table on the display screen of the EC site server 2, as a display for the person in charge of the EC site to select site color conversion information.

For the display, character strings are used, such as "morning time period, "daytime period", "night time period", and "preset site color conversion information (ordinary office, sunny conditions outdoors, etc.)", which indicate observation conditions of an observation environment.

Step F504:

The person in charge of the EC site selects a condition corresponding to the observation environment where the person in charge of the EC site observes the actual product, from the list of specification data on the display screen of the EC site server 2.

In this case, for example, if the product is observed at 10 am, the time of observation in the observation environment is within the morning time period. Therefore, the person in charge of the EC site selects the morning time period from the list of specification data on the display screen of the EC site server 2.

If the product is observed around 8 pm, the time of observation in the observation environment is within the night time period. Therefore, the person in charge of the EC site selects the night time period from the list of specification data on the display screen of the EC site server 2. If the location of observation is different from the imaging environment for the product but is observed in an office rather than in a studio, the person in charge of the EC site selects the preset site color conversion information from the list of specification data on the display screen of the EC site server 2.

Step F505:

The EC site server 2 transmits the observation condition selected by the person in charge of the EC site, e.g., a character string selected from among "morning time period", "daytime period", "night time period", "office", "restaurant", and "preset color conversion information", as information to the color sample issuing system 1A.

In this case, the EC site server 2 transmits device specification information (device information) that specifies the display, which will be used as a display screen, to the color sample issuing system 1A together with the character string information.

Step F506:

The data input/output unit 101A outputs the device specification information supplied from the EC site server 2 to the device information acquisition unit 104A.

The device information acquisition unit 104A searches through the device information table of the device information database 15A and reads display characteristics corresponding to the device information, i.e., the device specification information.

The device information acquisition unit 104A writes and stores the read display characteristics in the column of display characteristics in the site color conversion information table.

Step F507:

Then, the estimated image generation server 11A reads the display characteristics from the EC site data table of the EC site database 13A, being correlated with the EC site identification information.

Also, the estimated image generation server 11A reads the site color conversion information (observation condition for the product, or site color conversion information generated being correlated with the attributes of the product) selected by the person in charge of the EC site, from the site color conversion information table.

The estimated image generation server 11A reads product color information for each product observed by the person in charge of the EC site from the product color data table of the EC site database 13A.

Step F508:

Then, the estimated image generation server 11A converts the colorimetric values of product color information in a defined observation environment into colorimetric values in the observation environment of the person in charge of the EC site with the site color conversion information, and generates data for the displayed product image, being correlated with the display characteristics.

Step F509:

The estimated image generation server 11A transmits the generated data for the displayed product image to the EC site server 2 via the data input/output unit 101A.

Thus, the person in charge of the EC site can visually observe a product image on the display screen of the EC site server 2 in color as in the case of observing the actual product in the observation environment of the EC site.

In this case, as in the processing in Step F209, the person in charge of the EC site may observe the actual product and the product image displayed on the display screen of the EC site server 2 for comparison of the visually observed colors, and transmit the comparison results to the color management center.

<Examples of Additional Chart Issuance and Color Conversion Information Update of Processes F23 and F24>

Figure 36:
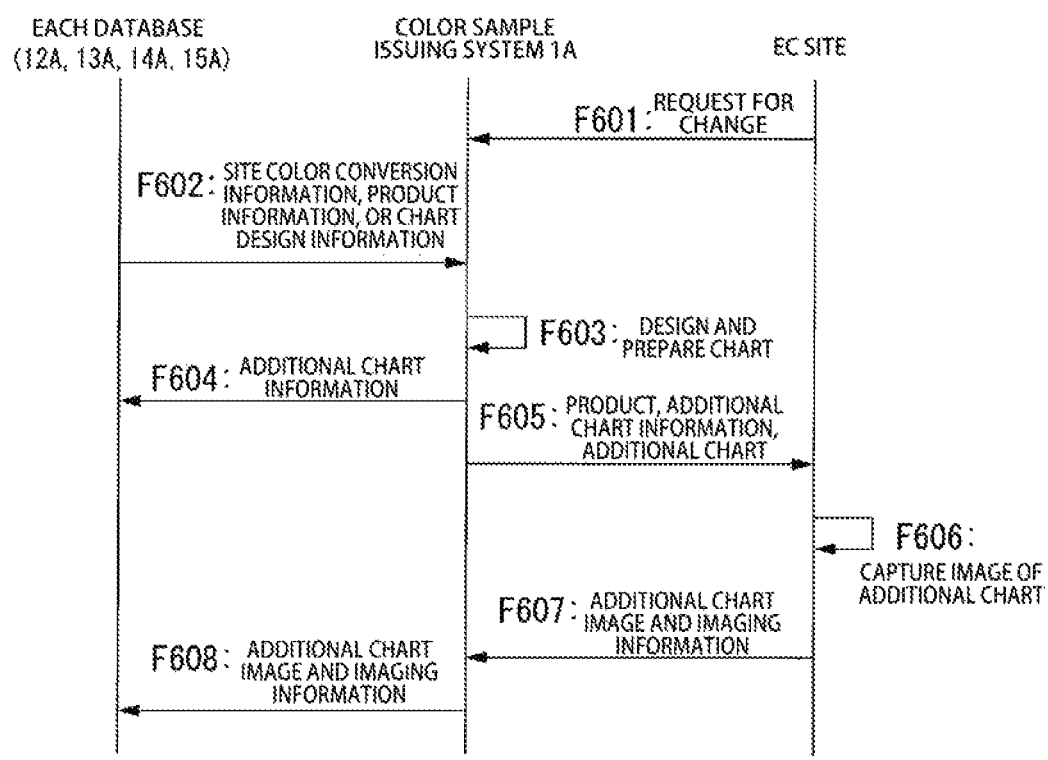
FIG. 36 is a sequence diagram illustrating a processing flow of additional chart issuance for site color conversion information update, using the color sample issuing system 1A.

FIG. 36 is a sequence diagram illustrating a processing flow of additional chart issuance for site color conversion information update, using the color sample issuing system 1A. In FIG. 36, the customer database 12A, the EC site database 13A, the chart information database 14A, and the device information database 15A are described as databases (12A, 13A, 14A and 15A).

Step F601:

If the colors visually observed in the displayed product image in Step F509 are different from the colors of the actual product visually observed in the imaging environment, the person in charge of the EC site accesses the color management center via the EC site server 2 and requests update of the site color conversion information. Then, the EC site server 2 transmits request information, with the EC site identification information added thereto, to the color sample issuing system 1A to request update of the site color conversion information.

Thus, in the color sample issuing system 1A, the additional chart issuing unit 107A extracts the EC site identification information from the request information received from the EC site server 2, and changes the site color conversion information of this EC site.

Step F602:

When a request for changing the site color conversion information of the EC site is received, the data input/output unit 101A outputs a request for preparing an additional chart to the additional chart issuing unit 107A, together with the EC site identification information of the EC site.

Thus, the additional chart issuing unit 107A reads site color conversion information corresponding to the supplied EC site identification information, from the site color conversion information table of the EC site database 13A.

Also, the additional chart issuing unit 107A reads product information of the product (color characteristic information of the product) indicated by the EC site from the product color data table of the EC site database 13A.

The additional chart issuing unit 107A reads chart design information of the chart sent to the EC site, from the chart information database 14A.

Step F603:

Then, when preparing an additional chart, the additional chart issuing unit 107A extracts colors to be added to the chart from the additional chart design table of the chart information database 14A.

Specifically, the additional chart issuing unit 107A searches through the additional chart design table for additional color search information having a highest similarity to the search conditions, such as site color conversion information, color characteristic information used as color swatches in the chart, type of the light source in the lighting environment, and color characteristic information of the product.

Then, the additional chart issuing unit 107A reads additional chart design information corresponding to the searched additional color search information.

Thus, the additional chart issuing unit 107A replaces the color swatches in the chart to design a combination of color swatches in the additional chart, according to the read additional chart design information.

In this case, the design of the additional chart may incorporate comparison results of the person in charge of the EC site, light source metamerism in the imaging environment of the EC site, or observer metamerism of the person in charge of the EC site or the camera.

Then, the operating company A prepares an additional chart (e.g., prints it on a paper medium or the like) according to the design information on the combination of the color swatches in the issued additional chart, and issues the prepared additional chart.

Alternatively, for example, the design may incorporate different filter transmittance or camera sensitivity in a part of the color swatches of the chart to obtain an effect as obtained by arranging a filter (filter that changes transmission wavelength) in front of a lens in a camera, or as obtained in multiband imaging in which an image is captured using cameras with different observation sensitivities.

Step F604:

Then, the additional chart issuing unit 107A writes and stores the generated additional chart information in the additional chart table of the chart information database 14A, with the chart identification information imparted.

Step F605:

Then, the operating company A delivers the prepared additional chart to the address registered by the person in charge of the EC site.

Step F606:

When the additional chart is delivered, the person in charge of the EC site refers to the additional chart information.

Then, the person in charge of the EC site captures an image of the additional chart in the observation environment where the product is imaged using an imaging device, according to the instruction of the additional chart information to acquire an additional chart image.

Step F607:

Then, the person in charge of the EC site accesses the color management center (color sample issuing system 1A) and transmits the data of the additional chart image, i.e., an image of the delivered additional chart, to the color management center together with imaging information when imaging the additional chart.

Step F608:

When the data of the additional chart image and the imaging information are supplied from the EC site server 2, the data input/output unit 101A outputs the data of the additional chart image to the image acquisition unit 103A Also, the data input/output unit 101A outputs the imaging information supplied from the EC site server 2 to the device information acquisition unit 104A and the color conversion information calculation unit 105A.

Then, the image acquisition unit 103A writes the data of the additional chart image in the EC site database 13A, and writes and stores the address of the written area in the site color conversion information table of the EC site database 13A, being correlated with the EC site identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the EC site table.

Then, the color conversion information calculation unit 105A re-calculates site color conversion information using the chart image, the additional chart image, the color characteristic information of the chart, the color characteristic information of the additional chart, the comparison results, and the imaging information, and updates the existing site color conversion information to the newly calculated site color conversion information.

In this case, the site color conversion information may be updated through update processing based on numerical calculation with a polynomial or algorithm adjustment such as coefficient adjustment of a model function using a multidimensional function, or through update processing of a model using AI (e.g., machine learning).

Then, the color conversion information calculation unit 105A overwrites the existing color conversion information in the site color conversion information table of the EC site database 13A with the new site color conversion information calculated using the above calculation method, for storage and update.

The product observed by the person in charge of the EC site and the additional chart may be imaged together, and the image of the product and the additional chart captured together may be transmitted to the color sample issuing system 1A.

In this case, the color conversion information calculation unit 105A may re-calculate site color conversion information by adding the product image (one example of a chart image), the color characteristic information of the product, and the imaging information, to the information obtained from the above additional chart.

As described above, according to the present embodiment, an additional chart enabling acquisition of more information about the lighting environment (the imaging environment or the observation environment) can be generated based on the color characteristic information of the chart, color conversion information (including site color conversion information), comparison results, and the like obtained from the chart. Therefore, information about the light source in the imaging environment where the product in the EC site is imaged or in the observation environment where the customer observes the product can be acquired. Accordingly, high accuracy can be ensured when acquiring the site color conversion information for acquiring color characteristic information from an image of the product captured in the imaging environment, and the color conversion information for converting the color characteristic information into a color image for the observation environment where the product is observed.

Therefore, according to the present embodiment, color characteristic information can be obtained with high accuracy from an image of the product captured in the EC site with the acquired color conversion information, and a displayed product image can be generated from the color characteristic information, using the color conversion information corresponding to the observation environment of the customer. Accordingly, the colors of the displayed product image and the colors of product in the observation environment of the customer can be similarly visually observed.

Third Embodiment

A third embodiment of the present invention will be described with reference to the drawings. In the present embodiment, definitions similar to those of the first embodiment are applied to color samples (a chart as a first color sample and a chart as a second color sample) and color sample information (chart information as first color sample information and chart information as second color sample information).

Figure 37:
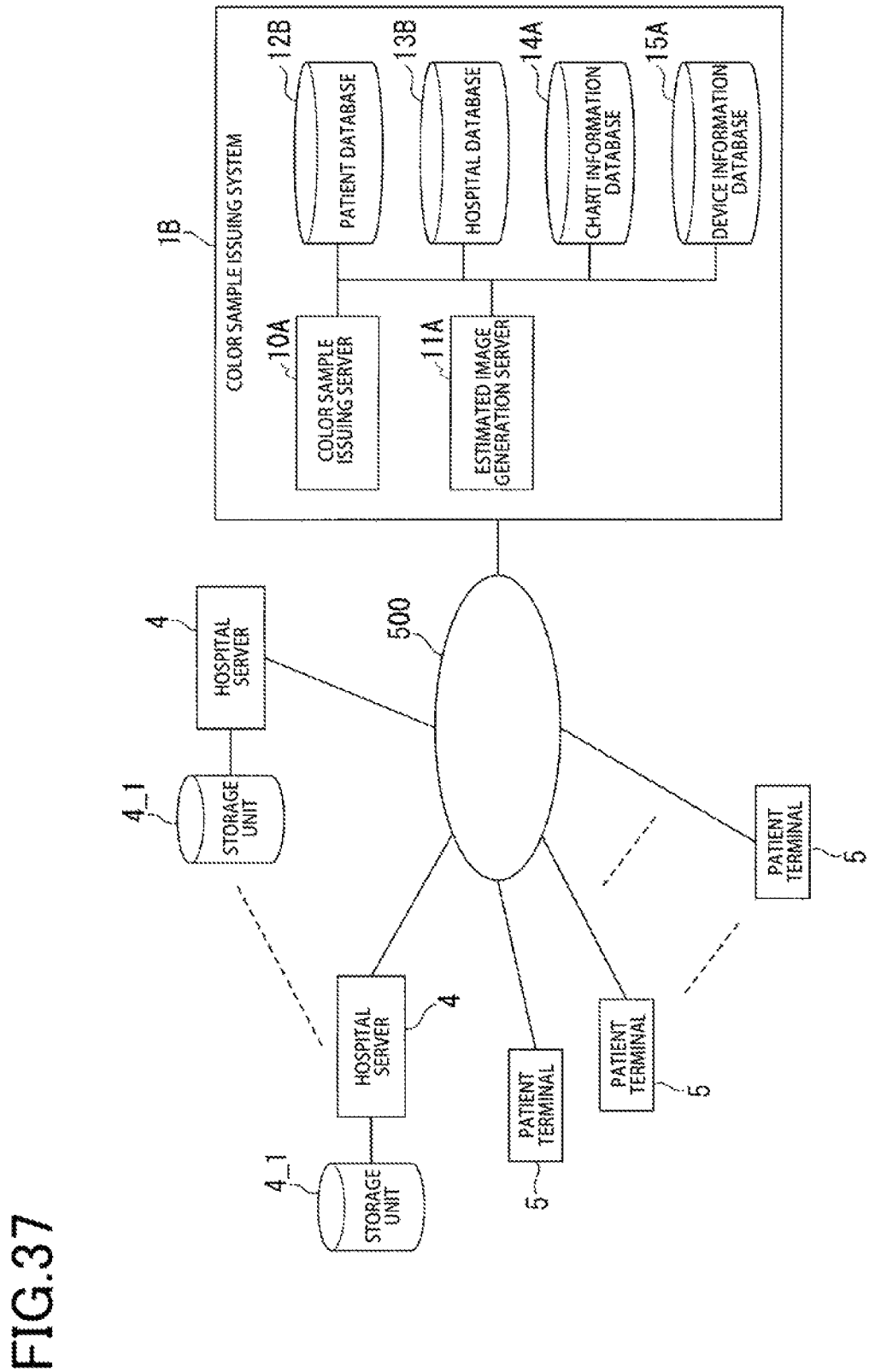
FIG. 37 is a block diagram illustrating a configuration example of a color management system using a color sample issuing system, according to a third embodiment of the present invention.

FIG. 37 is a block diagram illustrating a configuration example of a color management system using a color sample issuing system (color conversion information system which may be simply indicated as a color sample issuing system hereinafter), according to the third embodiment of the present invention. In FIG. 37, the color management system has a configuration in which a color sample issuing system (color conversion information generation system) 1B, hospital servers 4, and patient terminals 5 are connected to each other via a network 500 including the Internet. Each storage unit 4_1 stores an electronic record (image of the patient's affected area, diagnosis results, etc.) of each patient diagnosed and treated through telemedicine of a hospital where the hospital server 4 is installed.

In the present embodiment, the user may, for example, be a medical doctor (or hospital officials other than the medical doctor) who performs telemedicine, or a patient (or persons other than the patient) who is treated and diagnosed through telemedicine of the hospital. An object to be imaged may be an affected area (e.g., area of eczema, bruise, blemish, or the like on the skin) or the like of a patient using telemedicine.

Therefore, the color management center is installed, for example, in an operating company A that manages telemedicine to support telemedicine for patients by correctly providing the clinical conditions of an affected area of each patient to a medical doctor. Specifically, in the telemedicine support, when a medical doctor observes an affected area in an observation environment for observing the affected area (in a lighting environment, e.g., under the light source of the location where the medical doctor observes the affected area) on the display screen of the hospital server 4, the affected area is displayed and visually observed with colors similar to the colors of the actual affected area.

The object to be imaged in the present embodiment is a part or all of a patient's body which is diagnosed by a medical doctor of the hospital performing telemedicine. In particular, since colors of the patient's skin depend on the clinical conditions, the difference in color from the surrounding skin is an important criterion for the examination and diagnosis of the medical doctor. Therefore, if the displayed colors visually observed on the display screen of the hospital server 4 are different from the actual colors visually observed in characteristics of the observation environment of the medical doctor (characteristics of the light source as a lighting in the lighting environment, e.g., spectral radiance characteristics), the color difference may prevent the medical doctor from making a correct diagnosis. Thus, it is important to adjust colors of an image of the affected area (displayed affected area image described later) of the patient displayed on the display screen of the hospital server 4.

A color sample issuing system 1B includes a color sample issuing server 10A, an estimated image generation server 11A, a patient database 12B, a hospital database 13B, a chart information database 14A, and a device information database 15A The color sample issuing system 1B generates color conversion information (including hospital color conversion information) used for converting an image of an affected area captured by each patient in the imaging environment of the patient into a displayed affected area image that can be visually observed as the actual colors of the affected area in the observation environment of a medical doctor, or generates a chart and an additional chart for obtaining color characteristic information for correctly propagating the colors of the affected area, and issues the generated data to the user (the patient or the medical doctor).

Hereinafter, configurations and operations different from those of the first embodiment will be described. In the present embodiment, user attribute information includes patient attribute information or hospital attribute information.

FIG. 38 is a diagram illustrating a configuration example of a patient data table in the patient database 12B. The patient data table is provided for each hospital. For example, for each record, the patient data table is provided with columns of patient attribute information, color conversion information index, image evaluation index, printer characteristics, display characteristics, and camera characteristics, being correlated with the patient identification information.

The patient identification information is information for identifying each patient. The patient attribute information is attribute information of the patient indicated by the patient identification information, and may include patient name, disease name, gender, age, address, phone number, email address, past medical history, occupation, time period of stay in the environment, and the like. The type of place of lighting environment refers to the size of the space, the presence or absence of windows, the colors of the walls, ceiling and floor of the room. The color conversion information index (see FIG. 6) is an index such as an address of the area storing a color conversion information table, that is, a list of color conversion information corresponding to the lighting environment where the patient has a possibility of capturing an image, including a plurality of different pieces of color conversion information and preset color conversion information in the imaging environment of the patient indicated by the patient identification information.

The image evaluation index is an index such as an address of the area storing an affected area color evaluation table containing evaluation for the colors of the displayed affected area image of the patient, for the affected area indicated by the patient identification information. The printer characteristics correspond to information including printer output color information, such as an ICC profile and spectroscopic information of inks (ink information) of the printer which is used by the patient to print an affected area image or a color sample, and medium information of paper used for printing the affected area image. The display characteristics correspond to luminescence information including an ICC profile, spectral radiance, and tristimulus values. The camera characteristics may include, for example, spectral sensitivity information of a camera (imaging device). These printer characteristics, display characteristics, and camera characteristics are written into corresponding columns of the patient data table by the device information acquisition unit 104A mentioned above.

The color conversion information table stored in the area indicated by the color conversion information index has a configuration as in the first embodiment.

FIG. 39 is a diagram illustrating a configuration example of an image evaluation table in the patient database 12B. The image evaluation table is written to and stored in the patient database 12B. The image evaluation table is provided for each patient. For each record, the image evaluation table is provided with a column of color evaluation for the colors of an affected area in an image corresponding to the affected area identification information, being correlated with the affected area identification information. The affected area identification information is information for identifying each affected area of the patient.

Color information evaluation includes evaluation of colors of an imaged affected area, and thus may include, for example, "Suitable", "Redness is insufficient", "Should be re-imaged due to color difference" as a result of the patient's color adjustment described later, and the like.

FIG. 40 is a diagram illustrating a configuration example of a hospital data table in the hospital database 13B. For each record, the hospital data table is provided, for example, with columns of hospital attribute information, hospital color conversion information index, comparison results index, printer characteristics, display characteristics, and camera characteristics, being correlated with the hospital identification information. The hospital identification information is information for identifying each hospital. The hospital attribute information corresponds to attribute information of the hospital indicated by the hospital identification information, and may include hospital name, type of the place of lighting environment, type of medical treatment, patient age range, phone number, email address, and time periods of medical examination/treatment in the lighting environment. The type of place of lighting environment refers to the size of the space, the presence or absence of windows, the colors of the walls, ceiling and floor of the room. The hospital color conversion information index is an index such as an address of the area storing a hospital color conversion information table, that is, a list of color conversion information available for the medical doctors of the hospital, including a plurality of different pieces of hospital color conversion information and preset color conversion information in the observation (medical examination/diagnosis) environment of the hospital indicated by the hospital identification information.

The comparison results index is an index such as an address of the area in the hospital database 13B storing a file that shows information (color evaluation information) resulting from comparison between the visually observed colors of an image of a displayed affected area of another patient which has been captured in the observation environment by a medical doctor of the hospital indicated by the hospital identification information and the visually observed colors of the actual affected area of this patient. The comparison results may be provided in any way as long as there is shown information indicating difference in visually observed color between the actual affected area and the displayed affected area image, such as blue being too weak or red being too strong, or shown information indicating a color difference, such as a color adjustment amount (adjustment amount of the RGB color components) achieving similar visual observation as a result of color adjustment of the displayed affected area image using an application of hospital server 4. The printer characteristics correspond to information including printer output color information, such as an ICC profile and spectroscopic information of inks of the printer which is used by the hospital to print an affected area image or a color sample, and medium information of paper used for printing the affected area image. The display characteristics correspond to luminescence information including an ICC profile, spectral radiance, and tristimulus values. The camera characteristics may include, for example, spectral sensitivity information of a camera. These printer characteristics, display characteristics, and camera characteristics are written into corresponding columns of the hospital data table by the device information acquisition unit 104A mentioned above.

FIG. 41 is a diagram illustrating a configuration example of an affected area color data table in the hospital database 13B. The affected area color data table is written to and stored in the hospital database 13B. The affected area color data table is provided for each hospital. For each record, the affected area color data table is provided with columns of affected area image index, affected area color information index, and affected area information index, being correlated with the affected area identification information. The affected area identification information is information for identifying each affected area of the patient. The affected area image index is an index such as an address of the area in the hospital database 13B that stores data for the image captured under the light source of an imaging environment of each patient.

The affected area color information index is an index such as an address of the area in the hospital database 13B that stores color characteristic information data for the spectroscopic image of the affected area of the patient, an affected area reflectance image indicating spectral reflectance of each pixel, an affected area image in a defined observation environment, and the like. The affected area information index is an index such as an address of the area in the hospital database 13B that stores information indicating spectral reflectance of an affected area and the part of the body containing the affected area. The term part refers to attribute information indicating a position in a body. For example, in the case of the skin, the part may be an arm, leg, abdomen, head, or the like. As described above, material or color characteristic information of the printing medium of a chart or an additional chart may be designed depending on the part of the body containing the affected area or the part of the patient body observed by the medical doctor for making a diagnosis, or color conversion may be performed using color conversion information that is different between parts of the body.

FIG. 42 is a diagram illustrating a configuration example of a hospital color conversion information table in the hospital database 13B. The hospital color conversion information table is written to and stored in the hospital database 13B. The hospital color conversion information table is provided for each hospital. For each record, the hospital color conversion information table is provided with columns of chart image index, additional chart image index, chart identification information, hospital color conversion information, algorithm identification information, and specification data, being correlated with the hospital color conversion information identification information.

The hospital color conversion information identification information is information for identifying each piece of hospital color conversion information. The chart image index is an index such as an address of the area where image data of the chart (first color sample) is written to and stored in the database. The data for the chart image may be provided as the form of a data table containing pixel positions of pixels extracted from the chart image and pixel values of the pixels indicated by the pixel positions.

The additional chart image index is an index such as an address of the area where image data of the additional chart (second color sample) is written to and stored in the hospital database 13B. The data for the additional chart image may be provided as the form of a data table containing pixel positions of pixels extracted from the additional chart image and pixel values of the pixels indicated by the pixel positions.

The chart identification information is identification information of the chart, and the additional chart identification information is identification information of the additional chart.

The hospital color conversion information corresponds to spectral radiance of the light source or a tristimulus transformation matrix in an environment where the hospital has captured an image of the chart or the additional chart. The tristimulus transformation matrix is a matrix with which colorimetric values of a defined observation environment (e.g., a combination of CIE (international commission on illumination)_D50 and a 2-degree field standard observer, or a combination of CIE_D65 and a 10-degree field standard observer) are converted (color-converted) into device values in terms of the spectral radiance of the light source in an environment where the hospital has captured an image, and the camera characteristics of the camera used for imaging. This color conversion may be performed in reverse. That is, device values in terms of the spectral radiance of the light source in the environment where the hospital has captured an image, and the camera characteristics of the camera used for imaging, may be converted into a spectral reflectance of an affected area or colorimetric values defining the environment. Specifically, the hospital color conversion information is conversion information between a spectral reflectance of an affected area or color characteristic information as colorimetric values defining the observation, and colorimetric values observed in the hospital environment.

The algorithm identification information is information used for identifying the algorithm used when color conversion information is calculated by the color conversion information calculation unit 105A, and thus identifies a color conversion information calculation algorithm selected according to the color characteristic information of a body observed by the medical doctor, attribute of the disease state of the affected area, similar case in the past, indoor/outdoor lighting information, and the like.

The specification data is information indicating specification of hospital color conversion information. The specification data indicates an applied time range of the corresponding hospital color conversion information, including a morning time period, a daytime period, and a night time period. The morning time period may, for example, be a time period from sunrise to 12:00 noon. The daytime period may, for example, be a time period from 12:00 noon to sunset. The specification data may include location information on where the medical doctor of the hospital observes an affected area, and thus can specify hospital color conversion information in a medical doctor's office where the medical doctor of the hospital examines the affected area of a patient.

The night time period is, for example, from sunset to sunrise. The preset hospital color conversion information is hospital color conversion information common to individual hospitals, i.e., a transformation matrix used for converting a spectral radiance of sunlight or of a light source in an ordinary medical doctor's office, or color characteristic information defining an environment, into colorimetric values visually observed in sunny conditions outdoors or in a medical doctor's office.

For additional charts, processing as in the processing related to hospital color conversion information acquisition performed for the second additional chart (second color sample) is performed for a third additional chart (third color sample) to an nth additional chart (nth color sample) that follow the second additional chart.

With reference to the drawings, color management according to the third embodiment will be sequentially described, including the operation of the color sample issuing system 1B in the processing flows of Processes F11, F12, F13 and F14 of the present embodiment.

<Example of Patient Color Conversion Information Generation According to Process F11>

FIG. 43 is a sequence diagram illustrating a processing flow for an example of patient color conversion information generation using the color sample issuing system 1B. In FIG. 43, the patient database 12B, the hospital database 13B, the chart information database 14A, and the device information database 15A are described as databases (12B, 13B, 14A and 15A). The following processing is described as being performed by a patient, but a patient's family member or other person tending to the patient may perform the processing, instead, including imaging of the affected area of the patient.

Step F101A:

A patient accesses the color management center (color sample issuing system 1B) via the patient terminal 5. For example, the patient may log in with patient identification information and request registration of environment information of the patient's imaging environment.

Thus, the data input/output unit 101A searches through the patient table of the patient database 12B with the patient identification information used when accessing to thereby confirm which telemedicine programs of the hospital the patient is registered with.

Step F102A:

The chart issuing unit 102A reads patient attribute information of the patient and searches through the chart table of the chart information database 14A with the read patient attribute information.

Then, the chart issuing unit 102A extracts chart search information having a highest similarity to the patient attribute information and reads a chart image index corresponding to the extracted chart search information.

The chart issuing unit 102A reads a chart image from the chart information database 14A with the chart image index and issues the read chart image as a chart.

The chart issuing unit 102A may extract a chart, e.g., a chart of a similar case corresponding to the attributes of the disease state (the part of the body containing the affected area, disease state of the affected area, etc.) preset in the hospital and estimated from the disease state declared by patient, from the chart information table of the chart information database 14A, as a chart corresponding to the affected area images of a patient group in the medical examination/diagnosis of the hospital, and may issue the extracted chart.

The operating company A delivers (or mails) the chart issued from the chart table by the chart issuing unit 102A to the address of the patient.

Step F103A:

The patient captures an image of the chart supplied from the operating company A in the imaging environment where the patient would capture an image of the affected area, e.g., at a predetermined position in a room where the patient terminal 5 is installed.

Step F104A:

Then, the patient transmits a chart image that is an image of the chart, imaging information when capturing the image, and the patient identification information of the patient to the color management center (color sample issuing system 1B) from the patient terminal 5.

Step F105A:

The data input/output unit 101A outputs the chart image supplied from the patient terminal 5 to the image acquisition unit 103A.

Also, the data input/output unit 101A outputs the imaging information supplied from the patient terminal 5 to the device information acquisition unit 104A and the color conversion information calculation unit 105A.

Then, the image acquisition unit 103A writes data of the chart image in the patient database 12B.

Also, the image acquisition unit 103A writes and stores the address of the write area into the chart image index of the color conversion information table which is indicated by the color conversion information index corresponding to the patient identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the color conversion information table.

Step F106A:

The color conversion information calculation unit 105A reads the chart image and the chart identification information from the color conversion information table, being correlated with the patient identification information.

Then, the color conversion information calculation unit 105A reads the chart design information index sent to the patient, from the chart table of the chart information database 14A with the read chart identification information. The color conversion information calculation unit 105A reads color characteristic information of the chart from the storage area indicated by the chart design information index.

Furthermore, the color conversion information calculation unit 105A reads the camera characteristics from the color conversion information table, being correlated with the patient identification information.

Step F107A:

The color conversion information calculation unit 105A calculates color conversion information from the chart image, the camera characteristics, and the color characteristic information of the chart.

The color conversion information is information used for converting the color characteristic information into colorimetric values that would be acquired in the imaging environment where the registered patient captures an image of the affected area.

The lighting environment estimation unit 106A estimates the type of the light source in the imaging environment from the color conversion information calculated from the chart.

Step F108A:

The color conversion information calculation unit 105A writes and stores the calculated color conversion information in the color conversion information table, being correlated with the patient identification information.

When writing the color conversion information in the color conversion information table, the color conversion information calculation unit 105A extracts the time of capturing the chart image from the date and time information contained in the imaging information, and writes and stores the time period (morning time period, daytime period, or night time period) corresponding to the calculated color conversion information in the column of specification data. Furthermore, the information contained in the imaging information, such as position information based on GPS information, patient specification information, or the like, may be recorded.

The above description is for the case in which a chart is delivered and supplied to a patient. In this case, a chart for which color conversion information is calculated may be printed in advance together with the chart identification information and the patient identification information so as to be adjacent to them, on the front or back of the registration card of telemedicine of the hospital, and an image of the chart identification information and the patient identification information may be captured by the patient together with the chart. The chart identification information may be a barcode, 2D barcode, or the like as in the first embodiment. Thus, the chart may be easily correlated with the patient. Furthermore, the chart identification information may be colored, so that an image thereof can be used not only for correlating with the patient based on the patient identification information, but also for simultaneously acquiring color conversion information.

Alternatively, at the time of registration (at the time of patient registration) with the telemedicine service of the hospital, the operating company A running the color management center may print the chart on the telemedicine description, or enclose the chart when delivering the telemedicine description, or the chart identification information and the patient identification information (character information or graphic information) may be directly printed on the envelope for delivering the description or on the delivery note, or with the address, or on the packaging material, or colored with colors of the color characteristics for use as predetermined color swatches. Furthermore, the chart identification information and the patient identification information (character information or graphic information) may be colored, so that an image thereof can be used for acquiring color conversion information.

In the present embodiment, a chart designed in advance based on chart design information is used for estimating color conversion information for the patient's imaging environment. However, an instruction for capturing an image of the package of a generally distributed product, other than this chart, may be provided as chart information. As in the processing of Step F104A described above, the patient may capture an image of such a package and transmit the image to the color management center from the patient terminal 5. If the package is a generally used package, color characteristic information of a predetermined printed region can be easily obtained and thus color conversion information can be calculated.

In the present embodiment, a chart to be sent to the patient may be prepared based on the patient's imaging environment (information on time period of imaging an affected area, location of imaging, etc.), using color conversion information of another patient with a similar imaging environment who is different from the patient to whom the chart is sent.

<Example of Color Conversion and Display of Affected Area Image of Patient According to Process F12>

Figure 44:
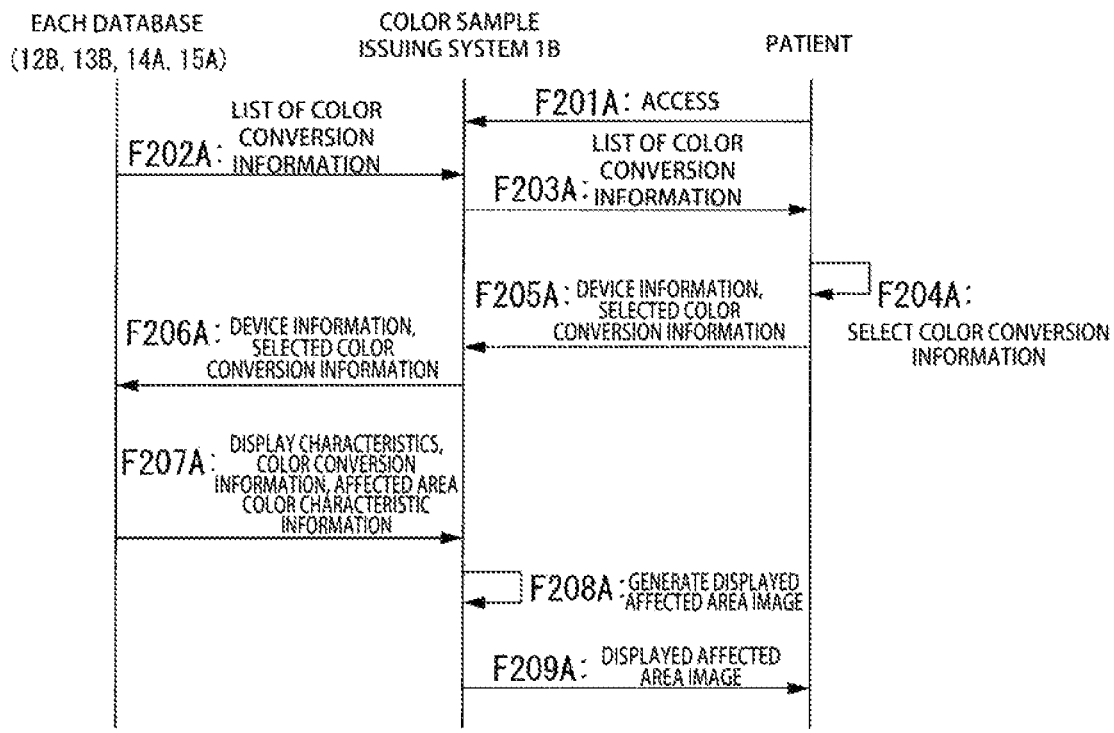
FIG. 44 is a sequence diagram illustrating a processing flow of color conversion and display of a patient image, using the color sample issuing system 1B.

FIG. 44 is a sequence diagram illustrating a processing flow of color conversion and display of a patient image, using the color sample issuing system 1B. In FIG. 44, the patient database 12B, the hospital database 13B, the chart information database 14A, and the device information database 15A are described as databases (12B, 13B, 14A and 15A). The following processing is described as being performed by a patient, but a patient's family member or other person tending to the patient may perform the processing, instead, including imaging of the affected area of the patient.

Step F201A:

The patient accesses the color management center via the patient terminal 5. For example, the patient may log in with patient identification information and request to view the image of the affected area that the patient registered.

Thus, the data input/output unit 101A searches through the patient table of the patient database 12B with the patient identification information used when accessing, to thereby confirm the patient that is logged in.

Step F202A:

The estimated image generation server 11A searches through the patient table of the patient database 12B with the patient identification information to obtain color conversion information used when generating a displayed affected area image, and extracts the color conversion information table of the accessing patient.

Step F203A:

Then, the estimated image generation server 11A displays a list of specification data of the color conversion information table on the display screen of the patient terminal 5, as a display for the patient to select color conversion information.

For the display, character strings are used, such as "morning time period", "daytime period", "night time period", and "preset color conversion information (ordinary office, sunny conditions outdoors, etc.)", which indicate observation conditions in an observation environment.

Step F204A:

The patient selects a condition corresponding to the imaging environment where the patient captures an image of the affected area, from the list of specification data on the display screen of the patient terminal 5.

In this case, for example, if the affected area is observed at 10 am, the time of imaging in the imaging environment is within the morning time period. Therefore, the patient selects the morning time period from the list of specification data on the display screen of the patient terminal 5.

If an image is captured around 8 pm, the time of imaging in the imaging environment is within the night time period. Therefore, the patient selects the night time period from the list of specification data on the display screen of the patient terminal 5. If the location of observation is different from the imaging environment for the affected area but is observed in a living room rather than in the patient's room, the patient selects the preset color conversion information from the list of specification data on the display screen of the patient terminal 5.

Step F205A:

The patient terminal 5 transmits the imaging condition selected by the patient, e.g., a character string selected from among "morning time period", "daytime period", "night time period", "office", "restaurant", and "preset color conversion information", as information to the color sample issuing system 1B.

In this case, the patient terminal 5 transmits device specification information (device information) that specifies the display, which will be used as a display screen, to the color sample issuing system 1B together with the character string information.

Step F206A:

The data input/output unit 101A outputs the device specification information supplied from the patient terminal 5 to the device information acquisition unit 104A.

The device information acquisition unit 104A searches through the device information table of the device information database 15A and reads display characteristics corresponding to the device information, i.e., the device specification information.

The device information acquisition unit 104A writes and stores the read display characteristics in the column of display characteristics in the color conversion information table.

Step F207A:

Then, the estimated image generation server 11A reads the display characteristics from the patient data table of the patient database 12B, being correlated with the patient identification information.

Also, the estimated image generation server 11A reads the color conversion information (imaging condition for the affected area, or color conversion information corresponding to the affected area) selected by the patient from the color conversion information table.

The estimated image generation server 11A reads affected area color characteristic information of the affected area observed by the patient from the affected area color data table of the hospital database 13B.

Step F208A:

Then, the estimated image generation server 11A converts the colorimetric values of affected area color information in a defined observation environment into colorimetric values in the imaging environment of the patient, based on the color conversion information, and generates data for the displayed affected area image, being correlated with the display characteristics.

Step F209A:

The estimated image generation server 11A transmits the generated data for the displayed affected area image to the patient terminal 5 via the data input/output unit 101A.

Thus, the patient can visually observe an affected area image on the display screen of the patient terminal 5 in color as in the case of observing the actual affected area of the patient in the imaging environment of the patient.

<Additional Chart Issuance to Patient and Color Conversion Information Update Corresponding to Processes F13 and F14>

Figure 45:
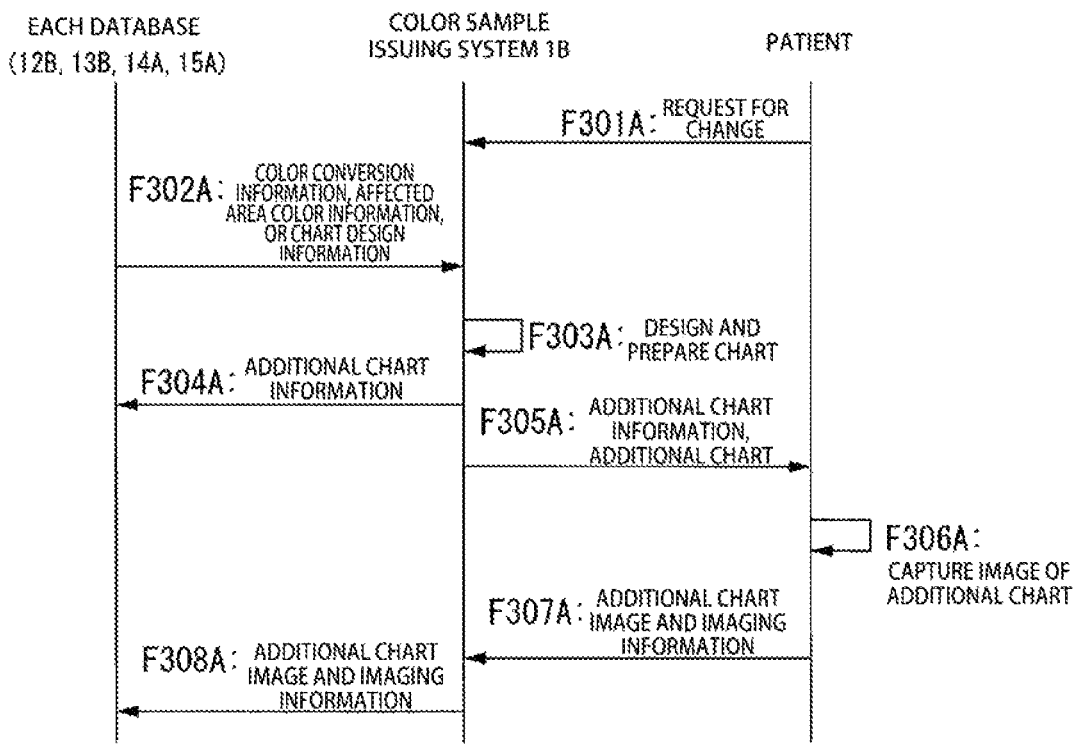
FIG. 45 is a sequence diagram illustrating a processing flow of additional chart issuance for color conversion information update, using the color sample issuing system 1B.

FIG. 45 is a sequence diagram illustrating a processing flow of additional chart issuance for color conversion information update, using the color sample issuing system 1B. In FIG. 45, the patient database 12B, the hospital database 13B, the chart information database 14A, and the device information database 15A are described as databases (12B, 13B, 14A and 15A). The following processing is described as being performed by a patient, but a patient's family member or other person tending to the patient may perform the processing, instead, including imaging of the affected area of the patient.

Step F301A:

If the colors visually observed in the displayed affected area image in Step F209A are different from the colors of the actual affected area visually observed in the imaging environment, the patient accesses the color management center via the patient terminal 5 and requests update of the color conversion information.

Then, the patient terminal 5 transmits request information, with the patient identification information added thereto, to the color sample issuing system 1B to request update of the color conversion information.

Thus, in the color sample issuing system 1B, the additional chart issuing unit 107A extracts the patient identification information from the request information received from the patient terminal 5, and updates the color conversion information of this patient.

The processing of requesting update of color conversion information may be performed by a medical doctor who performs remote diagnosis.

Step F302A:

When an update request for the color conversion information of the patient is received, the data input/output unit 101A outputs a request for preparing an additional chart to the additional chart issuing unit 107A, together with the patient identification information of the patient.

Thus, the additional chart issuing unit 107A reads color conversion information corresponding to the supplied patient identification information, from the color conversion information table of the patient database 12B.

Also, the additional chart issuing unit 107A reads affected area color information of the affected area (color characteristic information of the affected area) indicated by the patient from the affected area color data table of the hospital database 13B.

The additional chart issuing unit 107A reads chart design information of the chart sent to the patient, from the chart information database 14A.

Step F303A:

Then, when preparing an additional chart, the additional chart issuing unit 107A extracts colors to be added to the chart from the additional chart design table of the chart information database 14A.

Specifically, the additional chart issuing unit 107A searches through the additional chart design table for additional color search information having a highest similarity to the search conditions, such as color conversion information of the patient body observed by the medical doctor, hospital color conversion information, color characteristic information used as color swatches in the chart, type of the light source in the lighting environment, color characteristic information of the affected area of the patient, results of diagnosis of the medical doctor, and similar case in the past.

Then, the additional chart issuing unit 107A reads additional chart design information corresponding to the searched additional color search information.

Thus, the additional chart issuing unit 107A replaces the color swatches in the chart to design a combination of color swatches in the additional chart, according to the read additional chart design information.

In this case, the design of the additional chart may incorporate comparison results of the patient, light source metamerism in the patient's imaging environment, or observer metamerism of the patient or the camera.

Alternatively, for example, the design may incorporate different filter transmittance or camera sensitivity in a part of the color swatches of the chart to obtain an effect as obtained by arranging a filter (filter that changes transmission wavelength) in front of a lens in a camera, or as obtained in multiband imaging in which an image is captured using cameras with different observation sensitivities.

Then, the operating company A prepares an additional chart (e.g., prints it on a paper medium or the like) according to the design information on the combination of the color swatches in the issued additional chart, and issues the prepared additional chart.

Step F304A:

Then, the additional chart issuing unit 107A writes and stores the generated additional chart information in the additional chart table of the chart information database 14A, with the chart identification information imparted.

Step F305A:

Then, the operating company A delivers the prepared additional chart to the address registered by the patient.

Step F306A:

When the additional chart is delivered, the patient refers to the additional chart information.

Then, the patient captures an image of the additional chart in the imaging environment where the affected area of the patient is imaged using an imaging device, according to the instruction of the additional chart information to acquire an additional chart image. The additional chart does not have to be imaged by the patient but may be imaged by another person as long as it is imaged in the imaging environment.

Step F307A:

Then, the patient accesses the color management center (color sample issuing system 1B) and transmits the data of the additional chart image, i.e., an image of the delivered additional chart, to the color management center together with imaging information when imaging the additional chart.

Step F308A:

When the data of the additional chart image and the imaging information are supplied from the patient terminal 5, the data input/output unit 101A outputs the data of the additional chart image to the image acquisition unit 103A.

Also, the data input/output unit 101A outputs the imaging information supplied from the patient terminal 5 to the device information acquisition unit 104A and the color conversion information calculation unit 105A Then, the image acquisition unit 103A writes the data of the additional chart image in the patient database 12B, and writes and stores the address of the written area in the color conversion information table of the patient database 12B, being correlated with the patient identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the color conversion information table.

Then, the color conversion information calculation unit 105A re-calculates color conversion information using the chart image, the additional chart image, the color characteristic information of the chart, the color characteristic information of the additional chart, the comparison results, and the imaging information, and updates the existing color conversion information to the newly calculated color conversion information.

In this case, the color conversion information may be updated through update processing based on numerical calculation with a polynomial or algorithm adjustment such as coefficient adjustment of a model function using a multidimensional function, or through update processing of a model using AI (e g, machine learning).

Then, the color conversion information calculation unit 105A overwrites the existing color conversion information in the color conversion information table of the patient database 12B with the new color conversion information calculated using the above calculation method, for storage and update.

The affected area observed by the patient and the additional chart may be imaged together, and the image of the affected area and the additional chart captured together may be transmitted to the color sample issuing system 1B.

In this case, the color conversion information calculation unit 105A may re-calculate color conversion information by adding the affected area image (one example of a chart image), the color characteristic information of the affected area of the patient, and the imaging information to the information obtained from the above additional chart.

The additional chart may be provided to the patient after being printed on a post card showing the results of diagnosis of the medical doctor, a medical certificate showing the results of diagnosis, or the envelope used for delivering the medical certificate.

With reference to the drawings, color management according to the present embodiment will be sequentially described, including the operation of the color sample issuing system 1B in the processing flows of Processes F21, F22, F23 and F24.

<Example of Color Conversion Information Generation of Hospital According to Process F21>

Figure 46:
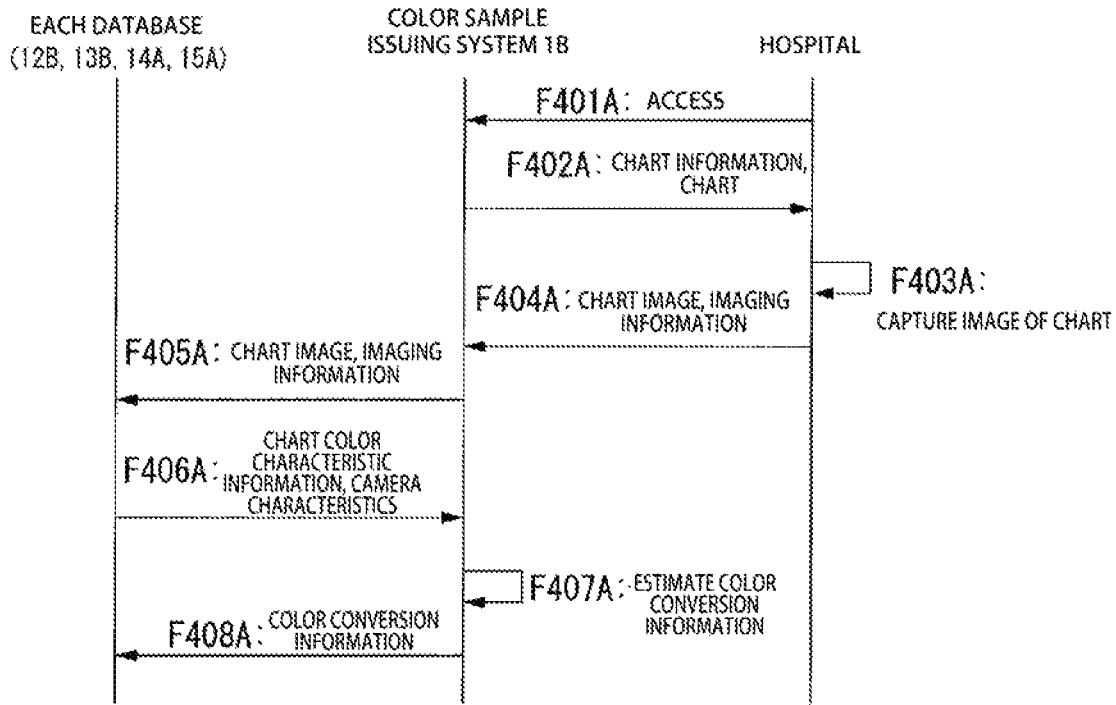
FIG. 46 is a sequence diagram illustrating a processing flow of color conversion information generation of hospital, using the color sample issuing system 1B.

FIG. 46 is a sequence diagram illustrating a processing flow of color conversion information generation of hospital, using the color sample issuing system 1B. In FIG. 46, the patient database 12B, the hospital database 13B, the chart information database 14A, and the device information database 15A are described as databases (12B, 13B, 14A and 15A). In the following description, processing is described as being performed by a medical doctor of a hospital; however, the processing may be performed by any person, such as hospital staff or the person who is requested to perform the processing.

Step F401A:

A medical doctor of a hospital accesses the color management center (color sample issuing system 1B) via the hospital server 4. For example, the medical doctor may log in with hospital identification information and request registration of environment information of the observation environment of the hospital.

Thus, the data input/output unit 101A searches through the hospital data table of the hospital database 13B with the hospital identification information used when accessing to thereby confirm which registered hospital it is.

Step F402A:

The chart issuing unit 102A reads hospital attribute information of the hospital and searches through the chart table of the chart information database 14A with the read hospital attribute information.

Then, the chart issuing unit 102A extracts chart search information having a highest similarity to the hospital attribute information and reads a chart image index corresponding to the extracted chart search information.

The chart issuing unit 102A reads a chart image from the chart information database 14A with the chart image index and issues the read chart image as a chart.

Alternatively, the chart issuing unit 102A may extract a chart, for example, preset for the affected area as an object to be imaged from the chart information table of the chart information database 14A, as a chart corresponding to affected area images for the hospital examination subject and issue the extracted chart.

The operating company A delivers (or mails) the chart issued from the chart table by the chart issuing unit 102A to the address of the registered hospital.

Step F403A:

The medical doctor of the hospital captures an image of the chart supplied from the operating company A at a predetermined position for performing medical examination/diagnosis in the medical doctor's office of the hospital, for example, to obtain color conversion information for observing a displayed affected area image, corresponding to the observation environment (lighting environment) where the affected area of the patient is examined/diagnosed.

Step F404A:

Then, the medical doctor of the hospital transmits a chart image that is an image of the chart, imaging information when capturing the image, and the hospital identification information of the hospital to the color management center (color sample issuing system 1B) from the hospital server 4.

Step F405A:

The data input/output unit 101A outputs the chart image supplied from the hospital server 4 to the image acquisition unit 103A.

Also, the data input/output unit 101A outputs the imaging information supplied from the hospital server 4 to the device information acquisition unit 104A and the color conversion information calculation unit 105A.

Then, the image acquisition unit 103A writes data of the chart image in the hospital database 13B

Also, the image acquisition unit 103A writes and stores the address of the write area into the chart image index of the hospital color conversion information table which is indicated by the hospital color conversion information index corresponding to the hospital identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the hospital color conversion information table.

Step F406A:

The color conversion information calculation unit 105A reads the chart image and the chart identification information from the hospital color conversion information table of the hospital database 13B, being correlated with the hospital identification information.

Then, the color conversion information calculation unit 105A reads the chart design information index sent to the hospital, from the chart table of the chart information database 14A with the read chart identification information. The color conversion information calculation unit 105A reads color characteristic information of the chart from the storage area indicated by the chart design information index.

Furthermore, the color conversion information calculation unit 105A reads the camera characteristics from the hospital color conversion information table, being correlated with the hospital identification information.

Step F407A:

The color conversion information calculation unit 105A calculates hospital color conversion information from the chart image, the cam era characteristics, and the color characteristic information of the chart.

The hospital color conversion information is information used for converting the color characteristic information into colorimetric values visually observed in the observation environment where the affected area is examined/diagnosed in the registered hospital.

When calculating hospital color conversion information, suitable color conversion information may be generated for each patient or for each case (e.g., similar case) observed. In this case, color conversion algorithms or color swatches used for calculating hospital color conversion information are selected. Thus, in the color conversion processing, optimum color conversion information can be used for the patient indicated by the patient identification information or for a similar case.

The lighting environment estimation unit 106A estimates the type of the light source in the observation environment in which medical examination/diagnosis is performed, from the hospital color conversion information calculated from the chart.

Step F408A:

The color conversion information calculation unit 105A writes and stores the calculated hospital color conversion information in the hospital color conversion information table, being correlated with the hospital identification information.

When writing the hospital color conversion information in the hospital color conversion information table, the color conversion information calculation unit 105A extracts the time of capturing the chart image from the date and time information contained in the imaging information, and writes and stores the time period (morning time period, daytime period, or night time period) corresponding to the calculated color conversion information in the column of specification data. Furthermore, the information contained in the imaging information, such as position information based on GPS information, hospital specification information, or the like, may be recorded.

The above description is for the case in which a chart is delivered and supplied to a hospital. In this case, a chart for which color conversion information is calculated may be printed in advance together with the chart identification information and the hospital identification information so as to be adjacent to them, on the front or back of the membership card (including the registration card) of the color management center, and an image of the chart identification information and the hospital identification information may be captured by the hospital together with the chart.

Alternatively, at the time of registration (at the time of hospital registration) with the color management center, the operating company A running the color management center may enclose the chart when delivering a description for color management method, or the chart identification information and the hospital identification information (character information or graphic information) may be directly printed on the envelope for delivering the description or on the delivery note, or with the address, or on the packaging material. Furthermore, the chart identification information and the hospital identification information (character information or graphic information) may be colored, so that an image thereof can be used for acquiring color conversion information.

In the present embodiment, a chart to be sent to the hospital may be prepared based on the observation environment of the hospital where the affected areas of patients are examined/diagnosed (information on time period of observing the affected areas of patients, location of observation, etc.), using hospital color conversion information of another hospital with a similar imaging environment which is different from the hospital to which the chart is sent.

<Example of Color Conversion and Display of Affected Area Image of Process F22>

Figure 47:
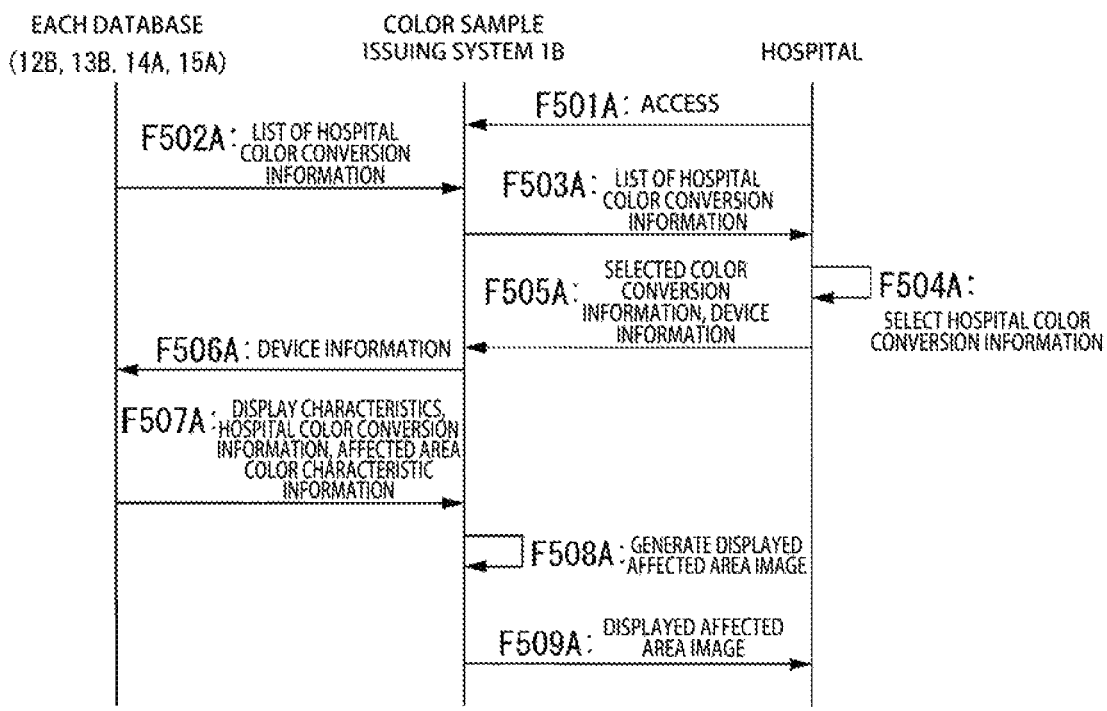
FIG. 47 is a sequence diagram illustrating a processing flow of color conversion and display of affected area image, using the color sample issuing system 1B.

FIG. 47 is a sequence diagram illustrating a processing flow of color conversion and display of an affected area image, using the color sample issuing system 1B. In FIG. 47, the patient database 12B, the hospital database 13B, the chart information database 14A, and the device information database 15A are described as databases (12B, 13B, 14A and 15A). In the following description, processing is described as being performed by a medical doctor of a hospital; however, the processing may be performed by any person, such as hospital staff or the person who is requested to perform the processing.

Step F501A:

A medical doctor of a hospital accesses the color management center (color sample issuing system 1B) via the hospital server 4. For example, the medical doctor may log in with hospital identification information and request to view the affected area image of an affected area of a patient of the hospital the medical doctor is registered with.

Thus, the data input/output unit 101A searches through the hospital data table of the hospital database 13B with the hospital identification information used when accessing to thereby confirm which registered hospital it is from among registered hospitals.

Step F502A:

The estimated image generation server 11A searches through the hospital data table of the hospital database 13B with the hospital identification information to obtain hospital color conversion information used when generating a displayed affected area image, and extracts the hospital color conversion information table of the accessing hospital.

Step F503A:

Then, the estimated image generation server 11A displays a list of specification data of the hospital color conversion information table on the display screen of the hospital server 4, as a display for the medical doctor to select hospital color conversion information.

For the display, character strings are used, such as "morning time period, "daytime period", "night time period", and "preset color conversion information (ordinary medical doctor's office, sunny conditions outdoors, etc.)", which indicate observation conditions in an observation environment where medical examination/diagnosis is performed.

Step F504A:

The medical doctor of the hospital selects a condition corresponding to the environment where the medical doctor observes the actual affected area of the patient, from the list of specification data on the display screen of the hospital server 4.

In this case, for example, if the time specified for the medical examination/diagnosis of the affected area of the patient is 10 am, the time of observing the affected area of the patient in the observation environment is within the morning time period. Accordingly, the medical doctor of the hospital may select the morning time period from the list of specification data on the display screen of the hospital server 4. Furthermore, if the affected area of the patient is examined/diagnosed around 8 pm, the time of observing the affected area of the patient in the observation environment is within the night time period. Accordingly, the medical doctor of the hospital may select the night time period from the list of specification data on the display screen of the hospital server 4. If the observation environment for observing the affected area of the patient is a school gymnasium or the like, rather than in a medical ward, the medical doctor of the hospital may select the preset hospital color conversion information from the list of specification data on the display screen of the hospital server 4.

Step F505A:

The hospital server 4 transmits the observation condition selected by the medical doctor of the hospital, e.g., a character string selected from among "morning time period", "daytime period", "night time period", "office", "restaurant", and "preset hospital color conversion information", as information to the color sample issuing system 1B.

In this case, the hospital server 4 transmits device specification information (device information) that specifies the display, which will be used as a display screen, to the color sample issuing system 1B together with the character string information.

Step F506A:

The data input/output unit 101A outputs the device specification information supplied from the hospital server 4 to the device information acquisition unit 104A.

The device information acquisition unit 104A searches through the device information table of the device information database 15A and reads display characteristics corresponding to the device information, i.e., the device specification information.

The device information acquisition unit 104A writes and stores the read display characteristics in the column of display characteristics in the hospital color conversion information table.

Step F507A:

Then, the estimated image generation server 11A reads the display characteristics from the hospital data table of the hospital database 13B, being correlated with the hospital identification information.

Also, the estimated image generation server 11A reads the hospital color conversion information (information about the environment where the affected area of the patient is examined/diagnosed, or hospital color conversion information corresponding to the case presumed from the affected area of the patient) selected by the medical doctor of the hospital from the hospital color conversion information table.

The estimated image generation server 11A reads affected area color characteristic information of the affected area observed by the medical doctor of the hospital for medical examination/diagnosis from the affected area color data table of the hospital database 13B.

Step F508A:

Then, the estimated image generation server 11A converts the colorimetric values of affected area color information of the patient's affected area in a defined observation environment into colorimetric values in the observation environment for the medical doctor to perform medical examination/diagnosis with the hospital color conversion information, and generates data for the displayed affected area image, being correlated with the display characteristics.

Step F509A:

The estimated image generation server 11A transmits the generated data for the displayed affected area image to the hospital server 4 via the data input/output unit 101A.

Thus, the medical doctor of the hospital can visually observe an affected area image on the display screen of the hospital server 4 in color as in the case of observing the actual affected area of the patient in the observation environment where the medical doctor examines/diagnoses the affected area of the patient.

In this case, the estimated image generation server 11A may add, for example, a displayed image of a chart resulting from conversion of the color characteristic information of the chart using the hospital color conversion information, to the displayed affected area image.

In this case, the medical doctor of the hospital may observe the delivered chart and the chart image in the affected area image displayed on the display screen of the hospital server 4 for comparison of the visually observed colors, and transmit the comparison results to the color management center.

Specifically, the medical doctor of the hospital may evaluate color difference by sequentially adjusting the adjustment bars of the RGB color components (red, green and blue) displayed on the display screen of the hospital server 4 to adjust colors of the chart image in the affected area image on the display screen to colors of the chart actually observed.

When the medical doctor of the hospital can recognize that the colors of the chart image in the affected area image on the display screen have become similar to the colors of the actually observed chart, the medical doctor may terminate color adjustment of the displayed image, which involved inputting the amount of adjustment via the RGB color-component adjustment bars or the like on the display.

Also, the medical doctor of the hospital may compare the affected area of the patient visiting the hospital and the image of the affected area for adjustment of colors in the displayed image.

Thus, the hospital server 4 transmits data of the affected area image whose colors have been adjusted by the medical doctor of the hospital to the color sample issuing system 1B as evaluation information (comparison results).

Alternatively, as in the first embodiment, information, such as "Redness is insufficient", may be transmitted to the color sample issuing system 1B as evaluation information.

Then, the color sample issuing system 1B adds the evaluation information to the additional color search information in the additional chart design table.

<Additional Chart Issuance to Hospital and Color Conversion Information Update According to Processes F23 and F24>

Figure 48:
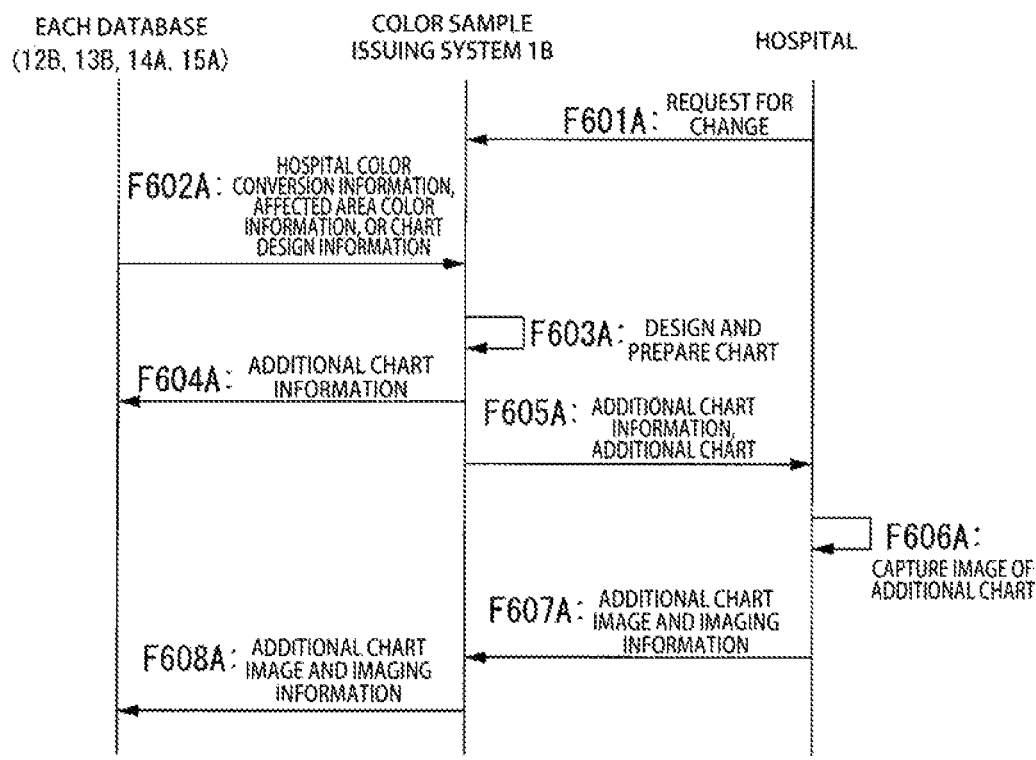
FIG. 48 is a sequence diagram illustrating a processing flow of additional chart issuance for hospital color conversion information update, using the color sample issuing system 1B.

FIG. 48 is a sequence diagram illustrating a processing flow of additional chart issuance for hospital color conversion information update, using the color sample issuing system 1B. In FIG. 48, the patient database 12B, the hospital database 13B, the chart information database 14A, and the device information database 15A are described as databases (12B, 13B, 14A and 15A). In the following description, processing is described as being performed by a medical doctor of a hospital; however, the processing may be performed by any person, such as hospital staff or the person who is requested to perform the processing.

Step F601A:

If the colors visually observed in the displayed affected area image in Step F509A are different from the colors of the actual chart visually observed in the observation environment, the medical doctor of the hospital accesses the color management center (color sample issuing system 1B) via the hospital server 4 and requests update of the hospital color conversion information.

Then, the hospital server 4 transmits request information, with the hospital identification information added thereto, to the color sample issuing system 1B to request update of the hospital color conversion information.

Thus, in the color sample issuing system 1B, the additional chart issuing unit 107A extracts the hospital identification information from the request information received from the hospital server 4, and updates the hospital color conversion information of this hospital.

Step F602A:

When an update request for the hospital color conversion information of the hospital is received, the data input/output unit 101A outputs a request for preparing an additional chart to the additional chart issuing unit 107A, together with the hospital identification information of the hospital.

Thus, the additional chart issuing unit 107A reads hospital color conversion information corresponding to the supplied hospital identification information, from the color conversion information table of the patient database 12B.

Also, the additional chart issuing unit 107A reads affected area color information of the affected area (color characteristic information of the affected area) indicated by the medical doctor of the hospital, from the affected area color data table of the hospital database 13B.

The additional chart issuing unit 107A reads chart design information of the chart sent to the hospital, from the chart information database 14A.

Step F603A:

Then, when preparing an additional chart, the additional chart issuing unit 107A extracts colors to be added to the chart from the additional chart design table of the chart information database 14A.

Specifically, the additional chart issuing unit 107A searches through the additional chart design table for additional hospital color search information having a highest similarity to the search conditions, such as hospital color conversion information, color characteristic information used as color swatches in the chart, type of the light source in the lighting environment, and color characteristic information of the affected area.

Then, the additional chart issuing unit 107A reads additional chart design information corresponding to the searched additional color search information.

Thus, the additional chart issuing unit 107A replaces the color swatches in the chart to design a combination of color swatches in the additional chart, according to the read additional chart design information.

In this case, the design of the additional chart may incorporate comparison results of the medical doctor of the hospital, light source metamerism in the observation environment of the medical doctor of the hospital, or observer metamerism of the medical doctor of the hospital or the camera.

Alternatively, for example, the design may incorporate different filter transmittance or camera sensitivity in a part of the color swatches of the chart to obtain an effect as obtained by arranging a filter (filter that changes transmission wavelength) in front of a lens in a camera, or as obtained in multiband imaging in which an image is captured using cameras with different observation sensitivities.

Then, the operating company A prepares an additional chart (e.g., prints it on a paper medium or the like) according to the design information on the combination of the color swatches in the issued additional chart, and issues the prepared additional chart.

Step F604A:

Then, the additional chart issuing unit 107A writes and stores the generated additional chart information in the additional chart table of the chart information database 14A, with the chart identification information imparted.

Step F605A.

Then, the operating company A delivers the prepared additional chart to the address (hospital, examination section, etc.) registered by the medical doctor of the hospital.

Step F606A:

When the additional chart is delivered, the medical doctor of the hospital refers to the additional chart information. Then, the medical doctor of the hospital captures an image of the additional chart in the observation environment where the affected area of the patient is observed using an imaging device, according to the instruction of the additional chart information to acquire an additional chart image. The additional chart does not have to be imaged by the medical doctor of the hospital but may be imaged by another person as long as it is imaged in the observation environment.

Step F607A:

Then, the medical doctor of the hospital accesses the color management center and transmits data of the additional chart image, i.e., an image of the delivered additional chart, to the color management center (color sample issuing system 1B) together with imaging information when imaging the additional chart.

Step F608A:

If the data of the additional chart image and the imaging information are supplied from the hospital server 4, the data input/output unit 101A outputs the data of the additional chart image to the image acquisition unit 103A.

Also, the data input/output unit 101A outputs the imaging information supplied from the hospital server 4 to the device information acquisition unit 104A and the color conversion information calculation unit 105A.

Then, the image acquisition unit 103A writes the data of the additional chart image in the hospital database 13B, and writes and stores the address of the written area in the hospital color conversion information table of the hospital database 13B, in correlation with the hospital identification information.

The device information acquisition unit 104A searches through the device information table of the device information database 15A and reads camera characteristics corresponding to the device specification information contained in the imaging information.

Then, the device information acquisition unit 104A writes and stores the read camera characteristics in the column of camera characteristics in the hospital color conversion information table.

Then, the color conversion information calculation unit 105A re-calculates hospital color conversion information using the chart image, the additional chart image, the color characteristic information of the chart, the color characteristic information of the additional chart, the comparison results, and the imaging information, and updates the existing hospital color conversion information to the newly calculated hospital color conversion information.

In this case, the hospital color conversion information may be updated through update processing based on numerical calculation with a polynomial or algorithm adjustment such as coefficient adjustment of a model function using a multidimensional function, or through update processing of a model using AI (e.g., machine learning).

Then, the color conversion information calculation unit 105A overwrites the existing hospital color conversion information in the hospital color conversion information table of the hospital database 13B with the new hospital color conversion information calculated using the above calculation method, for storage and update. As described above, according to the present embodiment, an additional chart enabling acquisition of more information about the lighting environment (the imaging environment or the observation environment) can be generated based on the color characteristic information of the chart, color conversion information (including hospital color conversion information), comparison results, and the like obtained from the chart. Therefore, information about the light source in the imaging environment where the affected area of a patient is imaged or in the observation environment where the medical doctor of a hospital observes the affected area can be acquired. Accordingly, high accuracy can be ensured when acquiring the color conversion information used for acquiring color characteristic information from an image of the affected area captured in the imaging environment, and the hospital color conversion information used for converting the color characteristic information into a color image for the observation environment where the affected area is observed by the medical doctor of the hospital.

Therefore, according to the present embodiment, color characteristic information can be obtained with high accuracy from an image of the affected area of the patient captured in the patient's home, using the acquired color conversion information for each patient, and a displayed affected area image can be generated from the color characteristic information, using the hospital color conversion information corresponding to the observation environment of the medical doctor of the hospital. Accordingly, the colors of the displayed affected area image and the colors of the affected area in the observation environment where the medical doctor performs medical examination/diagnosis can be similarly visually observed.

A program for realizing functions of the product sales support system 1 (color conversion information generation system) shown in FIG. 1, the color sample issuing system 1A (color conversion information generation system) shown in FIG. 17, and the color sample issuing system 1B (color conversion information generation system) shown in FIG. 37 of the present invention may be recorded on a computer-readable recording medium. Thus, by allowing a computer system to read and execute the program recorded in the recording medium, a lighting environment can be estimated for the imaging environment where the user captures an image of a color sample or for the observation environment where the user observes an object to thereby generate color conversion information. The "computer system" referred to herein includes an operating system (OS) and hardware such as peripheral devices.

The "computer system" may also include a WWW system with an environment for providing (displaying) websites. The "computer-readable recording medium" refers to a storage device such as a portable medium, e.g., a flexible disk, magneto-optical disk, ROM, CD-ROM or the like, or a hard disk incorporated in a computer system. The "computer-readable recording medium" also includes those media which hold a program for a predetermined period of time, such as a volatile memory (RAM) in a computer system that serves as a server or a client in the case where the program is transmitted via a network such as the Internet or a communication line such as a telephone line.

Furthermore, the above program may be transmitted from a computer system that stores the program in a storage device or the like to another computer system via a transmission medium or waves transmitted in the transmission medium. The "transmission medium" that transmits a program refers to a medium having a function of transmitting information, including a network (communication network) such as the Internet, and a communication circuit (communication line) such as a telephone line. The program described above may be a program for realizing a part of the functions described above. Furthermore, the program may be a program realized by combining the above functions with a program already recorded in the computer system, i.e., a so-called differential file (differential program).

The present application addresses the following. For purchasing products on EC sites, standards are shown or the dimensions of products are shown. Therefore, customers can easily determine whether the products observed on the display screens of the terminals have sizes required by the customers.

However, this does not work for product colors. Specifically, the colors of a product selected on a display screen may often be different from the actually observed colors, and thus the product may be returned due to the colors not being satisfactory to the customer. This color difference may be caused by the difference in characteristics between the light source in an imaging environment where the image is captured and the light source in an observation environment where the customer actually observes the product.

In particular, for clothing items, etc., the customer's taste may depend on subtle color nuances when combined with other clothing items, so that if the colors of the purchased product are different from the expected colors, the colors may not be the customer's preference.

In this way, since colors of products on the display screens can be different from the colors of the actual products, it may be difficult for customers to purchase products with their desired colors.

Furthermore, when reproducing images of cultural assets or reproducing images in catalogs by printing, colors of the articles are required to be faithfully reproduced. Therefore, the imaging environments where images of articles are captured and the parameters of cameras as imaging devices used for imaging are acquired in advance. Then, color management is performed so that, in observation environments, customers can visually observe the colors of the articles as being the colors of the actual articles.

However, ordinary customers observe the colors of the product images selected on the display screens and the actual colors of the delivered products in various observation environments. In this case, neither the ordinary users who are the customers of EC sites, nor the persons running the EC sites have knowledge about color management or have dedicated devices therefor. Accordingly, neither of them can perform color management for similarly visually observing the colors of the product images and the colors of the actual products.

In addition, since ordinary users are not aware of the above-mentioned color management, if the information on the imaging environment or observation environment is acquired and then the imaging environment or observation environment is changed, color management adjustment cannot be performed. The imaging environment or the observation environment, when visually observing colors, is a lighting environment which is mainly an environment of the light source.

The colors of an article in an image may be visually observed at an initial stage as colors similar to the colors of the actual article. However, if the imaging environment or the observation environment is changed, it may be difficult to provide an image from which the user can visually observe the colors as colors similar to the actual article, or it may be difficult for the user to visually observe the colors as colors similar to the actual article under the user's observation environment.

The present invention has an aspect to provide a color conversion information generation method, a color conversion information generation system, and a program therefor. The color conversion information generation method converts actual colors of an article into colors visually observed under the user's lighting environment, or vice versa, according to an imaging environment or an observation environment (lighting environment), so that an image of the article captured in an imaging environment of an ordinary user who is not aware of color management, or an article image that is an image of an article visually observed in an observation environment can be visually observed as being colors similar to the colors of the actual article.

A first aspect of the present invention is a color conversion information generation method for generating color conversion information that is information used for converting color information indicating colors of an object in a lighting environment, i.e., information corresponding to a lighting environment, into color characteristic information indicating color characteristics of the object, or vice versa, or specifically, relates to a color conversion information generation method including a color sample information providing step of providing color sample information to a user to determine a color sample whose color characteristic information is known, an image receiving step of receiving an image including a color sample that is determined by the color sample information in the lighting environment, and a color conversion information generating step of generating color conversion information that corresponds to the lighting environment, being correlated with the user, based on the image and the color characteristic information of the color sample determined according to the color sample information.

In a second aspect of the present invention according to the color conversion information generation method of the first aspect, the color conversion information is generated according to the color characteristics that correspond to attributes of the object. In a third aspect of the present invention according to the color conversion information generation method of the first or second aspect, the method may further include a color sample generating step of generating the color sample that is determined by the color sample information provided to the user.

In a fourth aspect of the present invention according to the color conversion information generation method of the third aspect, the color sample may be printed matter that includes any of or a combination of symbols, diagrams, and a color chart, the printed matter being printed with colors which are determined by the color sample information and of which the color characteristic information is known.

In a fifth aspect of the present invention according to the color conversion information generation method of the fourth aspect, the printed matter may be an item on which the color sample is printed, the printed matter being received by the user together with the object when the object is delivered to the user.

In a sixth aspect of the present invention according to the color conversion information generation method of the fourth aspect, the printed matter may be an item on which the color sample is printed, the printed matter being received by the user from a predetermined organization when the user registers with the organization.

In a seventh aspect of the present invention according to the color conversion information generation method of the fourth aspect, the printed matter may be an item on which diagrams or symbols are printed as the color sample, the diagrams or the symbols indicating a URL which is used by the user when accessing a registration system of the predetermined organization when the user registers with the organization.

In an eighth aspect of the present invention according to the color conversion information generation method of the first or second aspect, the color sample may be the object that is provided to the user with colors of which the color characteristic information is known.

In a ninth aspect of the present invention according to the color conversion information generation method of the first or second aspect, the color sample may be a generally used product with colors of which the color characteristic information is known.

In a tenth aspect of the present invention according to the color conversion information generation method of the first or second aspect, the color sample may be printed matter on which color swatches are printed with colors of which the color characteristic information is known.

In an eleventh aspect of the present invention according to the color conversion information generation method of any one of the first to tenth aspects, the method may include steps of: receiving a first image that is an image of a first color sample determined by first color sample information, as the color sample, captured in the lighting environment of the user; generating the color conversion information for the lighting environment of the user, from the first image and the color characteristic information of the first color sample; providing second color sample information, as the color sample information, to the user at a timing later than the step of generating the color conversion information, the second color sample information being used for determining a second color sample that is different from the first color sample in the color characteristic information; receiving a second image that is an image of the second color sample determined by the second color sample information in the lighting environment of the user; and updating the color conversion information for the lighting environment of the user, based on the second image and the color characteristic information of the second color sample.

In a twelfth aspect of the present invention according to the color conversion information generation method of the eleventh aspect, the method may further include a step of generating the second color sample corresponding to the first image.

In a thirteenth aspect of the present invention according to the color conversion information generation method of the eleventh or twelfth aspect, the second image may be an image of the object delivered to the user or an image of the object and the second color sample.

In a fourteenth aspect of the present invention according to the color conversion information generation method of the twelfth or thirteenth aspect, the color characteristic information may be updated when change of the lighting environment of the user is detected.

In a fifteenth aspect of the present invention according to the color conversion information generation method of the fourteenth aspect, change of the lighting environment may be detected when color information corresponding to color characteristic information of a second color sample in the lighting environment is different from color information of the second color sample of the second image by not less than a predetermined threshold that is determined in advance.

In a sixteenth aspect of the present invention according to the color conversion information generation method of the fourteenth aspect, change of the lighting environment may be detected when information that indicates change of the lighting environment of the user is received from the user.

In a seventeenth aspect of the present invention according to the color conversion information generation method of any one of the eleventh to sixteenth aspects, a timing of providing the second color sample information to the user may be determined based on attribute information of the user.

In an eighteenth aspect of the present invention according to the color conversion information generation method of any one of the first to seventeenth aspects, the user may be provided with predetermined incentive information which is to be given to the user when the image of the color sample is received from the user.

In a nineteenth aspect of the present invention according to the color conversion information generation method of any one of the first to eighteenth aspects, the method may include steps of converting color characteristic information of the object into color information, based on the color conversion information to generate a displayed object image that is an image based on the color information; and transmitting the displayed object image to a terminal used by the user.

In a twentieth aspect of the present invention according to the color conversion information generation method of the nineteenth aspect, the method may include a step of updating the color conversion information of the user according to evaluation information as a result of the user comparing the displayed object image with the object.

In a twenty-first aspect of the present invention according to the color conversion information generation method of the nineteenth aspect, the method may further include steps of: estimating color information of a color sample in an observation environment of the user from color characteristic information of the color sample, based on the color conversion information, to generate a displayed color sample image that is an estimated image of the color sample; transmitting the displayed color sample image to the terminal used by the user; and updating the color conversion information of the user according to evaluation information as a result of the user comparing the displayed color sample image with the color sample.

In a twenty-second aspect of the present invention according to the color conversion information generation method of the eleventh or twelfth aspect, the second color sample may be generated having a color combination corresponding to at least any of, a combination of, or all of the color characteristic information of the object, the color conversion information of the lighting environment obtained from the first color sample, and similar color conversion information which is selected according to the information of the lighting environment, the similar color conversion information being color conversion information in a lighting environment similar to the lighting environment where the first color sample is imaged.

In a twenty-third aspect of the present invention according to the color conversion information generation method of the eleventh or twelfth aspect, the second color sample may be generated according to a color combination that corresponds to environment attributes which are attributes of the lighting environment.

In a twenty-fourth aspect of the present invention according to the color conversion information generation method of the twenty-third aspect, the environment attributes may include characteristics of lighting.

In a twenty-fifth aspect of the present invention according to the color conversion information generation method of any of the third, eleventh and twelfth aspects, the method may include steps of: generating group information that indicates user attribute information of a group into which the user is classified, based on user attribute information that indicates attributes of the user; and generating the color sample according to a combination of the color characteristics, the color sample corresponding to the user attribute information indicated by the group information.

In a twenty-sixth aspect of the present invention according to the color conversion information generation method of the twenty-fifth aspect, the user attribute information may include any of, a combination of, or all of attributes of location of the lighting environment of the user, gender of the user, age of the user, address of the user, and occupation of the user.

In a twenty-seventh aspect of the present invention according to the color conversion information generation method of any of the third, eleventh and twelfth aspects, the object may be a body observed by a medical doctor; and the color sample may be generated according to a combination of color characteristics that are generated according to attributes of the body.

In a twenty-eighth aspect of the present invention according to the color conversion information generation method of the twenty-seventh aspect, the body may be an affected area of a patient as the user; and attributes of the body may include any of, a combination of, or all of a part of a body containing the affected area, and a case having similarity to symptoms of the affected area.

In a twenty-ninth aspect of the present invention according to the color conversion information generation method of any of the third, eleventh and twelfth aspects, the object may be an article provided to the user; and the color sample may be generated according to a combination of color characteristics that are generated according to attributes of the article.

In a thirtieth aspect of the present invention according to the color conversion information generation method of the twenty-ninth aspect, attributes of the article may include any of, a combination of, or all of type of the article, materials forming the article, and shape of the article.

In a thirty-first aspect of the present invention according to the color conversion information generation method of any of the third, eleventh and twelfth aspects, the color sample may be generated according to any of or a combination of the color characteristics that correspond to attribute information of the object in history information of the object viewed by the user, and the color characteristics that correspond to attribute information of the object in history information of the object ordered by the user.

In a thirty-second aspect of the present invention according to the color conversion information generation method of any of the third, eleventh and twelfth aspects, may include steps of: providing a URL of a web page for viewing an object; acquiring history information of the user viewing the web page; and generating the color sample according to any of or a combination of the color characteristics that correspond to attribute information of the object in history information of the object viewed by the user.

In a thirty-third aspect of the present invention according to the color conversion information generation method of any of the third, eleventh and twelfth aspects, the color sample may be generated as a combination of the color characteristics that correspond to sensitivity of an imaging device that captures an image of the object or of the color sample.

A thirty-fourth aspect of the present invention is a color conversion generation system, including: a color sample information provision unit that provides color sample information to a user, the color sample information being information about a color sample of which color characteristic information is known; an image acquisition unit that acquires an image from the user, the image being an image of the color sample that is determined by the color sample information in a lighting environment of the user; and a color conversion information calculation unit that calculates color conversion information for the user according to the image and the color characteristic information, the color conversion information being used for conversion between color information of an article in the lighting environment and color characteristic information of the article.

A thirty-fifth aspect of the present invention is a program that configures a computer to operate as: a color sample information providing means that provides color sample information to a user, the color sample information being information for determining a color sample of which color characteristic information is known; an image acquiring means that acquires an image from the user, the image being an image of the color sample that is determined by the color sample information in a lighting environment of the user; and a color conversion information calculating means that calculates color conversion information for the user according to the image and the color characteristic information, the color conversion information being used for conversion between color information of an article in the lighting environment and color characteristic information of the article.

As described above, according to the aspects of the present invention, there are provided a color conversion information generation method, a color conversion information generation system, and a program. The color conversion information generation method converts actual colors of an article into colors as visually observed under the user's lighting environment, or vice versa, according to an imaging environment or an observation environment (lighting environment), so that an image of an article captured in an imaging environment of an ordinary user having no knowledge of color management, or an article image that is an image of an article visually observed in an observation environment can be visually observed as being colors similar to the colors of the actual article.

REFERENCE SIGNS LIST

1 . . . Product sales support system
1A, 1B . . . Color sample issuing system
2 . . . EC site server
2_1 . . . Storage unit
3 . . . User terminal (or customer terminal)
4 . . . Hospital server
5 . . . Patient terminal
10 . . . Product sales support server
10A . . . Color sample issuing server
11 . . . User database
11A . . . Estimated image generation server
12 . . . Product color database
12A . . . Customer database
12B . . . Patient database
13 . . . Chart information database
13A . . . EC site database
13B . . . Hospital database
14 . . . Device information database
14A . . . Chart information database
15A . . . Device information database
16A . . . Product sales server
101, 101A . . . Data input/output unit
102 . . . Chart supply unit
102A . . . Chart issuing unit
103, 103A . . . Image acquisition unit
104, 104A . . . Device information acquisition unit
105, 105A . . . Color conversion information calculation unit
106 . . . Estimated image generating unit
106A . . . Lighting environment estimation unit
107 . . . Product sales processing unit
107A . . . Additional chart issuing unit Obviously, numerous modifications and variations of the present invention are possible in light of the above teachings. It is therefore to be understood that within the scope of the appended claims, the invention may be practiced otherwise than as specifically described herein.

What is claimed is:

1. A method for generating color conversion information, comprising:
selecting, via processing circuitry, color sample information for determining a color sample of which color characteristic information is known;
receiving, via the processing circuitry, an image captured by an imaging device, the image including the color sample determined by the color sample information in a lighting environment;
generating, via the processing circuitry, the color conversion information, which corresponds to the lighting environment and is correlated with a user, based on the image and the color characteristic information of the color sample determined by the color sample information;
generating group information that indicates additional user attribute information of a group into which the user is classified, based on user attribute information that indicates attributes of the user; and
generating the color sample determined by the color sample information according to a combination of the color characteristics, the color sample corresponding to the additional user attribute information indicated by the group information,
wherein the color conversion information converts between color information and object color characteristic information,
the color information is information which corresponds to the lighting environment and indicates colors of an object in the lighting environment, and
the object color characteristic information indicates color characteristics of the object.

2. The method according to claim 1, wherein the color conversion information is generated according to the color characteristics that correspond to attributes of the object.

3. The method according to claim 1, wherein the color sample is a printed matter that includes any of or a combination of symbols, diagrams, and a color chart, and
the printed matter is printed with colors which are determined by the color sample information and of which the color characteristic information is known.

4. The method according to claim 3, wherein the printed matter is an item on which the color sample is printed, and
the printed matter is associated with the object for delivery.

5. The method according to claim 3, wherein the printed matter is an item on which the color sample is printed, and
the printed matter is associated with a user registration.

6. The method according to claim 3, wherein the printed matter is an item on which diagrams or symbols are printed as the color sample, and
the diagrams or the symbols indicate a URL which is used when accessing a registration system.

7. The method according to claim 1, wherein the color sample is the object with colors of which the color characteristic information is known.

8. The method according to claim 1, wherein the color sample is a second object with colors of which the color characteristic information is known.

9. The method according to claim 1, wherein the color sample is a printed matter on which color swatches are printed with colors of which the color characteristic information is known.

10. The method according to claim 1, further comprising selecting predetermined incentive information when the image of the color sample is received.

11. The method according to claim 1, further comprising:
converting the color characteristic information of the object into the color information, based on the color conversion information, to generate a displayed object image that is an image based on the color information; and
transmitting the displayed object image to a terminal.

12. The method according to claim 11, further comprising:
updating the color conversion information according to evaluation information as a result of a comparison of the displayed object image with the object.

13. The method according to claim 11, further comprising:
estimating the color information of a color sample in an observation environment of the user from the color characteristic information of the color sample, based on the color conversion information, to generate a displayed color sample image which is an estimated image of the color sample;
transmitting the displayed color sample image to the terminal; and updating the color conversion information according to evaluation information as a result of a comparison of the displayed color sample image with the color sample.

14. The method according to claim 1, wherein the user attribute information includes any of, a combination of, or all of attributes of location of the lighting environment, gender of the user, age of the user, address of the user, and occupation of the user.

15. The method according to claim 1, wherein the object is a body, and
the color sample is generated according to a combination of color characteristics generated according to attributes of the body.

16. The method according to claim 15, wherein the body is an affected area of a patient, and
the attributes of the body include any of, a combination of, or all of a part of the body containing the affected area, and a case having similarity to symptoms of the affected area.

17. The method according to claim 1, wherein
the color sample is generated according to a combination of color characteristics that are generated according to attributes of the object.

18. The method according to claim 17, wherein attributes of the object include any of, a combination of, or all of a type of the object, materials forming the object, and a shape of the object.

19. The method according to claim 1, wherein the color sample is generated according to any of or a combination of the color characteristics that correspond to attribute information of the object in viewing history information of the object, and the color characteristics that correspond to attribute information of the object in order history information of the object.

20. The method according to claim 1, further comprising:
providing a URL of a web page for viewing the object;
acquiring viewing history information of the user for the web page; and
generating the color sample according to any of or a combination of the color characteristics that correspond to attribute information of the object in the viewing history information of the user.

21. The method according to claim 1, wherein the color sample is generated as a combination of the color characteristics that correspond to spectral sensitivity of the imaging device that captures the image of the object or of the color sample.

22. A method for generating color conversion information, comprising:
selecting, via processing circuitry, first color sample information for determining a first color sample of which color characteristic information is known;
receiving, via the processing circuitry, an image captured by an imaging device, the image including the first color sample determined by the first color sample information in a lighting environment;
generating, via the processing circuitry, the color conversion information, which corresponds to the lighting environment and is correlated with a user, based on the image and the color characteristic information of the first color sample determined by the first color sample information;
selecting second color sample information at a timing later than the step of generating the color conversion information, the second color sample information being used for determining a second color sample that is different from the first color sample in the color characteristic information;
receiving a second image including the second color sample determined by the second color sample information in the lighting environment; and
updating the color conversion information for the lighting environment, based on the second image and the color characteristic information of the second color sample, wherein
the color conversion information converts between color information and object color characteristic information,
the color information is information which corresponds to the lighting environment and indicates colors of an object in the lighting environment, and
the object color characteristic information indicates color characteristics of the object.

23. The method according to claim 22, further comprising:
generating the second color sample.

24. The method according to claim 22, wherein the second image is an image of the object or an image of the object and the second color sample.

25. The method according to claim 23, wherein the color conversion information is updated when a change of the lighting environment is detected.

26. The method according to claim 25, wherein the change of the lighting environment is detected when the color characteristic information of the second color sample is different from color characteristic information estimated from the second image using the color conversion information.

27. The method according to claim 25, wherein the change of the lighting environment is detected when information indicating the change of the lighting environment is received.

28. The method according to claim 22, wherein a timing of selecting the second color sample information is determined based on attribute information of the user.

29. The method according to claim 22, wherein the second color sample is generated having a color combination corresponding to at least any of, a combination of, or all of the color characteristic information of the object, the color conversion information obtained from the first color sample, and second color conversion information which is selected according to the information of the lighting environment, the second color conversion information being color conversion information in a second lighting environment similar to the lighting environment where the first color sample is imaged.

30. The method according to claim 22, wherein the second color sample is generated according to a color combination that corresponds to environment attributes which are attributes of the lighting environment.

31. The method according to claim 30, wherein the environment attributes include characteristics of lighting.

* * * * *